US009818263B2

(12) United States Patent
Kitamura et al.

(10) Patent No.: US 9,818,263 B2
(45) Date of Patent: Nov. 14, 2017

(54) GAMING MACHINE THAT CHANGES GAMES FROM FIRST TYPE OF GAMES TO SECOND TYPE OF GAMES

(71) Applicants: Universal Entertainment Corporation, Tokyo (JP); Aruze Gaming America, Inc., Las Vegas, NV (US)

(72) Inventors: Kenta Kitamura, Tokyo (JP); Kenji Enokido, Tokyo (JP); Hiroki Saito, Tokyo (JP); Ai Genda, Tokyo (JP)

(73) Assignees: UNIVERSAL ENTERTAINMENT CORPORATION, Tokyo (JP); ARUZE GAMING AMERICA, INC., Las Vegas, NV (US)

(*) Notice: Subject to any disclaimer, the term of this patent is extended or adjusted under 35 U.S.C. 154(b) by 38 days.

(21) Appl. No.: 15/050,556

(22) Filed: Feb. 23, 2016

(65) Prior Publication Data

US 2016/0253876 A1 Sep. 1, 2016

(30) Foreign Application Priority Data

Feb. 27, 2015 (JP) ................................. 2015-037848

(51) Int. Cl.
*G06F 17/00* (2006.01)
*G07F 17/32* (2006.01)

(52) U.S. Cl.
CPC ...... *G07F 17/3267* (2013.01); *G07F 17/3244* (2013.01)

(58) Field of Classification Search
None
See application file for complete search history.

(56) References Cited

U.S. PATENT DOCUMENTS

2003/0045345 A1* 3/2003 Berman .................. G07F 17/34 463/20
2008/0113696 A1* 5/2008 Owen ................ G07F 17/3267 463/1
2009/0124339 A1* 5/2009 Barton .................... G07F 17/32 463/20
2010/0087243 A1* 4/2010 Saito ....................... G07F 17/34 463/20
2011/0118014 A1* 5/2011 Mitchell ............. G07F 17/3202 463/30
2013/0217466 A1 8/2013 Fujisawa et al.
2014/0342797 A1* 11/2014 Fujisawa ................ G07F 17/34 463/20

* cited by examiner

*Primary Examiner* — Paul A D'Agostino
(74) *Attorney, Agent, or Firm* — Lex IP Meister, PLLC

(57) ABSTRACT

Provided is a gaming machine that develops games from base games to various types of games and further allows easy pre-estimation of the benefit to be provided to the players. The gaming machine changes games from the first type in the first mode to the second type in the normal mode when a first trigger is completed in a game of the first type in the first mode, changes games from the first type in the first mode to the first type in the second mode when a second trigger is completed in a game of the first type in the first mode, and changes games from the first type in the second mode to the second type in the special mode when a third trigger is completed in a game of the first type in the second mode.

6 Claims, 31 Drawing Sheets

FIG. 8

| No. | M3a | M3b | M3c | M3d | M3e |
|---|---|---|---|---|---|
| 1 | 1 | 1 | 1 | 1 | 1 |
| 2 | 0 | 0 | 0 | 0 | 0 |
| 3 | 2 | 2 | 2 | 2 | 2 |
| 4 | 0 | 1 | 2 | 1 | 0 |
| 5 | 2 | 1 | 0 | 1 | 2 |
| 6 | 0 | 2 | 0 | 2 | 0 |
| 7 | 2 | 0 | 2 | 0 | 2 |
| 8 | 1 | 0 | 1 | 0 | 1 |
| 9 | 1 | 2 | 1 | 2 | 1 |
| 10 | 0 | 0 | 1 | 0 | 0 |
| 11 | 2 | 2 | 1 | 2 | 2 |
| 12 | 1 | 0 | 2 | 0 | 1 |
| 13 | 1 | 2 | 0 | 2 | 1 |
| 14 | 0 | 2 | 2 | 2 | 0 |
| 15 | 2 | 0 | 0 | 0 | 2 |
| 16 | 0 | 1 | 0 | 1 | 0 |
| 17 | 2 | 1 | 2 | 1 | 2 |
| 18 | 1 | 1 | 0 | 1 | 1 |
| 19 | 1 | 1 | 2 | 1 | 1 |
| 20 | 1 | 0 | 0 | 0 | 1 |
| 21 | 1 | 2 | 2 | 2 | 1 |
| 22 | 0 | 1 | 1 | 1 | 0 |
| 23 | 2 | 1 | 1 | 1 | 2 |
| 24 | 0 | 0 | 2 | 0 | 0 |
| 25 | 2 | 2 | 0 | 2 | 2 |
| 26 | 0 | 0 | 1 | 2 | 2 |
| 27 | 2 | 2 | 1 | 0 | 0 |
| 28 | 1 | 2 | 1 | 0 | 1 |
| 29 | 2 | 0 | 1 | 0 | 2 |
| 30 | 0 | 2 | 1 | 2 | 0 |

FIG. 9

| Symbol | 1 | 2 | 3 | 4 | 5 |
|---|---|---|---|---|---|
| RED7 | 0 | 0 | 30 | 80 | 300 |
| BLUE7 | 0 | 0 | 25 | 60 | 200 |
| ANY7 | 0 | 0 | 10 | 40 | 100 |
| 3BAR | 0 | 0 | 20 | 40 | 80 |
| 2BAR | 0 | 0 | 15 | 30 | 60 |
| 1BAR | 0 | 0 | 10 | 20 | 40 |
| ANYBAR | 0 | 0 | 5 | 10 | 25 |
| BONUS | 0 | 0 | 1 | 0 | 0 |
| CHANCE | 1 | 0 | 0 | 0 | 0 |

FIG. 10

| | M3a | | M3b | | M3c | | M3d | | M3e | |
|---|---|---|---|---|---|---|---|---|---|---|
| NO. | SYMBOL | WEIGHT | SYMBOL | WEIGHT | SYMBOL | WEIGHT | SYMBOL | WEIGHT | SYMBOL | WEIGHT |
| 0 | 1BAR | 1 | 1BAR | 4 | 2BAR | 27 | 3BAR | 4 | 1BAR | 1 |
| 1 | BLANK | 1 | BLANK | 4 | BLANK | 27 | BLANK | 4 | BLANK | 1 |
| 2 | RED7 | 3 | RED7 | 4 | RED7 | 16 | RED7 | 4 | RED7 | 2 |
| 3 | BLANK | 3 | BLANK | 4 | BLANK | 16 | BLANK | 4 | BLANK | 2 |
| 4 | BLUE7 | 3 | BLUE7 | 2 | BLUE7 | 12 | BLUE7 | 1 | BLUE7 | 3 |
| 5 | BLANK | 3 | BLANK | 2 | BLANK | 12 | BLANK | 1 | BLANK | 3 |
| 6 | 2BAR | 3 | 1BAR | 13 | 1BAR | 2 | 3BAR | 8 | 2BAR | 5 |
| 7 | BLANK | 3 | BLANK | 13 | BLANK | 2 | BLANK | 8 | BLANK | 5 |
| 8 | RED7 | 3 | BONUS | 13 | CHANCE | 2 | BONUS | 8 | RED7 | 5 |
| 9 | BLANK | 3 | BLANK | 13 | BLANK | 2 | BLANK | 8 | BLANK | 5 |
| 10 | 2BAR | 3 | 1BAR | 2 | 1BAR | 12 | 3BAR | 1 | 2BAR | 3 |
| 11 | BLANK | 3 | BLANK | 2 | BLANK | 12 | BLANK | 1 | BLANK | 3 |
| 12 | 3BAR | 3 | 2BAR | 2 | 2BAR | 12 | 1BAR | 1 | 3BAR | 3 |
| 13 | BLANK | 3 | BLANK | 2 | BLANK | 12 | BLANK | 1 | BLANK | 3 |
| 14 | BLUE7 | 3 | BLUE7 | 4 | BLUE7 | 16 | BLUE7 | 4 | BLUE7 | 2 |
| 15 | BLANK | 3 | BLANK | 4 | BLANK | 16 | BLANK | 4 | BLANK | 2 |
| 16 | RED7 | 1 | DOUBLE | 4 | RED7 | 27 | DOUBLE | 4 | RED7 | 1 |
| 17 | BLANK | 1 | BLANK | 4 | BLANK | 27 | BLANK | 4 | BLANK | 1 |
| 18 | 1BAR | 1 | 1BAR | 1 | BONUS | 27 | 3BAR | 5 | 1BAR | 6 |
| 19 | BLANK | 1 | BLANK | 1 | BLANK | 27 | BLANK | 5 | BLANK | 6 |
| 20 | 3BAR | 1 | 3BAR | 1 | 3BAR | 27 | 2BAR | 5 | 3BAR | 6 |
| 21 | BLANK | 1 | BLANK | 1 | BLANK | 27 | BLANK | 5 | BLANK | 6 |
| | | 50 | | 100 | | 360 | | 90 | | 74 |

FIG. 11

| | M3a | | M3b | | M3c | | M3d | | M3e | |
|---|---|---|---|---|---|---|---|---|---|---|
| NO. | SYMBOL | WEIGHT | SYMBOL | WEIGHT | SYMBOL | WEIGHT | SYMBOL | WEIGHT | SYMBOL | WEIGHT |
| 0 | 1BAR | 1 | 1BAR | 8 | 2BAR | 3 | 3BAR | 6 | 1BAR | 1 |
| 1 | BLANK | 1 | BLANK | 8 | BLANK | 3 | BLANK | 6 | BLANK | 1 |
| 2 | RED7 | 8 | RED7 | 8 | RED7 | 5 | RED7 | 6 | RED7 | 10 |
| 3 | BLANK | 8 | BLANK | 8 | BLANK | 5 | BLANK | 6 | BLANK | 10 |
| 4 | BLUE7 | 1 | BLUE7 | 1 | BLUE7 | 4 | BLUE7 | 1 | BLUE7 | 1 |
| 5 | BLANK | 1 | BLANK | 1 | BLANK | 4 | BLANK | 1 | BLANK | 1 |
| 6 | 2BAR | 2 | 1BAR | 4 | 1BAR | 8 | 3BAR | 8 | 2BAR | 1 |
| 7 | BLANK | 2 | BLANK | 4 | BLANK | 8 | BLANK | 8 | BLANK | 1 |
| 8 | RED7 | 2 | BONUS | 4 | CHANCE | 8 | BONUS | 8 | RED7 | 1 |
| 9 | BLANK | 2 | BLANK | 4 | BLANK | 8 | BLANK | 8 | BLANK | 1 |
| 10 | 2BAR | 1 | 1BAR | 1 | 1BAR | 4 | 3BAR | 1 | 2BAR | 1 |
| 11 | BLANK | 1 | BLANK | 1 | BLANK | 4 | BLANK | 1 | BLANK | 1 |
| 12 | 3BAR | 1 | 2BAR | 1 | 2BAR | 6 | 1BAR | 1 | 3BAR | 1 |
| 13 | BLANK | 1 | BLANK | 1 | BLANK | 6 | BLANK | 1 | BLANK | 1 |
| 14 | BLUE7 | 8 | BLUE7 | 8 | BLUE7 | 7 | BLUE7 | 6 | BLUE7 | 10 |
| 15 | BLANK | 8 | BLANK | 8 | BLANK | 7 | BLANK | 6 | BLANK | 10 |
| 16 | RED7 | 1 | DOUBLE | 8 | RED7 | 5 | DOUBLE | 6 | RED7 | 1 |
| 17 | BLANK | 1 | BLANK | 8 | BLANK | 5 | BLANK | 6 | BLANK | 1 |
| 18 | 1BAR | 1 | 1BAR | 1 | BONUS | 5 | 3BAR | 1 | 1BAR | 1 |
| 19 | BLANK | 1 | BLANK | 1 | BLANK | 5 | BLANK | 1 | BLANK | 1 |
| 20 | 3BAR | 1 | 3BAR | 1 | 3BAR | 5 | 2BAR | 1 | 3BAR | 1 |
| 21 | BLANK | 1 | BLANK | 1 | BLANK | 5 | BLANK | 1 | BLANK | 1 |
| | | 54 | | 90 | | 120 | | 90 | | 58 |

FIG. 12

| | M3a | | M3b | | M3c | | M3d | | M3e | |
|---|---|---|---|---|---|---|---|---|---|---|
| NO. | SYMBOL | WEIGHT | SYMBOL | WEIGHT | SYMBOL | WEIGHT | SYMBOL | WEIGHT | SYMBOL | WEIGHT |
| 0 | 1BAR | 1 | 1BAR | 8 | 2BAR | 4 | 3BAR | 5 | 1BAR | 1 |
| 1 | BLANK | 1 | BLANK | 8 | BLANK | 4 | BLANK | 5 | BLANK | 1 |
| 2 | RED7 | 9 | RED7 | 8 | RED7 | 8 | RED7 | 5 | RED7 | 4 |
| 3 | BLANK | 9 | BLANK | 8 | BLANK | 8 | BLANK | 5 | BLANK | 4 |
| 4 | BLUE7 | 1 | BLUE7 | 1 | BLUE7 | 7 | BLUE7 | 1 | BLUE7 | 1 |
| 5 | BLANK | 1 | BLANK | 1 | BLANK | 7 | BLANK | 1 | BLANK | 1 |
| 6 | 2BAR | 1 | 1BAR | 4 | 1BAR | 1 | 3BAR | 8 | 2BAR | 5 |
| 7 | BLANK | 1 | BLANK | 4 | BLANK | 1 | BLANK | 8 | BLANK | 5 |
| 8 | RED7 | 1 | BONUS | 4 | CHANCE | 1 | BONUS | 8 | RED7 | 5 |
| 9 | BLANK | 1 | BLANK | 4 | BLANK | 1 | BLANK | 8 | BLANK | 5 |
| 10 | 2BAR | 1 | 1BAR | 1 | 1BAR | 7 | 3BAR | 1 | 2BAR | 1 |
| 11 | BLANK | 1 | BLANK | 1 | BLANK | 7 | BLANK | 1 | BLANK | 1 |
| 12 | 3BAR | 1 | 2BAR | 1 | 2BAR | 8 | 1BAR | 1 | 3BAR | 1 |
| 13 | BLANK | 1 | BLANK | 1 | BLANK | 8 | BLANK | 1 | BLANK | 1 |
| 14 | BLUE7 | 9 | BLUE7 | 8 | BLUE7 | 9 | BLUE7 | 5 | BLUE7 | 4 |
| 15 | BLANK | 9 | BLANK | 8 | BLANK | 9 | BLANK | 5 | BLANK | 4 |
| 16 | RED7 | 1 | DOUBLE | 8 | RED7 | 5 | DOUBLE | 5 | RED7 | 1 |
| 17 | BLANK | 1 | BLANK | 8 | BLANK | 5 | BLANK | 5 | BLANK | 1 |
| 18 | 1BAR | 1 | 1BAR | 1 | BONUS | 5 | 3BAR | 3 | 1BAR | 3 |
| 19 | BLANK | 1 | BLANK | 1 | BLANK | 5 | BLANK | 3 | BLANK | 3 |
| 20 | 3BAR | 1 | 3BAR | 1 | 3BAR | 5 | 2BAR | 3 | 3BAR | 3 |
| 21 | BLANK | 1 | BLANK | 1 | BLANK | 5 | BLANK | 3 | BLANK | 3 |
| | | 54 | | 90 | | 120 | | 90 | | 58 |

FIG. 21

| | BET x1 | BET x2 | BET x3 | BET x4 | BET x5 | MAX BET |
|---|---|---|---|---|---|---|
| config_1 | 1 | 2 | 3 | 4 | 5 | 150 |
| config_2 | 1 | 2 | 3 | 5 | 10 | 300 |
| config_3 | 1 | 2 | 5 | 10 | 15 | 450 |
| config_4 | 1 | 2 | 5 | 10 | 20 | 600 |

FIG. 22

| | WIN | WEIGHT |
|---|---|---|
| HIT | 150000 | 1 |
| MISS | 0 | 299999 |
| TOTAL | | 300000 |

FIG. 23A

| NORMAL TRIGGER/ CHANCE TRIGGER BET | CHANCE PLAY BET | MULTIPLIER LOTTERY ASSIGNMENT No. | | EXIT LOTTERY ASSIGNMENT No. |
|---|---|---|---|---|
| | | MULTIPLIER LOTTERY TABLE A FOR NORMAL TRIGGER | MULTIPLIER LOTTERY TABLE B FOR CHANCE TRIGGER | |
| 1 | 1 | 12 | 12 | 6 |
| 1 | 2 | 17 | 17 | 6 |
| 1 | 3 | 19 | 19 | 6 |
| 1 | 4 | 22 | 22 | 6 |
| 1 | 5 | 22 | 22 | 7 |
| 1 | 10 | 22 | 22 | 11 |
| 1 | 15 | 22 | 22 | 13 |
| 1 | 20 | 22 | 22 | 15 |
| 2 | 1 | 7 | 7 | 6 |
| 2 | 2 | 12 | 12 | 6 |
| 2 | 3 | 15 | 15 | 6 |
| 2 | 4 | 17 | 17 | 6 |
| 2 | 5 | 18 | 18 | 6 |
| 2 | 10 | 18 | 18 | 10 |
| 2 | 15 | 18 | 18 | 12 |
| 2 | 20 | 18 | 18 | 14 |
| 3 | 1 | 5 | 5 | 6 |
| 3 | 2 | 9 | 9 | 6 |
| 3 | 3 | 12 | 12 | 6 |
| 3 | 4 | 14 | 14 | 6 |
| 3 | 5 | 16 | 16 | 6 |
| 3 | 10 | 20 | 20 | 6 |
| 3 | 15 | 20 | 20 | 9 |
| 3 | 20 | 20 | 20 | 10 |
| 4 | 1 | 2 | 2 | 6 |
| 4 | 2 | 7 | 7 | 6 |
| 4 | 3 | 10 | 10 | 6 |
| 4 | 4 | 12 | 12 | 6 |
| 4 | 5 | 13 | 13 | 6 |
| 4 | 10 | 18 | 18 | 6 |
| 4 | 15 | 21 | 21 | 6 |
| 4 | 20 | 21 | 21 | 8 |

FIG. 23B

| NORMAL TRIGGER/ CHANCE TRIGGER BET | CHANCE PLAY BET | MULTIPLIER LOTTERY ASSIGNMENT No. | | EXIT LOTTERY ASSIGNMENT No. |
|---|---|---|---|---|
| | | MULTIPLIER LOTTERY TABLE A FOR NORMAL TRIGGER | MULTIPLIER LOTTERY TABLE B FOR CHANCE TRIGGER | |
| 5 | 1 | 1 | 1 | 6 |
| 5 | 2 | 6 | 6 | 6 |
| 5 | 3 | 8 | 8 | 6 |
| 5 | 4 | 11 | 11 | 6 |
| 5 | 5 | 12 | 12 | 6 |
| 5 | 10 | 17 | 17 | 6 |
| 5 | 15 | 19 | 19 | 6 |
| 5 | 20 | 22 | 22 | 6 |
| 10 | 1 | 1 | 1 | 3 |
| 10 | 2 | 1 | 1 | 6 |
| 10 | 3 | 4 | 4 | 6 |
| 10 | 4 | 6 | 6 | 6 |
| 10 | 5 | 7 | 7 | 6 |
| 10 | 10 | 12 | 12 | 6 |
| 10 | 15 | 15 | 15 | 6 |
| 10 | 20 | 17 | 17 | 6 |
| 15 | 1 | 1 | 1 | 2 |
| 15 | 2 | 1 | 1 | 4 |
| 15 | 3 | 1 | 1 | 6 |
| 15 | 4 | 3 | 3 | 6 |
| 15 | 5 | 5 | 5 | 6 |
| 15 | 10 | 9 | 9 | 6 |
| 15 | 15 | 12 | 12 | 6 |
| 15 | 20 | 14 | 14 | 6 |
| 20 | 1 | 1 | 1 | 1 |
| 20 | 2 | 1 | 1 | 3 |
| 20 | 3 | 1 | 1 | 5 |
| 20 | 4 | 1 | 1 | 6 |
| 20 | 5 | 2 | 2 | 6 |
| 20 | 10 | 7 | 7 | 6 |
| 20 | 15 | 10 | 10 | 6 |
| 20 | 20 | 12 | 12 | 6 |

FIG. 24

| ID | MULTIPLIER | MULTIPLIER LOTTERY ASSIGNMENT No. | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 0 | 2 | 5 | 5 | 5 | 5 | 5 | 5 | 5 | 10 | 10 | 10 | 10 | 10 | 10 | 22 | 267 | 399 | 1425 | 3597 | 5366 | 6204 | 6929 | 7408 |
| 1 | 3 | 5 | 5 | 5 | 10 | 10 | 10 | 25 | 45 | 57 | 82 | 140 | 565 | 1211 | 1527 | 1882 | 2782 | 3185 | 2711 | 1803 | 1445 | 1229 | 920 |
| 2 | 4 | 5 | 10 | 10 | 20 | 30 | 50 | 60 | 141 | 218 | 328 | 464 | 746 | 1942 | 2300 | 2850 | 2830 | 2500 | 1400 | 800 | 700 | 430 | 350 |
| 3 | 5 | 10 | 20 | 20 | 40 | 50 | 100 | 120 | 404 | 450 | 1050 | 1231 | 1600 | 2430 | 2300 | 2200 | 1700 | 1300 | 900 | 610 | 400 | 220 | 180 |
| 4 | 6 | 30 | 40 | 55 | 85 | 105 | 150 | 274 | 955 | 1076 | 1542 | 1590 | 2400 | 1570 | 1400 | 1000 | 800 | 400 | 250 | 200 | 150 | 120 | 80 |
| 5 | 7 | 105 | 135 | 150 | 270 | 290 | 400 | 523 | 1285 | 1546 | 1808 | 1770 | 1600 | 1100 | 900 | 500 | 300 | 100 | 80 | 70 | 60 | 50 | 40 |
| 6 | 8 | 200 | 276 | 383 | 630 | 672 | 771 | 1394 | 2220 | 2278 | 1700 | 1600 | 1200 | 500 | 400 | 200 | 100 | 50 | 40 | 30 | 20 | 10 | 10 |
| 7 | 9 | 427 | 626 | 821 | 1121 | 1318 | 1806 | 2159 | 1390 | 1430 | 1050 | 1100 | 500 | 150 | 100 | 50 | 50 | 20 | 10 | 10 | 10 | 5 | 5 |
| 8 | 10 | 893 | 1238 | 1170 | 1469 | 1722 | 2113 | 2090 | 1100 | 1000 | 800 | 600 | 300 | 50 | 30 | 30 | 20 | 10 | 6 | 5 | 5 | 2 | 2 |
| 9 | 15 | 1200 | 1945 | 2131 | 2010 | 2000 | 1920 | 1360 | 700 | 520 | 350 | 300 | 50 | 20 | 10 | 10 | 10 | 5 | 2 | 2 | 2 | 1 | 1 |
| 10 | 20 | 1920 | 2150 | 2000 | 1600 | 1350 | 1020 | 650 | 500 | 250 | 150 | 100 | 20 | 10 | 5 | 5 | 5 | 2 | 1 | 1 | 1 | 1 | 1 |
| 11 | 30 | 2500 | 1500 | 1350 | 1050 | 900 | 550 | 200 | 180 | 120 | 100 | 80 | 5 | 4 | 3 | 3 | 2 | 1 | 1 | 1 | 1 | 1 | 1 |
| 12 | 50 | 1050 | 800 | 700 | 600 | 450 | 250 | 120 | 50 | 30 | 20 | 10 | 3 | 2 | 2 | 2 | 1 | 1 | 1 | 1 | 1 | 1 | 1 |
| 13 | 88 | 550 | 250 | 200 | 150 | 100 | 50 | 20 | 20 | 15 | 10 | 5 | 1 | 1 | 1 | 1 | 1 | 1 | 1 | 1 | 1 | 1 | 1 |
| | Total | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 |

FIG. 25

| ID | MULTIPLIER | MULTIPLIER LOTTERY ASSIGNMENT No. | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 0 | 2 | 5 | 5 | 5 | 5 | 5 | 5 | 5 | 5 | 5 | 5 | 5 | 10 | 20 | 25 | 30 | 25 | 33 | 177 | 325 | 525 | 831 | 1881 |
| 1 | 3 | 5 | 5 | 5 | 5 | 5 | 5 | 5 | 10 | 10 | 10 | 10 | 20 | 50 | 58 | 68 | 160 | 400 | 998 | 1524 | 2224 | 3180 | 2730 |
| 2 | 4 | 5 | 5 | 5 | 5 | 5 | 5 | 10 | 20 | 20 | 30 | 30 | 80 | 150 | 200 | 280 | 500 | 1000 | 1800 | 2500 | 3000 | 2600 | 2000 |
| 3 | 5 | 5 | 5 | 5 | 5 | 5 | 5 | 20 | 30 | 40 | 50 | 50 | 120 | 220 | 330 | 520 | 1000 | 1400 | 2300 | 2500 | 1900 | 1500 | 1500 |
| 4 | 6 | 5 | 5 | 5 | 5 | 5 | 40 | 65 | 105 | 125 | 155 | 155 | 250 | 400 | 800 | 1200 | 1550 | 2200 | 2000 | 1500 | 700 | 500 | 500 |
| 5 | 7 | 5 | 5 | 5 | 10 | 50 | 105 | 155 | 220 | 270 | 230 | 390 | 510 | 700 | 1050 | 1750 | 1800 | 1692 | 1000 | 400 | 400 | 200 | 200 |
| 6 | 8 | 5 | 5 | 10 | 115 | 125 | 180 | 270 | 420 | 530 | 710 | 810 | 1200 | 1410 | 1430 | 2270 | 2070 | 1308 | 800 | 150 | 150 | 100 | 100 |
| 7 | 9 | 15 | 25 | 65 | 140 | 250 | 385 | 650 | 800 | 800 | 950 | 1200 | 1880 | 2550 | 2210 | 1430 | 830 | 500 | 200 | 50 | 50 | 50 | 50 |
| 8 | 10 | 30 | 210 | 300 | 350 | 590 | 850 | 1000 | 1290 | 1660 | 1950 | 1900 | 2300 | 2540 | 2000 | 900 | 600 | 300 | 80 | 30 | 30 | 20 | 20 |
| 9 | 15 | 150 | 440 | 540 | 880 | 980 | 1010 | 1490 | 2300 | 2260 | 2500 | 2400 | 1510 | 600 | 500 | 450 | 300 | 100 | 30 | 10 | 10 | 10 | 10 |
| 10 | 20 | 405 | 900 | 1100 | 1310 | 1470 | 2040 | 2630 | 2900 | 1900 | 1300 | 1200 | 730 | 205 | 200 | 150 | 100 | 50 | 10 | 5 | 5 | 5 | 5 |
| 11 | 30 | 2310 | 3000 | 2920 | 2920 | 3060 | 2570 | 1700 | 1200 | 1000 | 700 | 800 | 300 | 100 | 100 | 50 | 50 | 10 | 4 | 3 | 3 | 2 | 2 |
| 12 | 50 | 2880 | 2590 | 2535 | 2000 | 1450 | 1300 | 700 | 400 | 350 | 300 | 200 | 100 | 50 | 30 | 15 | 10 | 5 | 2 | 2 | 2 | 1 | 1 |
| 13 | 88 | 3180 | 1800 | 1500 | 1200 | 1000 | 500 | 300 | 200 | 100 | 50 | 50 | 20 | 10 | 7 | 7 | 5 | 2 | 1 | 1 | 1 | 1 | 1 |
| | Total | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 | 9000 |

FIG. 29

| ID | | EXIT LOTTERY ASSIGNMENT No | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| 0 | EXIT | 375 | 500 | 750 | 1000 | 1125 | 1500 | 1875 | 2000 | 2250 | 3000 | 3750 | 4500 | 5625 | 6000 | 7500 | 375 |
| 1 | STAY | 14274 | 14149 | 13899 | 13649 | 13524 | 13149 | 12774 | 12649 | 12399 | 11649 | 10899 | 10149 | 9024 | 8649 | 7149 | 14274 |
| | Total | 14649 | 14649 | 14649 | 14649 | 14649 | 14649 | 14649 | 14649 | 14649 | 14649 | 14649 | 14649 | 14649 | 14649 | 14649 | 14649 |

GAMING MACHINE THAT CHANGES GAMES FROM FIRST TYPE OF GAMES TO SECOND TYPE OF GAMES

CROSS-REFERENCE TO RELATED APPLICATIONS

This application claims the benefit of Japanese Patent Application No. 2015-037848, filed on Feb. 27, 2015, which application is incorporated herein by reference in its entirety.

FIELD OF THE INVENTION

The present invention relates to a gaming machine that changes games from a first type of games having a first mode and a second mode to a second type of games having a normal mode and a special mode.

BACKGROUND OF THE INVENTION

Gaming machines develop the games by changing the games from base games to bonus games or free games. Gaming machines that provide only base games lack variation in winning pattern to get a prize; the players get bored soon. For this reason, gaming machines that develop the games from base games to bonus games or free games have appeared. In the bonus games or free games, winning patterns are different from the winning patterns in the base games and further, benefits to be provided to the players are also different; the players do not get bored soon.

For example, a gaming machine exists that develops the games from base games to advanced bonus games (such as race games or fixed-prize games), selectable bonus games, or free games (refer to US Patent Application Publication No. 2013/217466).

BRIEF SUMMARY OF THE INVENTION

The aforementioned existing gaming machine develops the games from base games to different types of bonus games so as not to bore the player. However, to increase the number of types of the games changed from base games, it is required to calculate the overall payouts with consideration of all possible change patterns. That is to say, the overall payouts need to be checked in advance in view of the payouts for the base games and the various types of bonus games, probabilities of changing to the individual types of bonus games, and probabilities of terminating the individual types of bonus games. The more the players are provided with benefit, the more the game hall loses their benefit; the more the game hall gets benefit, the more the players lose their interest. Accordingly, the benefits to the game hall and the players need to be balanced appropriately. In addressing this issue, grasping the entirety has become more difficult as the number of types of the games increases.

The present invention has been accomplished in view of the above-described issue; an object of the present invention is to provide a gaming machine that develops base games to various types of games but allows easy pre-estimation of the benefit to be provided to the players.

The first embodiment of the present invention is a gaming machine comprising:

a symbol display device capable of rearranging a plurality of kinds of symbols to show a game result; and a controller capable of executing games.

The games include:

a first type of games provided in a first mode and a second mode different from the first mode; and a second type of games different from the first type of games and provided in a normal mode and a special mode more advantageous for a player than the normal mode;

probabilities to draw the symbols in the first mode are the same as probabilities to draw the symbols in the second mode; and the controller is programmed to execute the following processing of:

(1-1) changing games from the first type in the first mode to the second type in the normal mode when a first trigger is completed in a game of the first type in the first mode;

(1-2) changing games from the first type in the first mode to the first type in the second mode when a second trigger is completed in a game of the first type in the first mode; and (1-3) changing games from the first type in the second mode to the second type in the special mode when a third trigger is completed in a game of the first type in the second mode.

The first type of games are executed in two kinds of game modes of the first mode and the second mode and the second type of games are executed in two kinds of game modes of the normal mode and the special mode, so that the gaming machine has four kinds of game modes in total. Since the probabilities to win in the first mode are the same as the probabilities to win in the second mode, the overall payouts can be determined based on the three types of winning probabilities: the winning probabilities in the first and the second modes, the winning probabilities in the normal mode, and the winning probabilities in the special mode. This configuration enables the number of game modes related to the winning probabilities to be less than the number of actually provided game modes; coordinating the payouts can be facilitated. In contrast, the games are played in four kinds of game modes; various developments of games are available by changing game modes.

The second embodiment of the present invention is the gaming machine in the first embodiment, in which, the controller is programmed to perform the following processing in each of the first type of games in the second mode:

(2-1) symbol lottery processing for determining symbols to be rearranged;

(2-2) exit lottery processing for determining whether to exit the second mode; and (2-3) returning to the first mode in a case where the exit lottery processing determines to exit the second mode and maintaining the second mode in a case where the exit lottery processing determines to stay in the second mode.

The game mode is returned from the second mode to the first mode in accordance with the exit lottery processing performed separately from the symbol lottery processing; whether to exit or stay in the second mode can be controlled only by the exit lottery processing. In contrast, the symbol lottery processing in the first mode and the symbol lottery processing in the second mode merely determine symbols; symbols can be determined through processing common to the first mode and the second mode, independently from the control of changing the game mode from the second mode to the first mode.

The third embodiment of the present invention is the gaming machine in the second embodiment, which further comprises a memory holding a multiplier lottery table for determining a multiplier for game results of a series of games of the second type in the special mode. In the gaming machine, each of the first type of games is started with a bet;

each of the second type of games is started with a bet in a game of the first type at determination to change games from the first type to the second type;

the second trigger has a probability to be completed in any of the first type of games in the first mode, the first type of games in the second mode, the second type of games in the normal mode, and the second type of games in the special mode; and multipliers in the multiplier lottery table are specified in relation to amounts of bet at completion of the second trigger, amounts of bet at completion of the third trigger, and modes at determination to change games to the second type.

The first type of games can be played with a bet operation of the player, in either the first mode or the second mode. For this reason, the player can play games with a lower bet in the first mode and play games with a higher bet in the second mode. Playing the games in the second mode with a higher bet enables the payout to be increased by a multiplier if the game mode changes from the second mode to the special mode. If a player gains a benefit more than being expected by using a strategy of saving the gaming media in the first mode and increasing the bet in the second mode to get more payout, the game hall might experience a significant loss.

Contrarily, when the player plays games in the first mode with a higher bet and plays games in the second mode with a lower bet, the player will receive only a small benefit.

To address this issue, multipliers are determined depending on the amount of bet (the amount of bet in the second mode) at completion of the second trigger, the amount of bet (the amount of bet in the special mode) at completion of the third trigger, and the mode (the first mode or the second mode) at determination to change the games to the second type of games. This configuration enables determination of the multiplier in accordance with the previous bets and the previous game mode to provide the player with an appropriate benefit in accordance with the history of playing games.

The fourth embodiment of the present invention is the gaming machine in the third embodiment, in which, the memory further holds an exit lottery table to be referenced in the exit lottery processing to determine whether to exit the second mode; and the exit lottery table is specified correspondingly to amounts of bet at completion of the second trigger and amounts of bet at completion of the third trigger.

Whether to exit the second mode is determined in accordance with the history of playing games; the benefit to be provided to the player can be controlled depending on not only the multiplier but also whether to exit or stay in the second mode.

The present invention enables developing base games into various types of games and further, allows easy pre-estimation of the benefit to be provided to the players.

These and other aspects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIG. 8 is an example of a payline definition table for defining paylines;

FIG. 9 is an example of a payout table;

FIG. 10 is an example of a symbol determination table indicating weights in base game mode and chance zone;

FIG. 11 is an example of a symbol determination table indicating weights in normal free game mode;

FIG. 12 is an example of a symbol determination table indicating weights in special free game mode;

FIG. 21 is a table for providing patterns of multipliers for the prize;

FIG. 22 is a table indicating weights for Mystery Prize;

FIGS. 23A and 23B are an example of a lottery assignment number determination table for determining a multiplier lottery assignment number and an exit lottery assignment number;

FIG. 24 is an example of a multiplier lottery table for normal trigger;

FIG. 25 is an example of a multiplier lottery table for chance trigger;

FIG. 29 is an example of an exit lottery table; and

DETAILED DESCRIPTION OF THE PREFERRED EMBODIMENT

Figure 1:
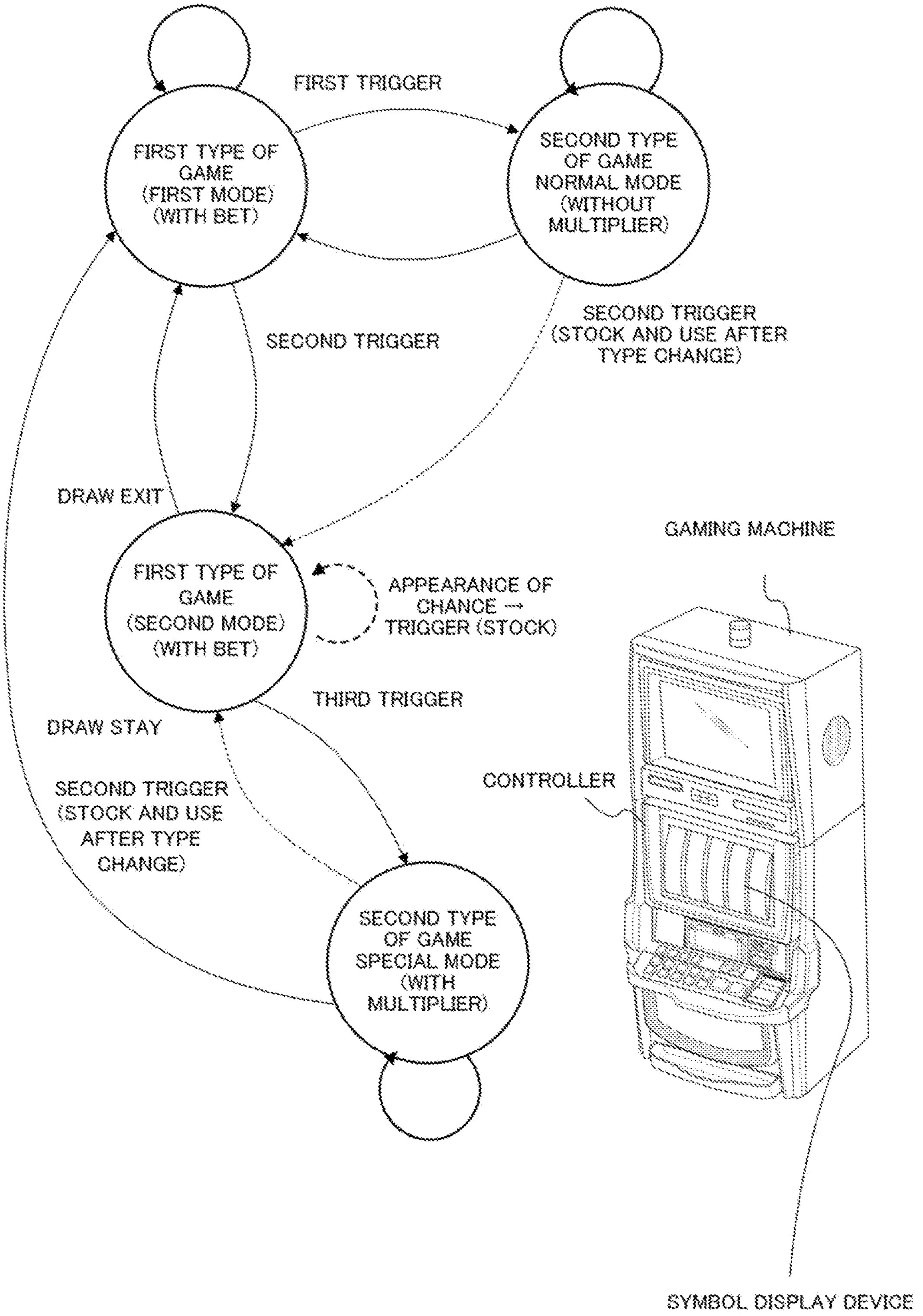
FIG. 1 is a diagram for illustrating a general representation of a gaming machine in an embodiment of the present invention and an outline of transitions of the game mode in the gaming machine.

Hereinafter, an embodiment is described based on the drawings. FIG. 1 is a diagram for illustrating a general representation of a gaming machine in the present embodiment and the outline of transitions of the game mode in the gaming machine.

The gaming machine in the present embodiment is a gaming machine (e.g., a slot machine 10 to be described later) comprising:

a symbol display device (e.g., a reel device M1 to be described later) capable of rearranging a plurality of kinds of symbols to show a game result; and a controller (e.g., a main CPU 222 to be described later) capable of executing games.

In the gaming machine, the games include:

a first type of games provided in a first mode (e.g., base game mode to be described later) and a second mode (e.g., chance zone to be described later) different from the first mode; and a second type of games different from the first type of games and provided in a normal mode (e.g., normal free game mode to be described later) and a special mode (e.g., special free game mode to be described later) more advantageous for a player than the normal mode;

probabilities to draw the symbols in the first mode are the same as probabilities to draw the symbols in the second mode (e.g., a symbol determination table in FIG. 10, which will be described later); and the controller is programmed to perform the following processing of:

(1-1) changing games from the first type in the first mode to the second type in the normal mode when a first trigger is completed in a game of the first type in the first mode (e.g., steps S1437 and S1913 to be described later);

(1-2) changing games from the first type in the first mode to the first type in the second mode when a second trigger is completed in a game of the first type in the first mode (e.g., steps S1425 and S1429 to be described later); and (1-3) changing games from the first type in the second mode to the second type in the special mode when a third trigger is completed in a game of the first type in the second mode (e.g., steps S1437 and S1913 to be described later).

As illustrated in FIG. 1, the gaming machine includes a symbol display device and a controller.

The symbol display device rearranges a plurality of kinds of symbols to show a game result. The controller executes games.

The games include a first type of games and a second type of games. The first type of games are provided in a first mode and a second mode. The second type of games are provided in a normal mode and a special mode.

The probabilities to draw the symbols in the first type of games in the first mode are the same as the probabilities to draw the symbols in the first type of games in the second mode.

The controller changes games from the first type in the first mode to the second type in the normal mode when a first trigger is completed in a game of the first type in the first mode.

The controller changes games from the first type in the first mode to the first type in the second mode when a second trigger is completed in a game of the first type in the first mode.

The controller changes games from the first type in the second mode to the second type in the special mode when a third trigger is completed in a game of the first type in the second mode.

The games executed by the controller have four kinds of game modes. Specifically, the first type of games are executed in two kinds of game modes of the first mode and the second mode and the second type of games are executed in two kinds of game modes of the normal mode and the special mode.

Since the probabilities to win in the first mode are the same as the probabilities to win in the second mode, the overall payouts can be determined based on the three types of winning probabilities: the winning probabilities in the first and the second modes, the winning probabilities in the normal mode, and the winning probabilities in the special mode. This configuration enables the number of game modes related to the winning probabilities to be less than the number of actually provided game modes; coordination of the payouts can be facilitated.

In contrast, the player actually play games in four kinds of game modes; various developments of games are available by changing game modes.

Consequently, facilitating coordination of payouts and variety in games can be attained together.

Furthermore, in the gaming machine in the present embodiment, the controller performs the following processing of:

symbol lottery processing for determining symbols to be rearranged (e.g., step S1417 to be described later);

exit lottery processing for determining whether to exit the second mode (e.g., step S2015 to be described later); and returning to the first mode in a case where the exit lottery processing determines to exit the second mode (e.g., steps S2017 and S2019 to be described later) and maintaining the second mode in a case where the exit lottery processing determines to stay in the second mode (e.g., step S2017 to be described later).

Since the exit lottery processing is executed separately from the symbol lottery processing, whether to exit or stay in the second mode can be determined independently from the determination of symbols, so that game mode change can be controlled only in accordance with the exit lottery processing. This configuration prevents the payout in the second mode from becoming extremely small or large, facilitating balancing the benefit for the player and the benefit for the game hall.

The symbol lottery processing in the first mode and the symbol lottery processing in the second mode merely determine symbols; symbols can be determined through processing common to the first mode and the second mode, independently from the control of changing the game mode from the second mode to the first mode.

The gaming machine in the present embodiment further comprises a memory (e.g., a RAM 226 to be described later) holding a multiplier lottery table for determining a multiplier for game results of a series of games of the second type in the special mode.

In the gaming machine, each of the first type of games is started with a bet (e.g., step S1415 to be described later);

each of the second type of games is started with a bet in a game of the first type at determination to change games from the first type to the second type (e.g., steps S1431, S1435, and S1911, which will be described later);

the second trigger has a probability to be completed in any of the following games:

the first type of games in the first mode (e.g., step S1425 to be described later), the first type of games in the second mode (e.g., step S1425 to be described later), the second type of games in the normal mode (e.g., step S1955 to be described later), and the second type of games in the special mode (e.g., step S1955 to be described later); and multipliers (e.g., special multipliers to be described later) in the multiplier lottery table are specified in relation to the followings (e.g., a lottery assignment number determination table in FIGS. 23A and 23B and multiplier lottery tables in FIGS. 24 and 25, which will be described later):

amounts of bet at completion of the second trigger (e.g., normal trigger bets or chance trigger bets to be described later), amounts of bet at completion of the third trigger (e.g., chance play bets to be described later), and modes at determination to change games to the second type (e.g., a normal trigger or chance trigger to be described later).

The gaming machine further includes a memory. The memory holds a multiplier lottery table. The controller determines the multiplier to be applied to the game results of a series of games of the second type in the special mode with reference to the multiplier lottery table. Each game result includes, for example, whether a winning pattern is completed and a prize for completion of a winning pattern.

The first type of games require a bet to be started. That is to say, in either the first mode or the second mode, a bet is required.

A series of games of the second type are games to be started with the bet in the first type of game when the games are changed from the first type of games. That is to say, in either the normal mode or the special mode, the bet in the last first type of game before the mode change is maintained.

As described above, there are four kinds of game modes in total, namely, (1) the first type of games in the first mode, (2) the first type of games in the second mode, (3) the second type of games in the normal mode, and (4) the second type of games in the special mode. The second trigger can be completed in any of these four kinds of game modes.

The multipliers (special multipliers) in the multiplier lottery table are specified based on the amount of bet (normal trigger bet or chance trigger bet) when the second trigger is completed, the amount of bet (chance play bet) when the third trigger is completed, and the mode (normal trigger or chance trigger) at determination of change to the second type of games (the lottery assignment number determination table in FIGS. 23A and 23B and the multiplier lottery tables in FIGS. 24 and 25).

The first type of games can be played with a bet operation of the player, in either the first mode or the second mode. For this reason, the player can play games with a lower bet in the first mode and play games with a higher bet in the second mode. Playing the games in the second mode with a higher bet enables the payout to be increased by a multiplier (special multiplier) if the game mode changes from the second mode to the special mode. If a player gains a benefit more than being expected by using a strategy of saving the gaming media in the first mode and increasing the bet in the second mode to get more payout, the game hall might experience a significant loss.

Contrarily, when the player plays games in the first mode with a higher bet and plays games in the second mode with a lower bet, the player will receive only a small benefit.

For this reason, multipliers are determined depending on the amount of bet (the amount of bet in the second mode) at completion of the second trigger, the amount of bet (the amount of bet in the special mode) at completion of the third trigger, and the mode (the first mode or the second mode) at determination to change games to the second type. This configuration enables determination of the multiplier in accordance with the previous bets and the previous game mode to provide the player with an appropriate benefit in accordance with the history of playing games.

Still further, in the gaming machine in the present embodiment, the memory (e.g., the RAM 226 to be described later) further holds an exit lottery table (e.g., the exit lottery table in FIG. 29 to be described later) to be referenced in the exit lottery processing to determine whether to exit the second mode; and the exit lottery table is specified correspondingly to amounts of bet at completion of the second trigger (e.g., the normal trigger bet or the chance trigger bet, which will be described later) and amounts of bet at completion of the third trigger (e.g., the chance play bet to be described later).

Whether to exit the second mode is determined in accordance with the history of playing games; the benefit to be provided to the player can be controlled depending on not only the multiplier (the special multiplier) but also whether to exit or stay in the second mode.

Still further, it is preferable that the controller store second trigger completion information to the memory when the second trigger is completed. The second trigger completion information includes:

an amount of bet when the second trigger is completed;

an amount of bet when the third trigger is completed; and a mode when change to the second type of games is determined.

Since the second trigger completion information is stored at the completion of the second trigger, the controller can retrieve the second trigger completion information from the memory in changing games to the first type of games in the second mode and use the second trigger completion information to determine the multiplier (special multiplier) to be applied to game results of a series of games of the second type in the special mode and whether to exit the second mode.

Still further, when the second trigger is completed in a game of the first type in the first mode, the controller immediately changes games to the first type of games in the second mode;

when the second trigger is completed in a game of the first type in the second mode, the controller stores (stocks) information on completion of the second trigger to the memory and changes (repeats) games to the first type of games in the second mode in response to satisfaction of a requirement to exit the first type of games in the second mode;

when the second trigger is completed in a game of the second type in the normal mode, the controller stores (stocks) information on completion of the second trigger to the memory and changes games to the first type of games in the second mode in response to satisfaction of a requirement to exit the second type of games in the normal mode; and when the second trigger is completed in a game of the second type in the special mode, the controller stores (stocks) information on completion of the second trigger to the memory and changes games to the first type of games in the second mode in response to satisfaction of a requirement to exit the second type of games in the special mode.

In a game of the first type in the second mode, a game of the second type in the normal mode, or a game of the second type in the special mode, information on the completion of the second trigger is stored in the memory and games are continued until exit requirements are satisfied. Not immediately changing the games to the first type of games in the second mode allows the player to be assured of a benefit before the change. Furthermore, storing information on the completion of the second trigger enables retrieval of the information on the completion of the second trigger after the change to control the progress of the games.

Still further, it is preferable that the controller store information on completion of the second trigger in the time-series order every time the second trigger is completed.

Even if the second trigger is completed for a plurality of times, the controller stores information on completion of the second trigger each time; the first type of games in the second mode can be conducted without omission based on the information on completion of the second trigger at the time of the completion of the second trigger, assuring the player of the chance to receive a benefit.

Still further, in changing the games to the first type of games in the second mode, the controller retrieves the information on completion of the second trigger stored in the memory earlier.

This configuration enables the controller to use older information on completion of the second trigger first.

<<<Basic Concept>>>

A slot machine 10 is a kind of gaming machine. The present embodiment describes the slot machine 10 as an example of a gaming machine; however, the gaming machine is not limited to this. The slot machine 10 provides games in base game mode (the first type of games in the first mode), games in chance zone (the first type of games in the second mode), normal free games (the second type of games in the normal mode), and special free games (the second type of games in the special mode).

The requirements for the slot machine 10 are satisfied if the apparatus is capable of changing the game mode from base game mode to normal free game mode, from chance zone to special free game mode, from base game mode, normal free game mode, or special free game mode to chance zone, and from chance zone to chance zone (maintaining the chance zone). The requirements for the chance zone, normal free game mode, and special free game mode are satisfied if the individual game modes are different from the base game mode.

In the present embodiment, a game conducted in the base game mode is referred to as base game. A game conducted in the normal free game mode or the special free game mode is referred to as free game. A game conducted in the chance zone is referred to as chance zone game. The base game, the chance zone game, and the free game are slot games that rearrange a plurality of symbols. The base game, the chance zone game, and the free game are repeatable unit games. The chance zone game and the free game function as feature games.

Upon start of a unit game in base game mode, chance zone, or free game mode, to-be stopped symbols are determined by lottery. One to-be stopped symbol is determined for each of five mech reels M3*a* to M3*e*.

Subsequently, an arrangement of a set of symbols is released. The releasing the arrangement of symbols starts to show the symbols as being shuffled (scrolling of the symbol arrays to be described later). After a predetermined time, the to-be stopped symbols are stopped at predetermined base positions (displayed in a stopped state). Stopping the five to-be stopped symbols rearranges another set of symbols in the display window 150. Rearranging the symbols provides the result of the unit game in the display window 150. In the present embodiment, stopping and showing symbols mean appearance of the symbols and rearranging the symbols in the display window 150.

Rearranging means an action of arranging symbols in the display window 150 after releasing an arrangement of symbols. An arrangement of a set of symbols is released by starting a unit game (slot game) and subsequently, another set of symbols are arranged again (rearranged). The rearranged symbols determine a result of the unit game to terminate the unit game. Arrangement means a state in which symbols can be visibly identified by the player.

The requirements for symbols are satisfied if the symbols can be rearranged in the display window 150 of a reel device M1 to be visibly identified by the player; they are not limited in kind or number.

The base game mode and the chance zone are game modes to conduct a unit game (base game or chance zone game) under the condition that some gaming value is bet. Each unit game rearranges symbols in the display window 150 and provides a prize depending on the rearranged symbols. The base game and the chance zone game are not limited to slot games and satisfy the requirements if each game can be independently conducted in a game terminal (gaming machine) like the slot machine 10.

The gaming value includes coins, bills, and electronically valuable information equivalent to coins or bills. The gaming value in the present embodiment is not specifically limited and can be gaming media such as medals, tokens, electronic money, and tickets. The tickets are not specifically limited and can be tickets with barcodes.

The requirements for the chance zone game, normal free game, and special free game are satisfied if the games are different from the base game and provide the player with a chance to get more benefit than the base game.

<<<<Specific Overview of Slot Machine in Present Embodiment>>>>

An overview of a slot machine in the present embodiment is as follows. Details are described later.

<Mech Reels M3*a*, M3*b*, M3*c*, M3*d*, and M3*e*>

The slot machine 10 has five mech reels M3*a*, M3*b*, M3*c*, M3*d*, and M3*e* from the left to the right as seen from the player. The five mech reels M3*a* to M3*e* are mechanically controlled to rotate and stop with electric motors. In the slot machine 10, symbols on each of the five mech reels M3*a* to M3*e* are stopped at three rows: the top row, the middle row, and the bottom row. When the five mech reels M3*a* to M3*e* are stopped, fifteen symbols in total (=5 reels×3 rows) are rearranged in the display window 150 of the reel device M1 (see FIG. 3)

The symbols disposed on the five mech reels M3*a* to M3*e* are partially shown in the display window 150 of the reel device M1. A plurality of symbols are disposed along the longitudinal direction of each of the five mech reels M3*a* to M3*e*.

<Stop Positions of Symbols>

In the display window 150, three rows of the top row (the first row), the middle row (the second row), and the bottom row (the third row) are defined along each mech reel M3 as stop positions of symbols. Accordingly, when the five mech reels M3*a* to M3*e* (five reel strips) are stopped, symbols of 5 reels×3 rows (5 columns by 3 rows), or fifteen symbols in total, are rearranged in the display window 150.

As described above, fifteen stop positions of 5 reels×3 rows are defined in the display window 150. The fifteen stop positions correspond to fifteen cells to show symbols. Stopping a symbol at each of the fifteen stop positions (cells) leads to rearranging fifteen symbols.

Rearranging Fifteen Symbols Results in Formation of a Symbol Matrix.

<Kinds of Symbols>

The slot machine 10 in the present embodiment has the following kinds of symbols: WILD (wild symbol), RED7, BLUE7, 3BAR, 2BAR, 1BAR, BONUS (trigger or retrigger symbol for free game mode), CHANCE (trigger symbol for chance zone), and BLANK (blank symbol).

The WILD (wild symbol), the BONUS (trigger or retrigger symbol for free game mode), the CHANCE (trigger symbol for chance zone), and the BLANK (blank symbol) function as special symbols. The symbols other than the special symbols are normal symbols.

The WILD is a kind of symbol to be a substitute for another kind of symbol. To make a higher-ranked winning pattern, a WILD is replaced with another kind of symbol. In the symbol determination tables shown in FIGS. 10 to 12, the WILD is denoted as DOUBLE. When a payline making a winning pattern includes one DOUBLE, the prize is doubled; when the payline includes two DOUBLEs, the prize is quadrupled.

The trigger symbol is a kind of symbol to trigger a mode change from base game mode to normal free game mode. The trigger symbol also triggers a mode change from chance zone to special free game mode. The retrigger symbol is a kind of symbol to be a retrigger to maintain normal free game mode or special free game mode.

In normal free game mode or special free game mode, at least one kind of special symbols of trigger symbol, retrigger symbol, and wild symbol may be increased. The trigger symbol or retrigger symbol may function to increase games to be played in normal free game mode or special free game mode.

The BONUS of trigger symbol and retrigger symbol is a scatter symbol. When a predetermined number, for example three, of BONUSes are determined to appear in the display window 150 in symbol lottery processing, even if the BONUSes are not continuously arranged from left to right, a winning pattern is completed. For example, when one BONUS on the mech reel M3*b*, one BONUS on the mech reel M3*c*, and one BONUS on the mech reel M3*d* are determined to appear in the display window 150, a winning pattern is completed.

The CHANCE (trigger symbol for chance zone) is a symbol to trigger a mode change from base game mode, normal free game mode, or special free game mode to chance zone or to maintain chance zone. The CHANCE is also a scatter symbol. Accordingly, when a predetermined number, for example one, of CHANCE is determined to appear in the display window 150 in symbol lottery processing, even if CHANCEs are not continuously arranged from left to right, a winning pattern is completed. For example, when one CHANCE on the mech reel M3*c* is determined to appear in the display window 150, a winning pattern is completed.

The BLANK is a kind of symbol that will not be a constituent of a winning pattern. Accordingly, when a plurality of BLANKs are arranged at active stop positions, they do not function as normal symbols to form a winning pattern. The active stop positions will be described later. The BLANK does not function as a scatter symbol, either; even if a plurality of BLANKs are shown, they do not form a winning pattern.

In the present embodiment, BLANKs do not include any picture or mark, making the player see that the BLANKs do not form a winning pattern. BLANKs are preferably in a single color, but include areas that can be regarded as a single-colored area such that, even if some decorative pattern or picture is provided therein, most of the area is in a single color or otherwise, the pattern or picture is pale-colored.

The symbols other than the special symbols are normal symbols. When normal symbols complete a winning pattern, a payout in the amount in accordance with the prize for the winning pattern is paid out.

<Payline>

The slot machine 10 has thirty paylines in the display window 150 (see FIG. 8). Whether any winning pattern is completed is determined depending on the kind and the number of symbols lined along each payline. In the slot machine 10, the thirty paylines are always active independent from the multiplier for the prize. Accordingly, even if the multiplier for the prize is 1 (the smallest multiplier), all the thirty paylines are active.

In FIG. 8, "0" represents the top row (first row), "1" represents the middle row (second row), and "2" represents the bottom row (third row). For example, the payline No. 5 is a payline connecting the bottom row-the middle row-the top row-the middle row-the bottom row of the mech reels M3*a*, M3*b*, M3*c*, M3*d*, and M3*e*, respectively.

<Multiplier and Bet>

FIG. 21 is a table for providing patterns of multipliers for the prize. FIG. 21 shows a combination of multipliers specified for each of config_1 to config_4. Hereinafter, config_1 is referred to as first configuration pattern, config_2 as second configuration pattern, config_3 as third configuration pattern, and config_4 as fourth configuration pattern.

The slot machine 10 has four configuration patterns of multipliers for the prize: (1) 1, 2, 3, 4, and 5 (the first configuration pattern), (2) 1, 2, 3, 5, and 10 (the second configuration pattern), (3) 1, 2, 5, 10, and 15 (the third configuration pattern), and (4) 1, 2, 5, 10, and 20 (the fourth configuration pattern). These numerals are multipliers for each payline. One of the four configuration patterns is set to the slot machine 10 by, for example, a staff of a game hall such as a casino.

The multiplier for the prize is determined by the player through operation of one of the five buttons of a BET ×1 button 74, a BET ×2 button 75, a BET ×3 button 76, a BET ×4 button 77, and a BET ×5 button 78 (see FIG. 4) before starting a unit game.

According to the first configuration pattern, when the BET ×1 button 74 is operated, the multiplier is determined to be 1. When the BET ×2 button 75 is operated, the multiplier is determined to be 2. When the BET ×3 button 76 is operated, the multiplier is determined to be 3. When the BET ×4 button 77 is operated, the multiplier is determined to be 4. When the BET ×5 button 78 is operated, the multiplier is determined to be 5.

According to the second configuration pattern, when the BET ×1 button 74 is operated, the multiplier is determined to be 1. When the BET ×2 button 75 is operated, the multiplier is determined to be 2. When the BET ×3 button 76 is operated, the multiplier is determined to be 3. When the BET ×4 button 77 is operated, the multiplier is determined to be 5. When the BET ×5 button 78 is operated, the multiplier is determined to be 10.

According to the third configuration pattern, when the BET ×1 button 74 is operated, the multiplier is determined to be 1. When the BET ×2 button 75 is operated, the multiplier is determined to be 2. When the BET ×3 button 76 is operated, the multiplier is determined to be 5. When the BET ×4 button 77 is operated, the multiplier is determined to be 10. When the BET ×5 button 78 is operated, the multiplier is determined to be 15.

According to the fourth configuration pattern, when the BET ×1 button 74 is operated, the multiplier is determined to be 1. When the BET ×2 button 75 is operated, the multiplier is determined to be 2. When the BET ×3 button 76 is operated, the multiplier is determined to be 5. When the BET ×4 button 77 is operated, the multiplier is determined to be 10. When the BET ×5 button 78 is operated, the multiplier is determined to be 20.

As mentioned above, the thirty paylines are always active. Accordingly, the total amounts of bets in the first configuration pattern are 30, 60, 90, 120, and 150. The total amounts of bets in the second configuration pattern are 30, 60, 90, 150, and 300. The total amounts of bets in the third configuration pattern are 30, 60, 150, 300, and 450. The total amounts of bets in the fourth configuration pattern are 30, 60, 150, 300, and 600.

The MAX BET in FIG. 21 indicates the maximum total amounts of bets in the first to the fourth configuration patterns.

<Completion of Winning Pattern>

The normal symbols of the slot machine 10 are RED7, BLUE7, 3BAR, 2BAR, and 1BAR. As to these RED7, BLUE7, 3BAR, 2BAR, and 1BAR, whether a winning pattern is completed is determined on a left-to-right basis. Whether a winning pattern is completed is determined depending on the number of a specific kind of symbols continuously arranged along each payline from left to right.

That is to say, the kind and the number of symbols arranged along a payline continuously from the leftmost mech reel M3*a* toward the rightmost mech reel M3*e* determines a prize. Accordingly, the same kind of symbols arranged along a payline continuously from the mech reel M3*b*, M3*c*, or M3*d* do not complete any winning pattern; no prize is awarded.

Winning patterns of nine kinds of symbols are defined as shown in FIG. 9 to be described later. Details of the winning patterns will be described later. When two kinds of RED7 and BLUE7 symbols are mixed and continuously arranged along a payline, the kind of symbols is regarded as ANY7; a specified prize is awarded.

When two or three kinds of symbols out of 3BARs, 2BARs, and 1BARs are mixed and continuously arranged along a payline, the kind of symbols is regarded as ANY-BAR; a specified prize is awarded.

The BONUS and the CHANCE are scatter symbols. Accordingly, when a specified number of BONUSes or CHANCEs are shown in the display window 150, a winning pattern is completed even if they are not continued from left to right.

BONUSes are disposed only on the mech reels M3*b*, M3*c*, and M3*d*. A CHANCE is disposed only on the mech reel M3*c*.

<Normal Free Game Mode>

Three BONUSes shown in the display window 150 in base game mode complete a normal free game trigger, so that the base game mode changes to normal free game mode.

In the normal free game mode, the player can basically play five unit games (normal free games). The games in the normal free game mode can be played with the amount of bet in the base game mode at the time of triggering the normal free game mode.

Three BONUSes shown in the normal free game mode retrigger the normal free game mode. The completion of the retrigger results in addition of five more unit games (normal free games).

The normal free game mode uses special reel weights for normal free game mode (see FIG. 11). Accordingly, in the normal free game mode, symbols are determined by lottery with the probabilities (weights) specified in FIG. 11.

When exiting the normal free game mode, Mystery Prize may be provided.

<Special Free Game Mode>

Three BONUSes shown in the display window 150 in chance zone complete a special free game trigger, so that the chance zone changes to special free game mode.

In the special free game mode, the player can basically play five unit games (special free games). The games in the special free game mode can be played with the amount of bet in the chance zone at the time of triggering the special free game mode.

Three BONUSes shown in the special free game mode retrigger the special free game mode. The completion of the retrigger results in addition of five more unit games (special free games).

The special free game mode uses special reel weights for special free game mode (see FIG. 12). Accordingly, in the special free game mode, symbols are determined by lottery with the probabilities (weights) specified in FIG. 12.

When entering the special free game mode, the slot machine 10 determines a multiplier (hereinafter, referred to as special multiplier) by lottery. The special multiplier is multiplied by the prize determined in each unit game in the special free game mode.

Like in normal free game mode, Mystery Prize may be provided when exiting the special free game mode. However, the Mystery Prize is not multiplied by the special multiplier.

<Chance Zone>

One CHANCE shown in the display window 150 in base game mode, normal free game mode, or special free game mode completes a chance zone trigger, so that the game mode changes to chance zone.

One CHANCE shown in the display window 150 in the chance zone completes another chance zone trigger (a retrigger), so that the chance zone is maintained.

In the chance zone, a unit game is started in response to a bet operation of the player like in the base game mode. The player can change the amount of bet in each unit game. Three BONUSes shown in the chance zone triggers special free game mode.

At every end of a unit game in the chance zone, a lottery is conducted to determine “exit” or “stay”. If the lottery selects exit, the slot machine 10 terminates the chance zone and returns to base game mode. If the lottery selects stay, the slot machine 10 maintains the chance zone.

The chance zone uses the weights same as those for the base game mode (see FIG. 10). Accordingly, in the chance zone, symbols are determined by lottery with the probabilities (weights) same as those in the base game mode.

<Mystery Prize>

When exiting either normal free game mode or special free game mode, the slot machine 10 conducts a lottery. In the case of a hit, the slot machine 10 provides Mystery Prize.

FIG. 22 is a table indicating the weights for the Mystery Prize. The weight to hit the Mystery Prize is 1 and the weight to miss is 299999. Accordingly, the probability to hit the Mystery Prize is 1/300000 and the probability to miss is 29999/300000. As mentioned above, the Mystery Prize is not multiplied by the special multiplier.

The highest prize that could be provided to a player may be announced. If the probability of winning the announced highest prize is extremely low, the announcement might be judged to be inappropriate; it is preferable to set the probability of winning the highest prize not to be lower than a certain level. As will be described later, the special multiplier in the special free game mode is 2 to 88. Assuming that the highest prize is provided when the special multiplier is the highest 88 and a winning pattern of five RED7s inclusive of two WILDs, if the probability of satisfying these conditions is lower than a certain level, the announcement might be accused. Providing the Mystery Prize and setting the probability of winning the Mystery Prize higher than a certain level can eliminate this problem.

<<Overall Game System>>

Figure 2:
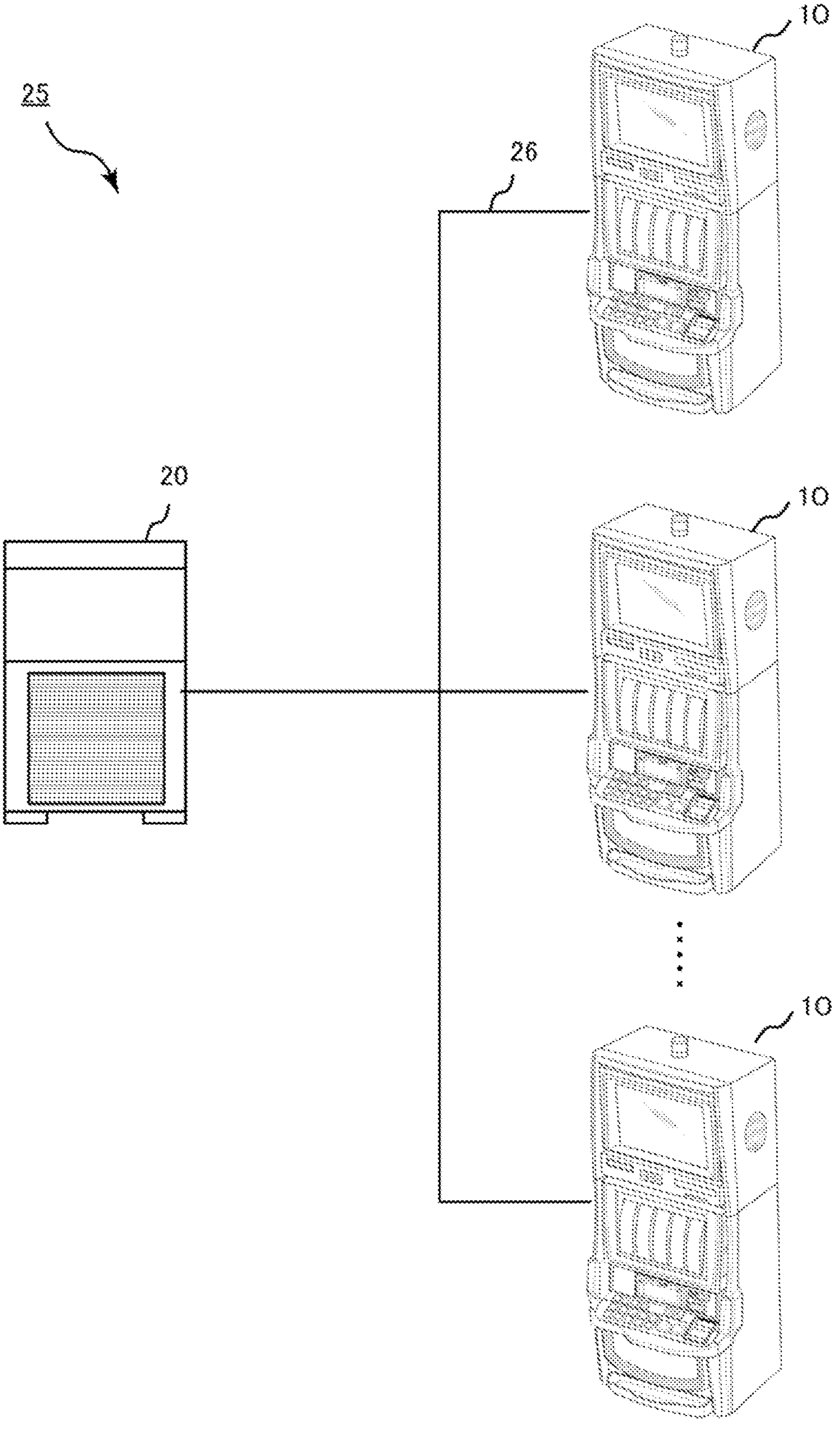
FIG. 2 is a diagram for illustrating a game system including a slot machine.

FIG. 2 is a diagram for illustrating a general representation of a game system including the slot machine 10.

The game system 25 includes a plurality of slot machines 10 and an external control apparatus 20 connected with the slot machines 10 via a communication line 26.

The external control apparatus 20 controls the slot machines 10. In the present embodiment, the external control apparatus 20 is a so-called hall server installed in a game hall having the slot machines 10. Each slot machine 10 is assigned a unique identification number. The external control apparatus 20 identifies the source of data sent from a slot machine 10 with the identification number. In sending data to a slot machine 10, the external control apparatus 20 specifies the destination with the identification number.

The game system 25 may be constructed in a single game hall providing various games, such as a casino, or may be constructed among a plurality of game halls. In the case of a single game hall, the game system 25 may be constructed on each floor or in each section. The communication line 26 may be either wired or wireless, and either a private line or a switched line.

<<<Configuration of Slot Machine 10>>>

Figure 3:
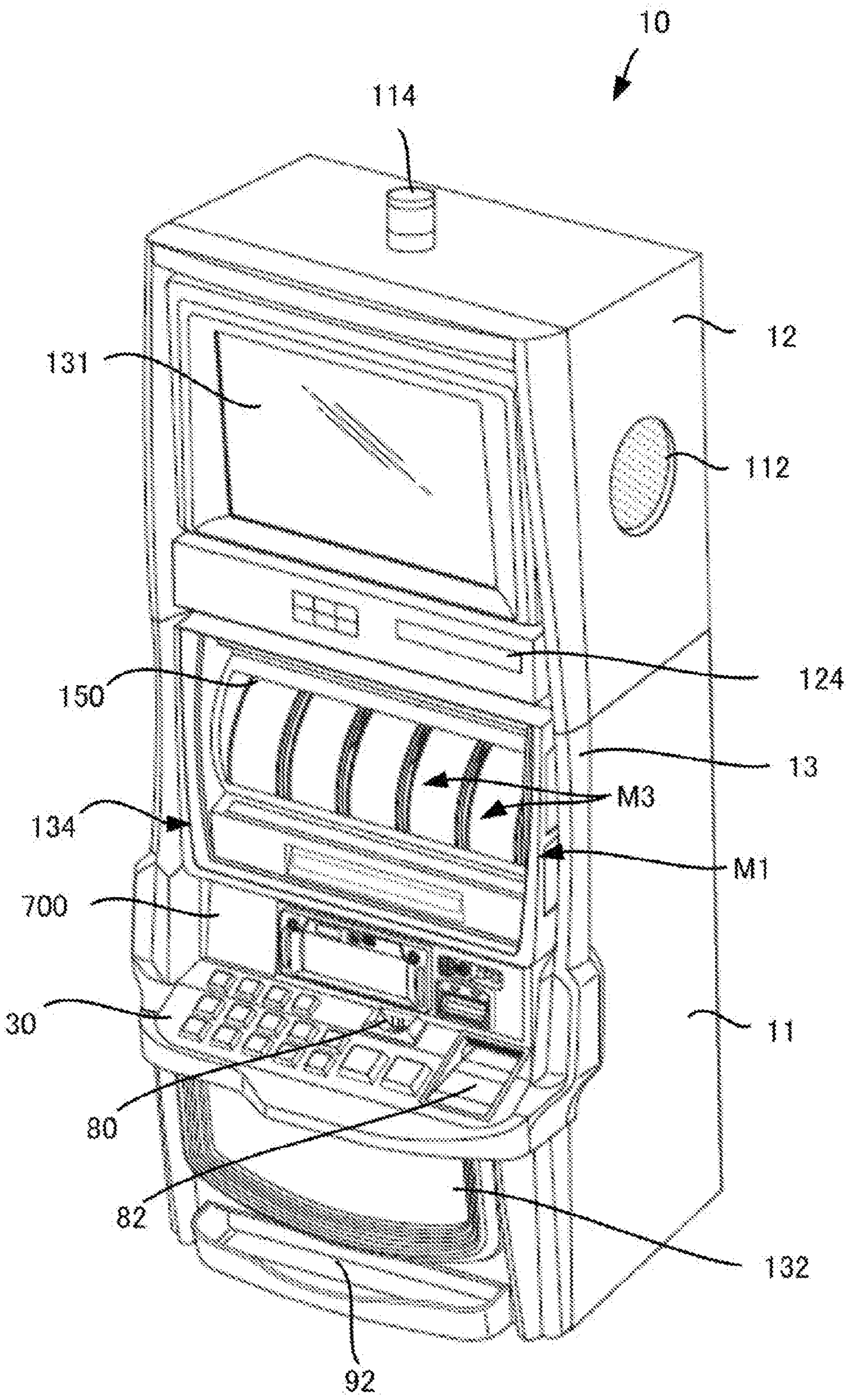
FIG. 3 is a diagram for illustrating an overall configuration of the slot machine.

FIG. 3 is a diagram for illustrating an overall configuration of the slot machine 10 in the present embodiment.

The slot machine 10 accepts coins, bills, and electronic variable information equivalent to these as gaming media. In the present embodiment, the slot machine 10 also accepts tickets with barcodes. The gaming media are not limited to the foregoing, but medals, tokens, and electronic money can also be employed.

The slot machine 10 includes a cabinet 11, a top box 12 placed above the cabinet 11, and a main door 13 provided on the front of the cabinet 11.

A reel device M1 is provided on the main door 13. The reel device M1 includes a reel cover 134 attached on the front of the reel device M1. The reel cover 134 has a display window 150 at the center thereof as shown in FIG. 3.

In the present embodiment, three stop positions for the symbols are defined for each of the mech reels M3*a* to M3*e* in the display window 150. The three stop positions are the top row (the first row), the middle row (the second row), and the bottom row (the third row) (see FIG. 8). Accordingly, when the five mech reels M3*a* to M3*e* (five reel strips) are stopped, 5 reels×3 rows (5 columns by 3 rows) of symbols, or fifteen symbols in total, are shown (stopped) in the display window 150. When a unit game is started, the five mech reels M3*a* to M3*e* start moving. After a predetermined time, the five mech reels M3*a* to M3*e* stop the moving. As a result, fifteen symbols are shown and rearranged in the display window 150. That is to say, every time a unit game is conducted, the symbols are rearranged in the display window 150 to show the result of the unit game.

The present embodiment describes a slot machine 10 equipped with a mechanical reel type of reel device M1. However, the slot machine 10 of the present invention may employ a video reel type of reel device that displays fake reels or a combination type of the video reel type and the mechanical reel type. The reel cover 134 may be provided with a touch panel. In this case, the player can enter various instructions by operating the touch panel. Input signals are sent from the touch panel to the main CPU 222.

Furthermore, the reel cover 134 may be provided with a clear liquid crystal panel, instead of a clear panel. The reel cover 134 provided with a liquid crystal panel enables presentation effects of images on the clear liquid crystal panel in combination with the motion of the symbols of the reel device M1.

Below the reel device M1, a control panel 30 is provided. The control panel 30 includes buttons, a coin entry 80 for receiving coins into the cabinet 11, and a bill entry 82.

Figure 4:
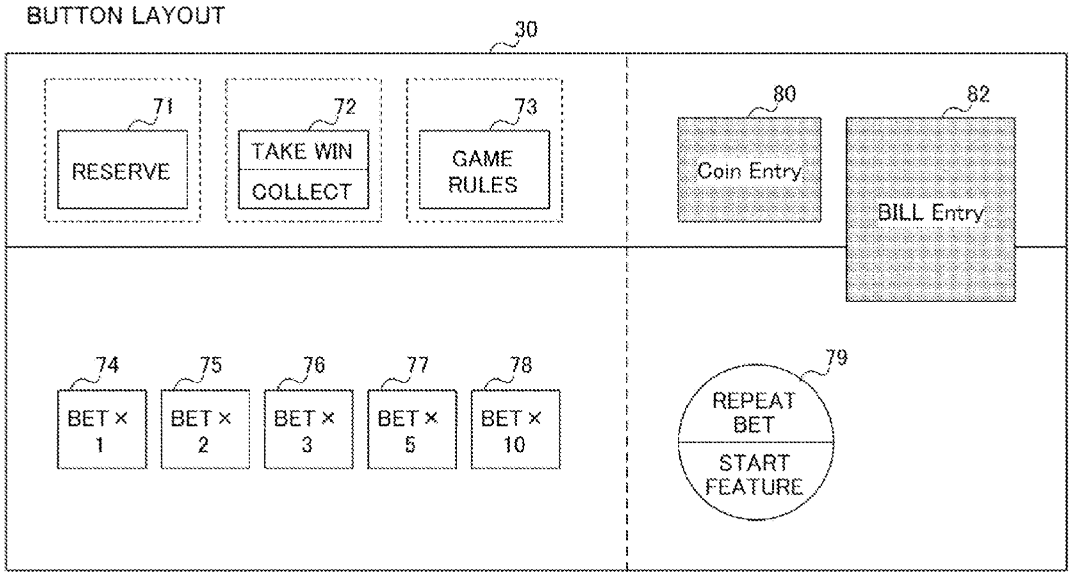
FIG. 4 is a diagram for illustrating a control panel of the slot machine in the embodiment.

Specifically, the control panel 30 includes a RESERVE button 71, a COLLECT button 72, and a GAME RULES button 73, a 1-BET button 74, a 2-BET button 75, a 3-BET button 76, a 5-BET button 77, and a 10-BET button 78 as shown in FIG. 4, which schematically illustrates a part of the control panel 30. The RESERVE button 71, the COLLECT button 72, and the GAME RULES button 73 are provided on the upper left of the control panel 30. The 1-BET button 74, the 2-BET button 75, the 3-BET button 76, the 5-BET button 77, and the 10-BET button 78 are provided on the lower left of the control panel 30. Further, a START button 79 is provided on the lower middle of the control panel 30.

The RESERVE button 71 is used when the player leaves the machine for a minute or wants to ask a staff of the game hall for exchange. The RESERVE button 71 is also used to store the remaining credit to the IC card inserted in the IC card reader 60. The COLLECT button 72 is used to instruct the slot machine 10 to discharge the credited coins to a coin tray 92. If the player is unfamiliar with the rules of the game or the operation of the machine, the GAME RULES button 73 is used. In response to a press of the GAME RULES button 73, a variety of help information comes up on the upper image display panel 131.

The BET buttons 74 to 78 are used to set a bet. Each time the player presses the 1-BET button 74, one credit is bet on each active payline from the player's current credit. If the player presses the 2-BET button 75, two credits are bet on each active payline to start a unit game. If the player presses the 3-BET button 76, three credits are bet on each active payline to start a unit game. If the player presses the 5-BET button 77, five credits are bet on each active payline to start a unit game. If the player presses the 10-BET button 78, ten credits are bet on each active payline to start a unit game. The START button (spin button) 79 is used to instruct the mech reels M3*a* to M3*e* to start spinning under the bet condition set in advance.

As shown in FIG. 3, on the lower front of the main door 13, or below the control panel 30, a coin tray 92 for receiving discharged coins and a belly glass 132 with a painting of the character of the slot machine 10 are provided.

On the front of the top box 12, an upper image display panel 131 is provided. The upper image display panel 131 is made of a liquid crystal panel to be a display. The upper image display panel 131 displays images providing presentation effects and images introducing the game and showing the rules of the game. Speakers 112 and a lamp 114 are provided on the top box 12. The slot machine 10 produces presentation effects by displaying images, outputting sounds, and outputting light.

Below the upper image display panel 131, a data display 124 and a keypad 122 are provided. The data display 124 is made of a fluorescent display or an LED to show membership data retrieved from an IC card inserted in the IC card reader 60 of the PTS terminal 700 or data entered by the player through the keypad 122. The keypad 122 is a device to input data.

The reel device M1 mounted on the slot machine 10 is structured to hold five mech reels M3*a* to M3*e* horizontally so that their rotational axes will be on the same line. That is to say, the reel device M1 has a reel assembly (not shown) that rotationally drives the mech reels M3*a* to M3*e* with symbols disposed on the outer circumferential surface to rearrange the symbols.

<Electric Configuration of Slot Machine>

Figure 5:
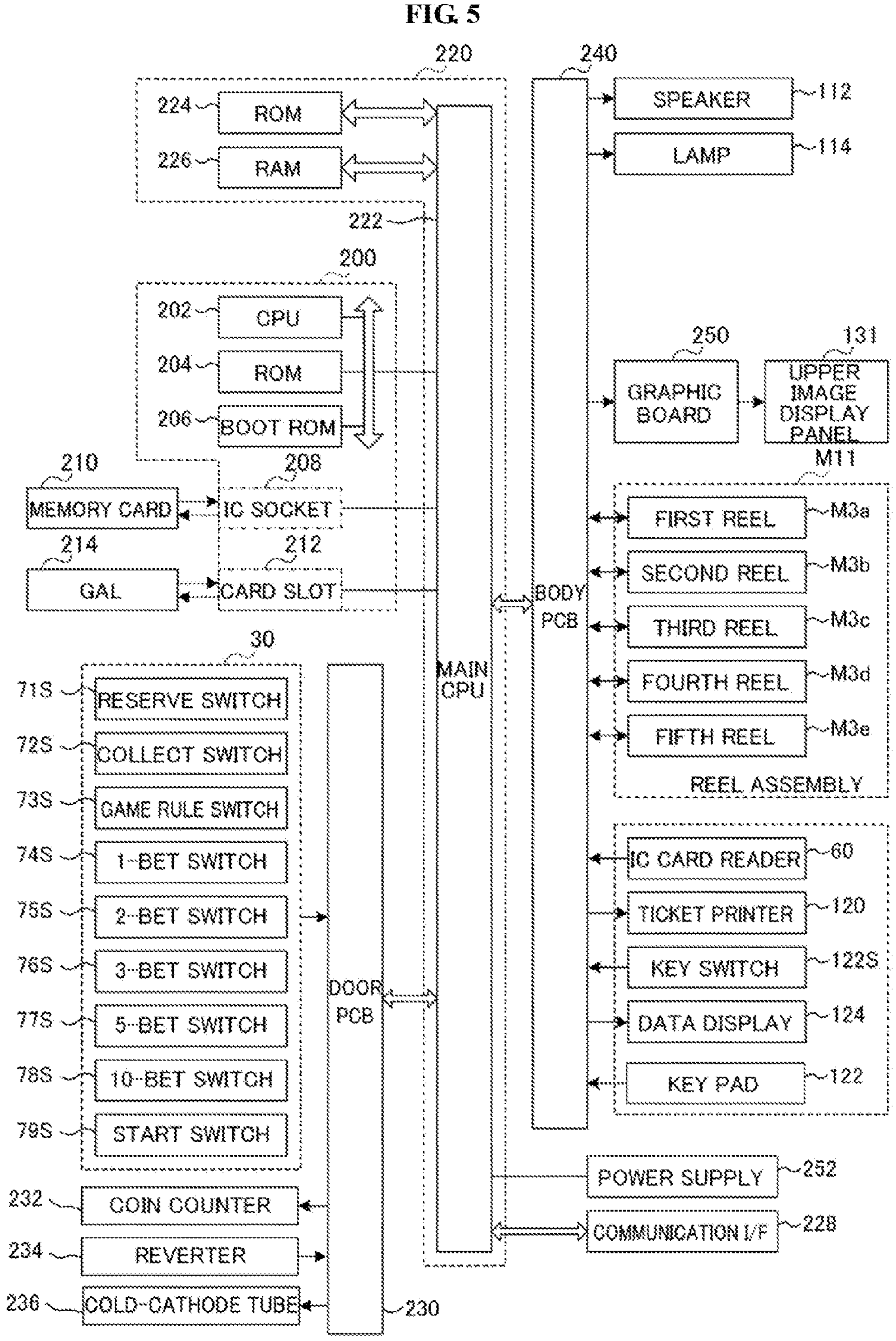
FIG. 5 is a block diagram for illustrating an internal configuration of the slot machine in the embodiment.

FIG. 5 is an electric block diagram of the slot machine 10 shown in FIG. 3. The slot machine 10 includes a game board 200, a mother board 220, a door PCB 230, and a body PCB 240.

The game board 200 includes a CPU 202, a ROM 204 accessible from the CPU 202 via an internal bus, and a boot ROM 206 accessible from the CPU 202 via the internal bus. The game board 200 further includes an IC socket 208 to accommodate and communicate with a memory card 210, and a card slot 212 provided for generic array logic (GAL) 214.

The memory card 210 includes a non-volatile memory and holds a game program and a game system program.

The IC socket 208 is structured so that the memory card 210 is removable. The IC socket 208 is connected with the mother board 220 via an IDE bus. The game executed in the slot machine 10 can be changed by replacing the memory card 210 with another card. The game executed in the slot machine 10 can also be changed by removing the memory card 210 from the IC socket 208, rewriting a different program to the memory card 210, and inserting the memory card 210 again to the IC socket 208.

The GAL 214 is a kind of programmable logic device (PLD) with a fixed OR array and has multiple input ports and output ports. When the GAL 214 receives specific data via an input port, it outputs data corresponding to the input data via an output port.

The card slot 212 is structured so that the GAL 214 can be inserted to or removed from the card slot 212, and is connected with the mother board 220 via a PCI bus.

The CPU 202, the ROM 204, and the boot ROM 206 interconnected via an internal bus are connected with the mother board 220 via the PCI bus. The PCI bus enables signal transmission between the mother board 220 and the game board 200 and supply of power from the mother board 220 to the game board 200.

The ROM 204 stores programs. The boot ROM 206 stores a preliminary authentication program and a boot code to be used by the CPU 202 to start the preliminary authentication program. The authentication program is a tamper check program for verifying whether the game program and the game system program are authentic. The preliminary authentication program is a program for verifying whether the authentication program is authentic. The authentication program and the preliminary authentication program are written so as to perform verification that the target program is not tampered.

The mother board 220 is a commonly available main board to execute a game program and a game system program. The mother board 220 includes a main CPU 222, a ROM 224, a RAM 226, and a communication interface 228.

The ROM 224 is a memory device to store programs to be executed by the main CPU 222. The ROM 224 non-transitorily stores programs, for example BIOS, with other data. The ROM 224 can be a flash memory. When the BIOS program is executed by the main CPU 222, it initializes the peripheral devices. The BIOS program loads a game program and a game system program held in the memory card 210 via the game board 200. The ROM 224 may be rewritable. However, the ROM 224 may be write-protected.

The RAM 226 stores data and programs to be used during the operation of the main CPU 222. For example, to load a game program, a game system program, or an authentication program, the RAM 226 can store the program. The RAM 226 has working space to execute such a program. Specifically, the working space stores the amount of bet, the amount of payout, and the amount of credit and holds them during execution of the game. The RAM 226 also holds tables for defining symbols, symbol codes, winning patterns, and their probabilities during the game. Furthermore, the RAM 226 stores symbol determination tables (see FIGS. 10 to 12) and a payout table (see FIG. 9). Each symbol determination table holds mapping information between symbol codes and random numbers to be used to determine a symbol based on a random number. Still further, the RAM 226 holds a mode flag 322 and a free game counter 324. The mode flag 322 indicates the game mode. The free game counter 324 indicates a count value representing the number of executed unit games or the number of remaining unit games.

The RAM 226 also stores count values of a plurality of counters. The plurality of counters include a bet counter, a payout counter, a credit counter 320, and the aforementioned free game counter 324. Some of the count values may be held in the internal register of the main CPU 222.

The main CPU 222 communicates with an external controller via the communication interface 228. An example of the external controller is a server (external control device 20) connected via a communication channel as shown in FIG. 2.

The mother board 220 is connected with the door PCB 230 and the body PCB 240. The mother board 220 can communicate with the door PCB 230 and the body PCB 240 using USB. The mother board 220 is also connected with a power supply 252. The main CPU 222 of the mother board 220 activates and operates using the power supplied from the power supply 252. The mother board 220 forwards a part of the power to the game board 200 via the PCI bus to activate the CPU 202. The door PCB 230 and the body PCB 240 are connected with input devices. Examples of the input devices are switches, sensors, and peripheral devices which are controlled by the main CPU 222 to operate. The door PCB 230 is connected with a control panel 30, a coin counter 232, a reverter 234, and a cold-cathode tube 236.

The control panel 30 includes a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch (spin button) 79S, which are respectively associated with the buttons 71 to 79. The switches 71S to 79S detect that the buttons 71 to 79 are pressed by the player and output signals to the main CPU 222.

The coin counter 232 and the reverter 234 are installed in the coin entry 80. The coin counter 232 determines whether each coin put in the coin entry 80 is genuine from the characteristics of the coin, such as the material and the shape of the coin. If it detects a genuine coin, the coin counter outputs a signal to the main CPU 222. A coin determined to be fake is ejected to the coin tray 92. The reverter 234 operates in accordance with a control signal from the main CPU 222. The reverter 234 supplies the coin determined to be genuine by the coin counter 232 to a hopper (not shown)

or a cash box (not shown). When the hopper is not filled with coins, coins are guided to the hopper. When the hopper is filled with coins, coins are guided to the cash box.

The cold-cathode tube 236 is installed behind the upper image display panel 131. The cold-cathode tube 236 functions as a backlight and lights up in accordance with a control signal from the main CPU 222.

The body PCB 240 is connected with the speakers 112, the lamp 114, the hopper, the coin detector (not shown), the reel assembly M11, the IC card reader 60, the graphic board 250, the ticket printer 120, the key switch 122S, and the data display 124.

The lamp 114 is turned on and off in accordance with a control signal from the main CPU 222. The speakers 112 output sound such as BGM in accordance with a control signal from the main CPU 222.

The hopper operates in accordance with a control signal from the main CPU 222 to discharge specified amount of coins to the coin tray 92 through a coin payout slot (not shown) formed between the belly glass 132 and the coin tray 92. The coin detector detects coins discharged from the hopper and outputs a detection signal to the main CPU 222.

The graphic board 250 controls the upper image display panel 131 in accordance with control signals from the main CPU 222. The graphic board 250 includes a video display processor (VDP) for creating video data and a video RAM for storing video data on a temporal basis. The video data is created by a game program stored in the RAM 226.

The IC card reader 60 retrieves data held in an IC card inserted therein and supplies the retrieved data to the main CPU 222. The IC card reader 60 also writes data supplied to the main CPU 222 to the ID card.

The ticket printer 120 prints a barcode including information such as the information held in the credit counter 320 in the RAM 226, time and date, and the identification number of the slot machine 10 on a ticket in accordance with a control signal from the main CPU 222 to output a barcode ticket.

The key switch 122S is provided behind the keypad 122 and outputs a key detection signal to the main CPU 222 when the keypad 122 is pressed by the player.

The data display 124 shows information related to information entered with the keypad 122 in accordance with a control signal from the main CPU 222.

The body PCB 240 is electrically connected with the reel assembly M11. As mentioned above, the reel assembly M11 includes five mech reels M3*a* to M3*e*.

Figure 6:
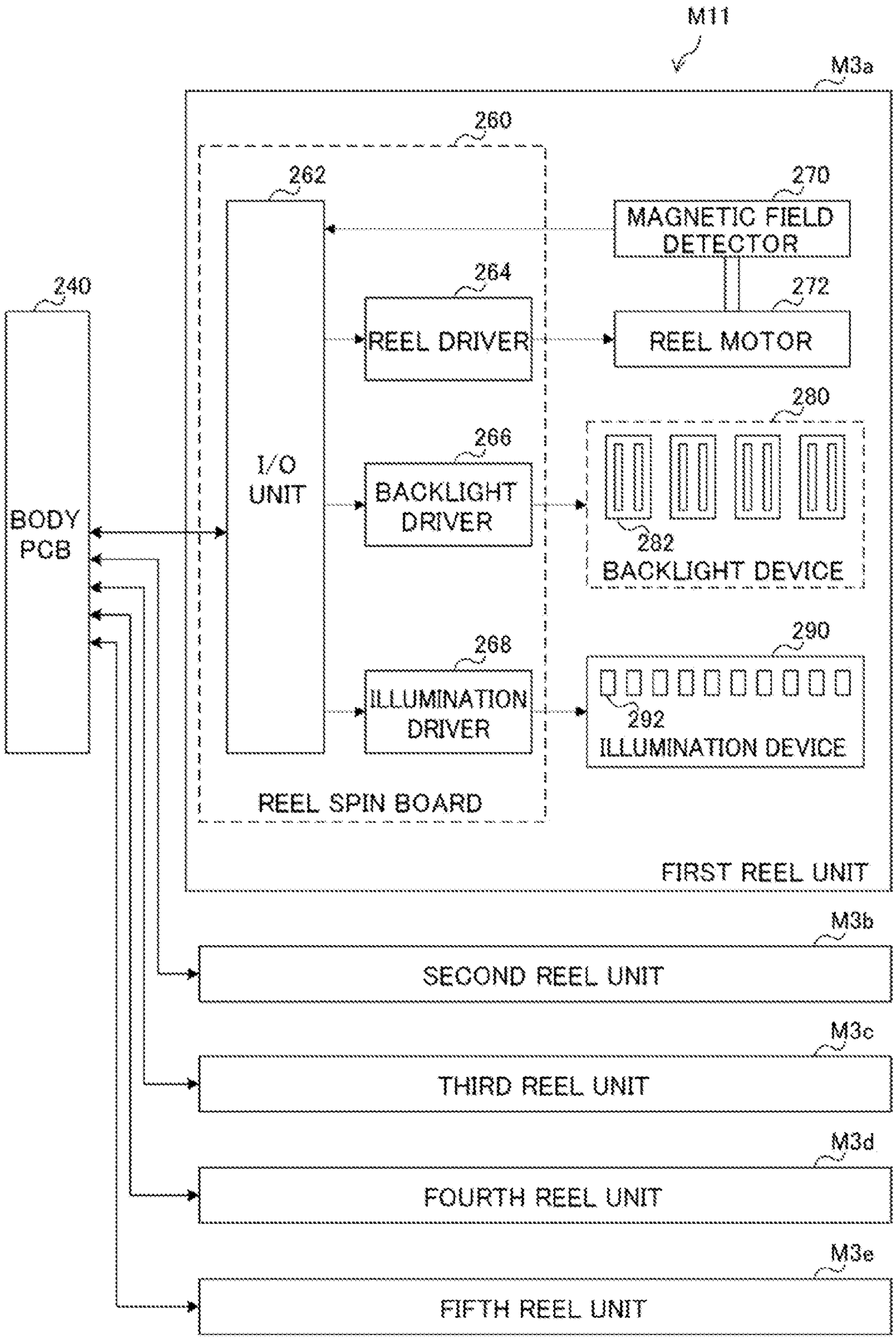
FIG. 6 is a block diagram for illustrating electric circuitry of a reel assembly.

FIG. 6 is a block diagram for illustrating electric circuitry of the reel assembly M11. Each of the five mech reels M3*a* to M3*e* is provided on a reel spin board 260. The reel spin board 260 includes an input/output (I/O) unit 262 which is able to communicate with the body PCB 240. The reel circuit board 260 also includes a reel driver 264, a backlight driver 266, and an illumination driver 268 which are connected with the I/O unit 262.

The I/O unit 262 is connected with a magnetic field detector 270. The magnetic field detector 270 includes a magnetic sensor for sensing the intensity of magnetic field and outputting a magnetism detection signal proportional to the intensity of the magnetic field and a sensor fixer for fixing the magnetic sensor to a predetermined position. The magnetic sensor senses the intensity of magnetic field generated by a magnet. The magnet is attached to a rotary shaft of a reel motor 272 and rotates with the mech reel M3*a*.

The reel driver 264 supplies electric power to the reel motor 272. The backlight driver 266 supplies electric power to lights 282 of a backlight device 280 separately. The illumination driver 268 supplies electric power to lights 292 of an illumination device 290 separately.

The remaining mech reels M3*b* to M3*e* have the same configuration as the mech reel M3*a*; the detailed explanation thereof is omitted.

<Functions of Game Program>

Figure 7:
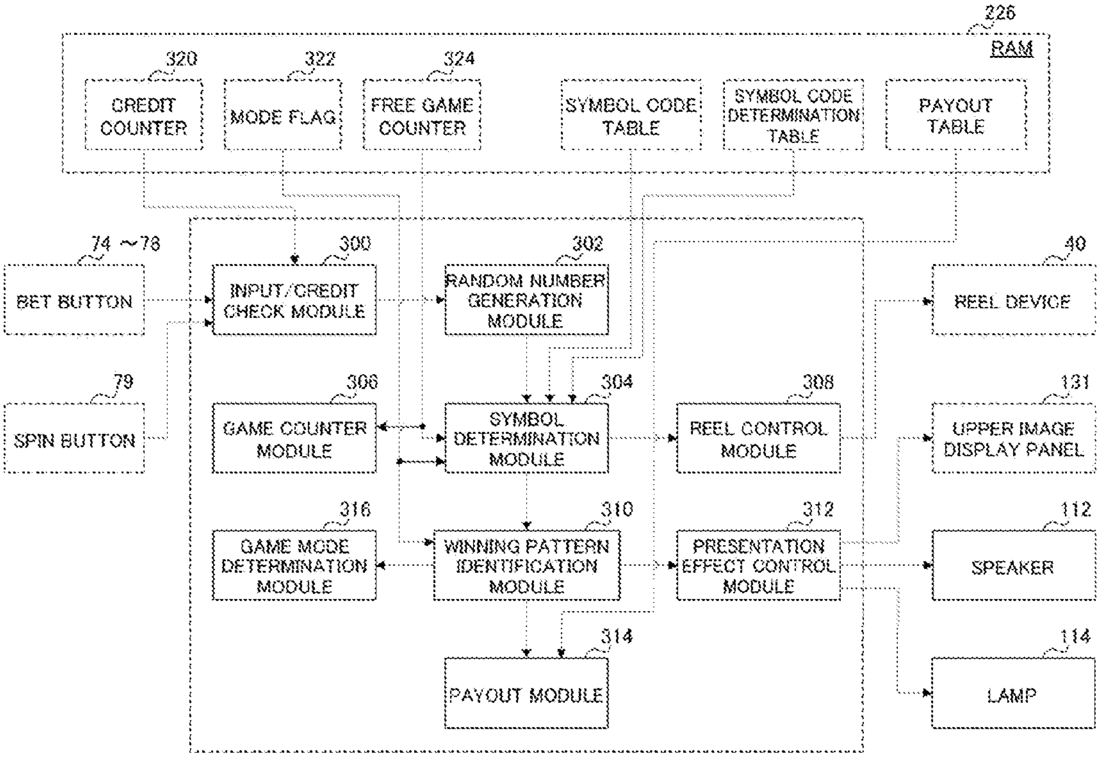
FIG. 7 is a functional block diagram for illustrating functions of a game program.

FIG. 7 is a functional block diagram for illustrating functions of a game program executed by the main CPU 222 of the mother board 220. When power is supplied to the slot machine 10, the main CPU 222 retrieves the authenticated game program and game system program from the memory card 210 via the game board 200 and writes them to the RAM 226. The game program is executed in such a loaded state on the RAM 226.

In a preferred embodiment, the game program includes an input/credit check module 300, a random number generation module 302, a symbol determination module 304, a game counter module 306, a reel control module 308, a winning pattern identification module 310, a presentation effect control module 312, a payout module 314, and a game mode determination module 316.

The input/credit check module 300 continuously checks whether any of the BET buttons 74 to 78 or the spin button 79 is pressed in an idle state where the five mech reels M3*a* to M3*e* are still. Upon detection of pressing one of the BET buttons 74 to 78 or the spin button 79, the input/credit check module 300 checks whether any credit remains for the player with reference to the credit counter 320 held in the RAM 226. If the player has at least one credit, the input/credit check module 300 invokes the random number generation module 302.

The random number generation module 302 generates random numbers to be used by the symbol determination module 304. In the present embodiment, the random number generation module 302 generates five random numbers. The five random numbers are individually used to determine to-be stopped symbols for the five mech reels M3*a* to M3*e*.

After extracting all the five random numbers, the symbol determination module 304 separately determines to-be stopped symbols for the five mech reels M3*a* to M3*e* with reference to a symbol determination table (see FIGS. 10 to 12) held in the RAM 226. The symbol determination module 304 determines five to-be stopped symbols for a plurality of scroll lines (e.g., the five mech reels M3*a* to M3*e*) to show the to-be stopped symbols for the plurality of scroll lines (e.g., the five mech reels M3*a* to M3*e*) in the display window 150 of the reel device M1.

The reel control module 308 controls the reel assembly M11 by supplying stop position information for the to-be stopped symbols. Consequently, the spinning five mech reels M3*a* to M3*e* stop at the positions specified by the stop position information. That is to say, the symbols are scrolled with the spin of the five mech reels M3*a* to M3*e*. Then, the reel control module 308 stops the five mech reels M3*a* to M3*e* so that the to-be stopped symbols will be rearranged at the vertically middle of the display window 150 of the reel device M1.

The winning pattern identification module 310 determines whether the rearranged symbols make any specific winning pattern. If the rearranged symbols make a winning pattern, the presentation effect control module 312 controls the reel device M1 and other devices, such as the speakers 112, the lamp 114, and the upper image display panel 131. The presentation effects include performances by video and audio and performances by changing backlight and illumination. The payout module 314 determines the amount of payout in accordance with the completed winning pattern, and provides the determined amount of payout to the player.

Each time a unit game ends, the game mode determination module 316 determines the game mode of the next unit game.

If a result of the symbol determination module 304 completes a normal free game trigger in base game mode, the game mode determination module 316 switches the game mode from base game mode to normal free game mode. If requirements to exit normal free game mode are satisfied, the game mode determination module 316 switches the game mode from normal free game mode to base game mode.

If a result of the symbol determination module 304 completes a special free game trigger in chance zone, the game mode determination module 316 switches the game mode from chance zone to special free game mode. If requirements to exit special free game mode are satisfied, the game mode determination module 316 switches the game mode from special free game mode to base game mode.

If a result of the symbol determination module 304 completes a chance zone trigger in base game mode, normal free game mode, special free game mode, or chance zone, the game mode determination module 316 switches the game mode to chance zone. If requirements to exit chance zone are satisfied, the game mode determination module 316 switches the game mode from chance zone to base game mode.

The game mode determination module 316 may be executed in the winning pattern identification module 310.

The game counter module 306 sets the number of free games for normal free game mode or special free game mode in accordance with the winning pattern identified by the winning pattern identification module 310 and manages the free game counter 324 by decrementing by one with execution of a free game. The value of the free game counter 324 is stored in the RAM 226. The game counter module 306 may be configured to belong to the symbol determination module 304.

It should be noted that, the input/credit check module 300 may be an independent input/credit check device 300'; the random number generation module 302 may be an independent random number generation device 302'; the symbol determination module 304 may be an independent symbol determination device 304'; the game counter module 306 may be an independent game counter device 306'; the reel control module 308 may be an independent reel control device 308'; the winning pattern identification module 310 may be an independent winning pattern identification device 310'; the presentation effect control module 312 may be an independent presentation effect control device 312'; the payout module 314 may be an independent payout device 314'; and the game mode determination module 316 may be an independent game mode determination device 316'. In this way, the game program can be an aggregate of independent devices. Alternatively, some of these devices may be integrated into a device. In any case, it is sufficient as far as the processing modules may be processes, components, devices, or units that can execute the game program.

<Paylines>

FIG. 8 is an example of a payline definition table for defining the paylines employed in the slot machine 10. The slot machine 10 has thirty paylines. The thirty paylines are defined with the fifteen stop positions in the display window 150. Whether a winning pattern is completed is determined depending on the number and the kind of symbols arranged along a payline. The payline definition table in FIG. 8 defines paylines formed by connecting the top row, the middle row, and the bottom row of the five mech reels M3*a* to M3*e* in the display window 150. In the payline definition table of FIG. 8, "0" represents the symbol stop position of the top row (the first row); "1" represents the symbol stop position of the middle row (the second row); and "2" represents the symbol stop position of the bottom row (the third row).

For example, the payline No. 1 in FIG. 8 is 1-1-1-1-1, which represents a payline connecting the middle row-the middle row-the middle row-the middle row-the middle row of the mech reels M3*a*, M3*b*, M3*c*, M3*d*, and M3*e*, respectively. The payline No. 5 in FIG. 8 is 2-1-0-1-2, which represents a payline connecting the bottom row-the middle row-the top row-the middle row-the bottom row of the mech reels M3*a*, M3*b*, M3*c*, M3*d*, and M3*e*, respectively.

In the slot machine 10 in the present embodiment, all the thirty paylines are always active independently from the amount of bet or the player's choice. However, each payline may be activated in accordance with the player's choice. The total number of paylines can be changed with the size of the symbol matrix.

<Payout Table>

FIG. 9 is an example of a payout table. The payout table in FIG. 9 defines winning patterns of nine kinds of symbols and prizes for the winning patterns.

The payout table indicates relations among the kind of the symbols constituting the winning pattern, the number of the kind, and the prize. The number of the kind equals the number of constituent symbols of the winning pattern that are continuously arranged from left to right along the payline. As mentioned above, the slot machine 10 in the present embodiment determines a hit or a miss on a left-to-right basis except for the scatter symbols of the BONUS and the CHANCE. Accordingly, the prize is determined depending on the kind and the number of symbols continuously arranged along a payline starting from the leftmost reel M3*a* toward the rightmost reel M3*e*.

The first winning patterns are patterns where three, four, and five RED7s are continuously arranged along a payline. The second winning patterns are patterns where three, four, and five BLUE7s are continuously arranged along a payline.

Taking examples of the first winning patterns, when a pattern of RED7-RED7-RED7 is completed with RED7s continuously arranged along a payline from the leftmost reel M3*a*, the number of the kind is 3 and the prize is 30. Likewise, when a pattern of RED7-RED7-RED7-RED7 is completed with RED7s continuously arranged along a payline from the leftmost reel M3*a*, the number of the kind is 4 and the prize is 80. When a pattern of RED7-RED7-RED7-RED7-RED7 is completed with RED7s continuously arranged along a payline from the leftmost reel M3*a*, the number of the kind is 5 and the prize is 300.

The third winning patterns are of ANY7. The winning patterns of ANY7 are patterns where symbols of the two kinds of RED7 and BLUE7 are mixed and continuously arranged along a payline. The third winning patterns are patterns where three, four, and five symbols satisfying conditions for the ANY7 are continuously arranged along a payline.

The fourth winning patterns are patterns where three, four, and five 3BARs are continuously arranged along a payline. The fifth winning patterns are patterns where three, four, and five 2BARs are continuously arranged along a payline. The sixth winning patterns are patterns where three, four, and five 1BARs are continuously arranged along a payline.

The seventh winning patterns are of ANYBAR. The winning patterns of ANYBAR are patterns where symbols of two or three kinds of 3BAR, 2BAR, and 1BAR are mixed and continuously arranged along a payline. The seventh winning patterns are patterns where three, four, and five symbols satisfying conditions for the ANYBAR are continuously arranged along a payline.

The eighth winning pattern is of BONUS. The ninth winning pattern is of CHANCE. The BONUS and the CHANCE are scatter symbols. Accordingly, only the number of BONUSes or CHANCEs shown in the display window 150 determines the prize, independently from the payline.

As mentioned above, BONUSes are disposed on three mech reels M3*b*, M3*c*, and M3*d* one by one. The prize when the three BONUSes are shown is 1. The eighth winning pattern is a pattern where the BONUSes on the three mech reels M3*b*, M3*c*, and M3*d* are shown on any of the top row, the middle row, and the bottom row in the display window 150 and the prize thereof is 1.

The CHANCE is also a scatter symbol. Only one CHANCE is disposed on the mech reel M3*c*. The prize when the one CHANCE is shown in the display window 150 is 1. The ninth winning pattern is this pattern of the CHANCE.

In the slot machine 10, the winning pattern identification module 310 refers to the payout table to determine whether any winning pattern defined in the payout table is completed every time a unit game is conducted. If any one of the winning patterns defined in the payout table is completed, the winning pattern identification module 310 retrieves the prize associated with the kind of the symbols and the number of the kind with reference to the payout table. Furthermore, the winning pattern identification module 310 determines whether a winning pattern of either the BONUS or the CHANCE is made and retrieves the prize associated with the number of the kind.

The payout module 314 provides a payout in accordance with the retrieved prize. However, if the winning pattern identification module 310 determines that no winning pattern is completed, the winning pattern identification module 310 determines a so-called miss.

The benefit of the payout is provided to the player by discharging coins to the coin tray 92 or increasing the credit by the amount of the payout.

Although one payout table is provided in FIG. 9, different payout tables may be defined for base game mode and free game mode.

<Symbol Determination Table and Configuration of Reel Strips>

FIGS. 10 to 12 are symbol determination tables for the five mech reels M3*a* to M3*e*. FIG. 10 specifies weights for the base game mode and the chance zone; FIG. 11 specifies weights for the normal free game mode; and FIG. 12 specifies weights for the special free game mode.

As shown in FIGS. 10 to 12, all the symbols disposed on the five mech reels M3*a* to M3*e* are common to the base game mode, the chance zone, the normal free game mode, and the special free game mode. The weights of the symbols are specified differently among the base game mode and chance zone, the normal free game mode, and the special free game mode. The symbol determination table shown in FIG. 10 is used in both of the base game mode and the chance zone. Accordingly, the weights of the symbols are the same between the base game mode and the chance zone.

The symbol determination tables shown in FIGS. 10 to 12 are tables for specifying symbols disposed on each of the five mech reels M3*a* to M3*e* and weights (appearance probabilities) of the symbols. The symbol determination tables specify the probabilities that the individual symbols on the five mech reels M3*a* to M3*e* will appear on the middle row of the symbol matrix (the middle row of the display window 150).

The symbol determination tables specify the appearance probabilities of the symbols. For example, regarding the 1BAR of the code No. 0 on the mech reel M3*a* in FIG. 10, the weight is 1 and the appearance probability is 1/50 (the value 50 in the bottom row for the mech reel M3*a* is to indicate the total of the weights for the sake of convenience; it is not necessary to be included in the symbol determination table). Regarding the CHANCE of the code No. 8 on the mech reel M3*c*, the weight is 2 and the appearance probability is 2/360.

The symbol lottery processing to be described later extracts five random numbers, refers to the corresponding symbol determination table of one of FIGS. 10 to 12 with the extracted random numbers, and determines five symbols for the five mech reels M3*a* to M3*e*. The five mech reels M3*a* to M3*e* are controlled to stop so that the determined five symbols will be positioned on the middle row of the symbol matrix.

<Symbol Determination Table for Base Game Mode and Chance Zone>

As described above, the symbol lottery processing in base game mode and the symbol lottery processing in chance zone both refer to the symbol determination table shown in FIG. 10. Accordingly, the probabilities that the individual symbols will appear are all the same between the base game mode and the chance zone.

As to the mech reel M3*a*, the weights of the symbols of code Nos. 2 to 15 are specified to be the highest 3. The weights of the symbols of code Nos. 0, 1, and 16 to 21 are specified to be the lowest 1.

As to the mech reel M3*b*, the weights of the symbols of code Nos. 6 to 9 are specified to be the highest 13. The weights of the symbols of code Nos. 0 to 3 and 14 to 17 are specified to be 4; the weights of the symbols of code Nos. 4, 5, and 10 to 13 are specified to be 2; and the weights of the symbols of code Nos. 18 to 21 are specified to be the lowest 1.

As to the mech reel M3*c*, the weights of the symbols of code Nos. 0, 1, and 16 to 21 are specified to be the highest 27. The weights of the symbols of code Nos. 2, 3, 14, and 15 are specified to be 16; the weights of the symbols of code Nos. 4, 5, and 10 to 13 are specified to be 12; and the weights of the symbols of code Nos. 6 to 9 are specified to be the lowest 2.

As to the mech reel M3*d*, the weights of the symbols of code Nos. 6 to 9 are specified to be the highest 8. The weights of the symbols of code Nos. 18 to 21 are specified to be 5; the weights of the symbols of code Nos. 0 to 3 and 14 to 17 are specified to be 4; and the weights of the symbols of code Nos. 4, 5, and 10 to 13 are specified to be the lowest 1.

As to the mech reel M3*e*, the weights of the symbols of code Nos. 18 to 21 are specified to be the highest 6. The weights of the symbols of code Nos. 6 to 9 are specified to be 5; the weights of the symbols of code Nos. 4, 5, and 10 to 13 are specified to be 3; the weights of the symbols of code Nos. 2, 3, 14, and 15 are specified to be 2; and the weights of the symbols of code Nos. 0, 1, 16, and 17 are specified to be the lowest 1.

<Symbol Determination Table for Normal Free Game Mode>

As described above, the symbol lottery processing in the normal free game mode refers to the symbol determination table shown in FIG. 11.

As to the mech reel M3*a*, the weights of the symbols of code Nos. 2, 3, 14, and 15 are specified to be the highest 8. The weights of the symbols of code Nos. 6 to 9 are specified to be 2 and the weights of the symbols of code Nos. 0, 1, 4, 5, 10 to 13, and 16 to 21 are specified to be the lowest 1.

As to the mech reel M3*b*, the weights of the symbols of code Nos. 0 to 3 and 14 to 17 are specified to be the highest 8. The weights of the symbols of code Nos. 6 to 9 are specified to be 4 and the weights of the symbols of code Nos. 4, 5, 10 to 13, and 18 to 21 are specified to be the lowest 1.

As to the mech reel M3*c*, the weights of the symbols of code Nos. 6 to 9 are specified to be the highest 8. The weights of the symbols of code Nos. 14 and 15 are specified to be 7; the weights of the symbols of code Nos. 12 and 13 are specified to be 6; the weights of the symbols of code Nos. 2, 3, and 16 to 21 are specified to be 5; the weights of the symbols of code Nos. 4, 5, 10, and 11 are specified to be 4; and the weights of the symbols of code Nos. 0 and 1 are specified to be the lowest 3.

As to the mech reel M3*d*, the weights of the symbols of code Nos. 6 to 9 are specified to be the highest 8. The weights of the symbols of code Nos. 0 to 3 and 14 to 17 are specified to be 6 and the weights of the symbols of code Nos. 4, 5, 10 to 13, and 18 to 21 are specified to be the lowest 1.

As to the mech reel M3*e*, the weights of the symbols of code Nos. 2, 3, 14, and 15 are specified to be the highest 10. The weights of the symbols of code Nos. 0, 1, 4 to 13, and 16 to 21 are specified to be the lowest 1.

<Symbol Determination Table for Special Free Game Mode>

As described above, the symbol lottery processing in the special free game mode refers to the symbol determination table shown in FIG. 12.

As to the mech reel M3*a*, the weights of the symbols of code Nos. 2, 3, 14, and 15 are specified to be the highest 9. The weights of the symbols of code Nos. 0, 1, 4 to 13, and 16 to 21 are specified to be the lowest 1.

As to the mech reel M3*b*, the weights of the symbols of code Nos. 0 to 3 and 14 to 17 are specified to be the highest 8. The weights of the symbols of code Nos. 6 to 9 are specified to be 4 and the weights of the symbols of code Nos. 4, 5, 10 to 13, and 18 to 21 are specified to be the lowest 1.

As to the mech reel M3*c*, the weights of the symbols of code Nos. 14 and 15 are specified to be the highest 9. The weights of the symbols of code Nos. 2, 3, 12, and 13 are specified to be 8; the weights of the symbols of code Nos. 4, 5, 10 and 11 are specified to be 7; the weights of the symbols of code Nos. 16 to 21 are specified to be 5; the weights of the symbols of code Nos. 0 and 1 are specified to be 4; and the weights of the symbols of code Nos. 6 to 9 are specified to be the lowest 1.

As to the mech reel M3*d*, the weights of the symbols of code Nos. 6 to 9 are specified to be the highest 8. The weights of the symbols of code Nos. 0 to 3 and 14 to 17 are specified to be 5; the weights of the symbols of code Nos. 18 to 21 are specified to be 3; and the weights of the symbols of code Nos. 4, 5, and 10 to 13 are specified to be the lowest 1.

As to the mech reel M3*e*, the weights of the symbols of code Nos. 6 to 9 are specified to be the highest 5. The weights of the symbols of code Nos. 2, 3, 14, and 15 are specified to be 4; the weights of the symbols of code Nos. 18 to 21 are specified to be 3; and the weights of the symbols of code Nos. 0, 1, 4, 5, 10 to 13, 16, and 17 are specified to be the lowest 1.

<State Transitions of Games>

Figure 13:
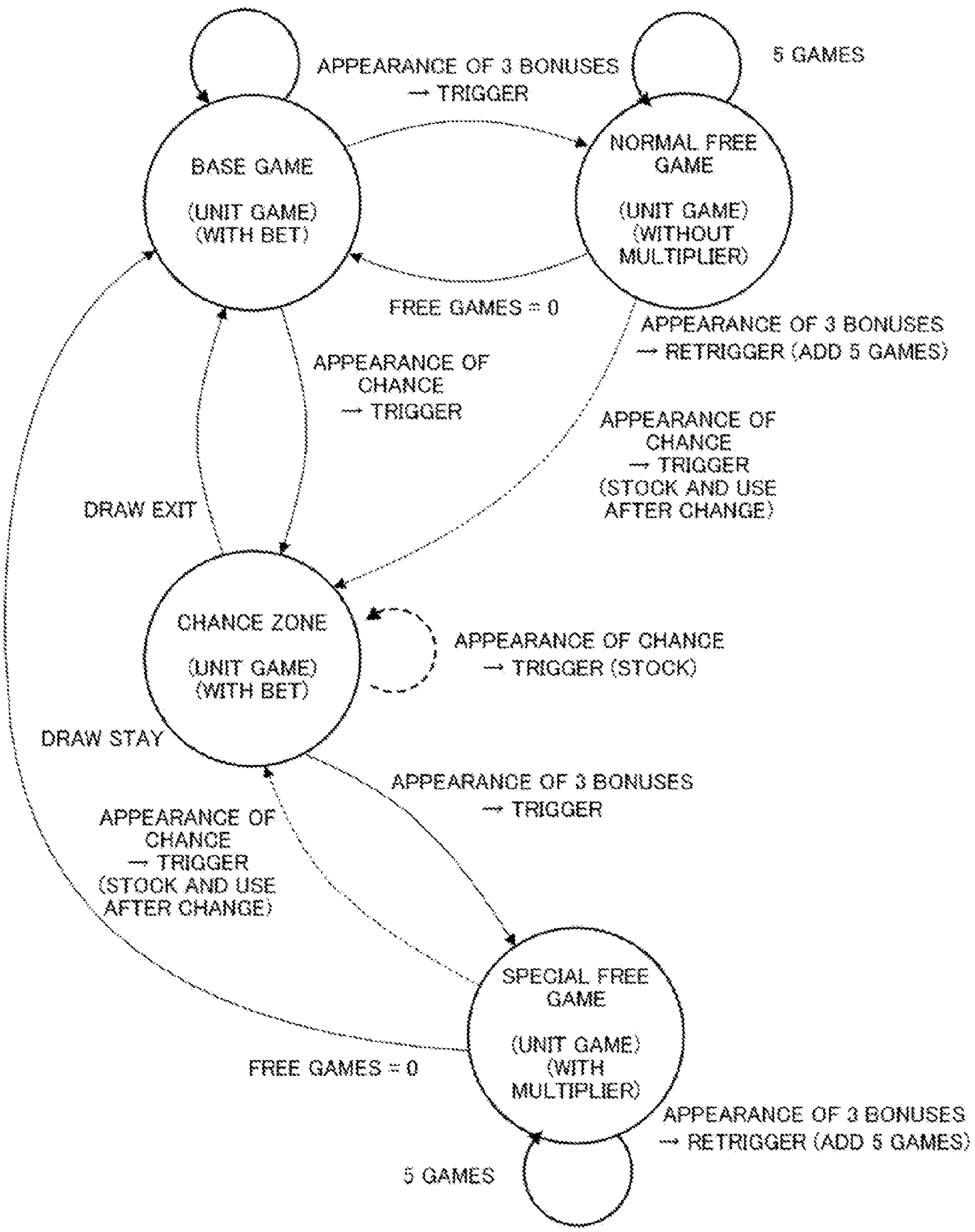
FIG. 13 is a diagram for illustrating transitions of game mode.

FIG. 13 is a diagram for illustrating state transitions in the slot machine 10. Specifically, FIG. 13 is a diagram for illustrating transitions among base game mode, chance zone, normal free game mode, and special free game mode.

The slot machine 10 has four game modes: base game mode, chance zone, normal free game mode, and special free game mode. The slot machine 10 offers unit games basically in the base game mode.

As illustrated in FIG. 13, the base game mode repeats a unit game until normal free game mode is triggered. The unit games in the base game mode are games allowed to start by spending (betting) gaming media. In each game in the base game mode, when one of the winning patterns illustrated in FIG. 9 is completed, a payout in the amount in accordance with the prize for the winning pattern is paid out.

<Normal Free Game Mode>

Completion of the winning pattern of the BONUS in the base game mode triggers normal free game mode. Specifically, determination of appearance of three BONUSes completes the winning pattern of the BONUS. For example, determination of appearance of one BONUS on each of the mech reels M3*b*, M3*c*, and M3*e* completes the winning pattern of the BONUS.

The BONUSes are scatter symbols, which can make the winning pattern independently from the paylines. The number of rearranged BONUSes determines whether the winning pattern is completed or not.

A series of normal free games are conducted in accordance with the later-described processing in FIGS. 19A and 19B and payouts in the amounts based on predetermined prizes are paid out. In the normal free game mode, the reel weights specified in FIG. 11 are used.

In the normal free game mode, each unit game can be started without spending a gaming medium. The player can play unit games basically five times.

Retriggering the normal free game mode in the normal free game mode maintains the game mode in the normal free game mode. Completion of the winning pattern of the BONUS in the normal free game mode retriggers the free mode. The requirements for completion of a retrigger are the same as the requirements for completion of a trigger; determination of appearance of three BONUSes completes the winning pattern of the BONUS. Retriggering normal free game mode leads to addition of five more unit games.

When all the unit games are finished, the requirements to exit the normal free game mode are satisfied. The game mode returns from normal free game mode to base game mode.

<Chance Zone>

Completion of the winning pattern of the CHANCE in base game mode, normal free game mode, or special free game mode triggers chance zone. Specifically, determination of appearance of one CHANCE completes the winning pattern of the CHANCE. For example, determination of appearance of the CHANCE on the mech reel M3*c* completes the winning pattern of the CHANCE.

The CHANCE is a scatter symbol, which can make the winning pattern independently from the paylines. The number of rearranged CHANCEs determines whether the winning pattern is completed or not.

Triggering chance zone causes the game mode to change to chance zone. The chance zone is executed in accordance with the later-described processing in FIG. 14.

The game in the chance zone is basically the same as the game in the base game mode. The chance zone repeats a unit game until the requirements to exit chance zone are satisfied or otherwise, until special free game mode is triggered. Each unit game in chance zone is a game allowed to start by spending (betting) a gaming medium. When one of the winning patterns illustrated in FIG. 9 is completed along a payline in a game in the chance zone, a payout in the amount in accordance with the prize for the winning pattern is paid out.

The game in the chance zone uses the reel weights same as those in the game in base game mode (see FIG. 10). Accordingly, in the chance zone, symbols are determined by lottery with the same winning probabilities (weights) as those in the base game mode.

Unlike in the base game mode, the slot machine 10 conducts a lottery to determine whether to exit or stay in the chance zone every time a unit game is finished. If to exit is selected in the lottery, the requirements to exit the chance zone are satisfied and the game mode returns to base game mode. If to stay is selected in the lottery, the chance zone is maintained.

If special free game mode is triggered in the chance zone, the game mode changes from chance zone to special free game mode. In contrast, when normal free game mode is triggered in base game mode, the game mode changes from base game mode to normal free game mode as described above.

In the case of the change from base game mode to chance zone, the game mode changes to chance zone from the unit game next to the unit game that has triggered chance zone. In the case of the change from normal free game mode, special free game mode, or chance zone to chance zone, the game mode changes to chance zone after the requirements to exit the current game mode are satisfied. Accordingly, in the case where the game mode does not immediately change from normal free game mode, special free game mode, or chance zone to chance zone, the triggered chance zone is kept in stock. If another chance zone is triggered while chance zone is in stock, the chance zone is stocked in duplicate.

<Special Free Game Mode>

Completion of the winning pattern of the BONUS in the chance zone triggers special free game mode. Specifically, determination of appearance of three BONUSes completes the winning pattern of the BONUS. For example, determination of appearance of one BONUS on each of the mech reels M3*b*, M3*c*, and M3*e* completes the winning pattern of the BONUS.

The BONUSes are scatter symbols, which can make the winning pattern independently from the paylines. The number of rearranged BONUSes determines whether the winning pattern is completed or not.

Triggering special free game mode causes the game mode to change to special free game mode. A series of special free games are conducted in accordance with the later-described processing in FIGS. 19A and 19B and payouts in the amounts based on predetermined prizes are paid out.

In the special free game mode, each unit game is allowed to start without spending a gaming medium. The player can play unit games basically five times.

Retriggering the special free game mode in the special free game mode maintains the game mode in the special free game mode. Completion of the winning pattern of the BONUS in the special free game mode retriggers the free mode. The requirements for completion of a retrigger are the same as the requirements for completion of a trigger; determination of appearance of three BONUSes completes the winning pattern of the BONUS. Retriggering the special free game mode leads to addition of five more unit games.

When all the unit games are finished, the game mode returns from special free game mode to base game mode.

In the special free game mode, the reel weights specified in FIG. 12 are used. The reel weights for special free game mode are different from the reel weights for normal free game mode specified in FIG. 11. Between the normal free game mode and the special free game mode, the balances of the likelihood of selecting the symbols are different.

<Specific Example 1 of State Transitions of Games>

Figure 26:
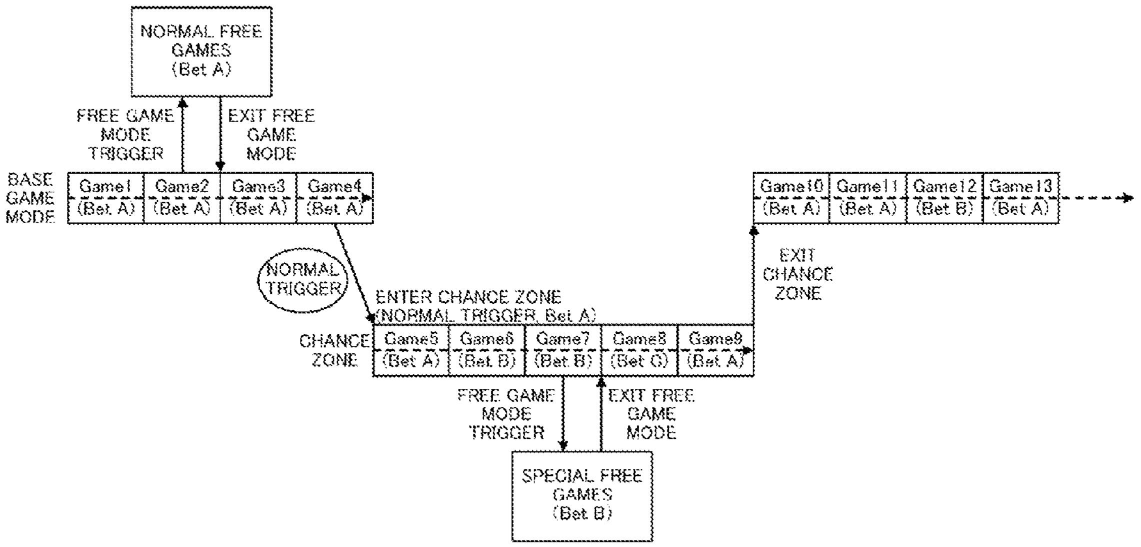
FIG. 26 is a diagram for illustrating a first specific example of state transitions of games.

FIG. 26 is a diagram for illustrating a first specific example of state transitions of games.

Unit games Game1 to Game4 are conducted in base game mode. The player can determine the amount of bet through a bet operation in each game in the base game mode. In the example shown in FIG. 26, the amounts of bet on the unit games Game1 to Game4 are all Bet A.

In the unit game Game2 in the base game mode, the symbol lottery processing determines to show three BONUSes, which triggers normal free game mode. Because of the trigger for normal free game mode, the game mode changes to normal free game mode. Since no requirement is provided to exit base game mode, the game mode immediately changes from base game mode to normal free game mode. In all unit games in the normal free game mode, the amount Bet A used in the unit game Game2, which is the last unit game in the base game mode before the mode change, is used for the bet.

When the requirements to exit normal free game mode are satisfied, the game mode returns from normal game mode to base game mode; the unit game Game3 is started.

In the unit game Game4 in the base game mode, the symbol lottery processing determines to show one CHANCE, which triggers chance zone. Because of the trigger for chance zone, the game mode changes from base game mode to chance zone. Since no requirement is provided to exit base game mode, the game mode immediately changes from base game mode to chance zone without stocking the chance zone. The trigger for chance zone in base game mode is referred to as normal trigger.

When a normal trigger is completed, the trigger type of normal trigger and the amount of bet (the normal trigger bet) at the event of the normal trigger are stored. In the example shown in FIG. 26, the amount Bet A in the unit game Game4 at the event of the normal trigger is stored. The trigger type of normal trigger and the normal trigger bet are used in both of determining the special multiplier for special free game mode and determining whether the requirements to exit chance zone are satisfied.

In the example shown in FIG. 26, unit games Game5 to Game9 are conducted in the chance zone. The player can also determine the amount of bet in each unit game in the chance zone through a bet operation. In the example shown in FIG. 26, the amount of bet on the unit game Game5 is Bet A; the amount of bet on the unit game Game6 is Bet B; the amount of bet on the unit game Game7 is Bet B; the amount of bet on the unit game Game8 is Bet C; and the amount of bet on the unit game Game9 is Bet A.

In the unit game Game7 in the chance zone, the symbol lottery processing determines to show three BONUSes, which triggers special free game mode. Because of the trigger for special game mode, the game mode changes to special free game mode. In all unit games in the special free game mode, the amount Bet B used in the unit game Game7 in the chance zone, which is the last unit game in the chance zone before the mode change, is used for the bet.

When requirements to exit special free game mode are satisfied, the game mode returns from special free game mode to chance zone; the unit game Game8 is started.

The requirements to exit chance zone are satisfied in the unit game Game9 in the chance zone, so that the game mode returns to base game mode and the unit game Game10 is started. In the example shown in FIG. 26, the amount of bet on the unit game Game10 is Bet A; the amount of bet on the unit game Game11 is Bet A; the amount of bet on the unit game Game12 is Bet B; and the amount of bet on the unit game Game13 is Bet A.

<Specific Example 2 of State Transitions of Games>

Figure 27:
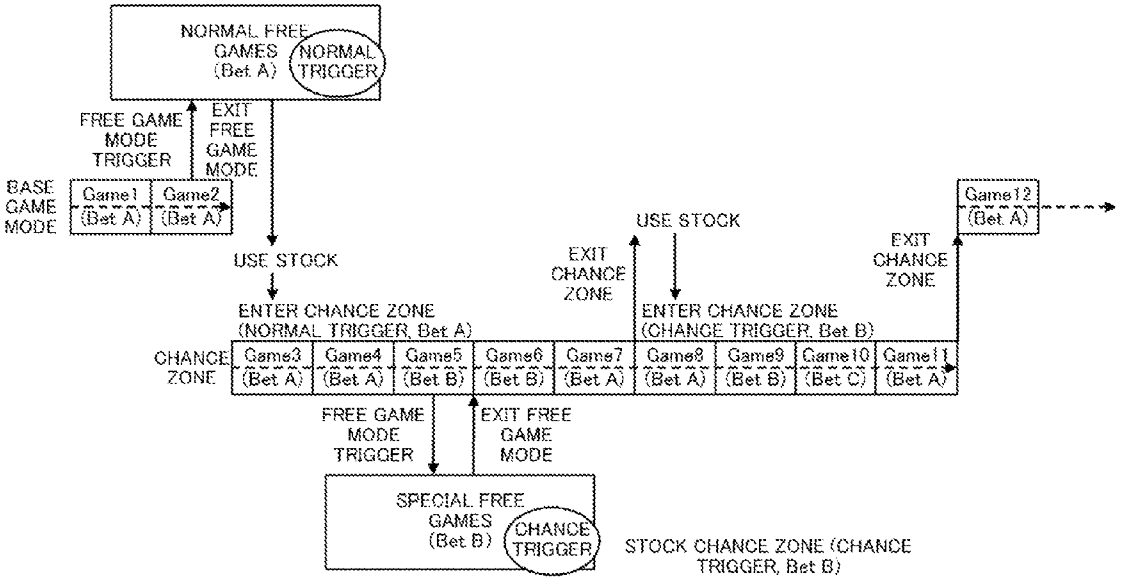
FIG. 27 is a diagram for illustrating a second specific example of state transitions of games.

FIG. 27 is a diagram for illustrating a second specific example of state transitions of games.

Unit games Game1 and Game2 are conducted in base game mode. The player can determine the amount of bet through a bet operation in each unit game in the base game mode. In the example shown in FIG. 27, the amounts of bet on the unit games Game1 and Game2 are both Bet A.

In the unit game Game2 in the base game mode, the symbol lottery processing determines to show three BONUSes, which triggers normal free game mode. Because of the trigger for normal free game mode, the game mode changes to normal free game mode. In all unit games in the normal free game mode, the amount Bet A used in the unit game Game2, which is the last unit game in the base game mode before the mode change, is used for the bet.

In the example shown in FIG. 27, the symbol lottery processing of a unit game in the normal free game mode determines to show one CHANCE, which triggers chance zone. When chance zone is triggered in normal free game mode, the game mode changes to chance zone after the requirements to exit normal free game mode are satisfied and the normal free game mode is finished. Accordingly, the event that chance zone is triggered in normal free game mode is put in stock and the game mode changes to chance zone when the condition is satisfied that the normal free game mode is finished. Like this case, even if chance zone is triggered in normal free game mode, the game mode may not immediately change to chance zone. The trigger for chance zone in normal free game mode is referred to as normal trigger.

When a normal trigger is completed, the trigger type of normal trigger and the amount of bet (the normal trigger bet) at the event of the normal trigger are stored. In normal free game mode, the amount of bet in the last unit game in the base game mode before entering the normal free game mode is used. Accordingly, the normal trigger bet is the amount of bet in the last unit game in the base game mode before entering the normal free game mode. The trigger type of normal trigger and the normal trigger bet are used in both of determining the special multiplier for special free game mode and determining whether the requirements to exit chance zone are satisfied.

In the example shown in FIG. 27, unit games Game3 to Game7 are conducted in the chance zone. In the chance zone, the player can determine the amount of bet through a bet operation in each unit game, like in the base game mode. In the example shown in FIG. 27, the amount of bet on the unit game Game3 is Bet A; the amount of bet on the unit game Game4 is Bet A; the amount of bet on the unit game Game5 is Bet B; the amount of bet on the unit game Game6 is Bet B; and the amount of bet on the unit game Game7 is Bet A.

In the unit game Game5 in the chance zone, the symbol lottery processing determines to show three BONUSes, which triggers special free game mode. Because of the trigger for special game mode, the game mode changes to special free game mode. In all unit games in the special free game mode, the amount Bet B used in the unit game Game5, which is the last unit game in the chance zone before the mode change, is used for the bet.

In the example shown in FIG. 27, the symbol lottery processing in a unit game in the special free game mode determines to show one CHANCE, which triggers chance zone. When chance zone is triggered in special free game mode, the game mode changes to chance zone after the requirements to exit special free game mode are satisfied and the special free game mode is finished. Accordingly, the event that chance zone is triggered in the special free game mode is put in stock and the game mode changes to chance zone when the condition is satisfied that the special free game mode is finished. Like this case, even if chance zone is triggered in special free game mode, the game mode may not immediately change to chance zone. The chance zone trigger in special free game mode is referred to as chance trigger.

When a chance trigger is completed, the trigger type of chance trigger and the amount of bet (the chance trigger bet) at the event of the chance trigger are stored. In special free game mode, the amount of bet in the last unit game in the chance zone before entering the special free game mode is used. Accordingly, the chance trigger bet is the amount of bet in the last unit game in the chance zone before entering the special free game mode. The trigger type of chance trigger and the chance trigger bet are used in both of determining the special multiplier for special free game mode and determining whether the requirements to exit chance zone are satisfied.

When the requirements to exit special free game mode are satisfied, the game mode returns from special free game mode to chance zone; the unit game Game6 is started.

When the requirements to exit chance zone are satisfied in the unit game Game7 in the chance zone, chance zone is newly started without returning to base game mode since chance zone is in stock. The amount of bet on the unit game Game8 in the new chance zone is Bet A; the amount of bet on the unit game Game9 is Bet B; the amount of bet on the unit game Game10 is Bet C; and the amount of bet on the unit game Game11 is Bet A.

The requirement to exit chance zone are satisfied in the unit game Game11 in the chance zone; the game mode returns to base game mode and the unit game Game12 is started. In the example shown in FIG. 27, the amount of bet on the unit game Game12 is Bet A.

<Specific Example 3 of State Transitions of Games>

Figure 28:
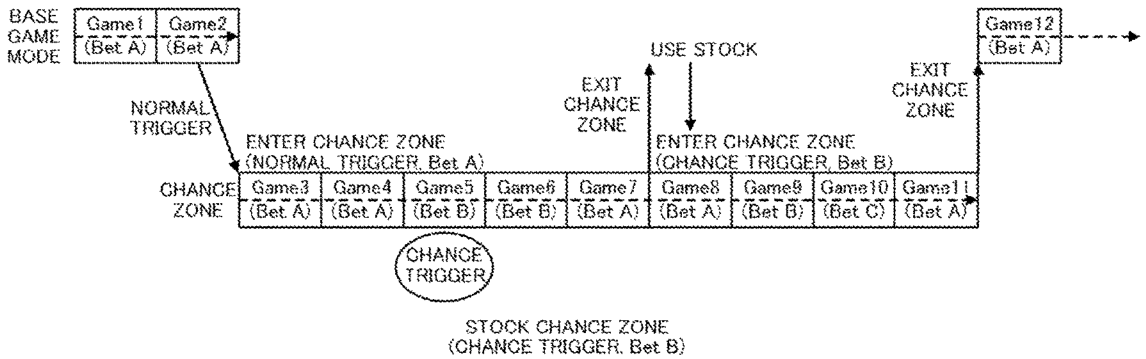
FIG. 28 is a diagram for illustrating a third specific example of state transitions of games.

FIG. 28 is a diagram for illustrating a third specific example of state transitions of games.

Unit games Game1 and Game2 are conducted in base game mode. The player can determine the amount of bet through a bet operation in each game in the base game mode. In the example shown in FIG. 28, the amounts of bet on the unit games Game1 and Game2 are both Bet A.

In the unit game Game2 in the base game mode, the symbol lottery processing determines to show one CHANCE, which triggers chance zone. Because of the trigger for chance zone, the game mode changes from base game mode to chance zone. Since no requirement is provided to exit base game mode, the game mode immediately changes from base game mode to chance zone. As mentioned above, the trigger for chance zone in base game mode is a normal trigger.

In the example shown in FIG. 28, unit games Game3 to Game7 are conducted in the chance zone. The player can determine the amount of bet through a bet operation in each unit game in the chance zone. In the example shown in FIG. 28, the amount of bet on the unit game Game3 is Bet A; the amount of bet on the unit game Game4 is Bet A; the amount of bet on the unit game Game5 is Bet B; the amount of bet on the unit game Game6 is Bet B; and the amount of bet on the unit game Game7 is Bet A.

In the unit game Game5 in the chance zone, the symbol lottery processing determines to show one CHANCE, which triggers chance zone. When chance zone is triggered in chance zone, the game mode newly changes to chance zone after the requirements to exit chance zone are satisfied and the current chance zone is finished. Accordingly, the event that chance zone is triggered in the chance zone is put in stock and the game mode changes to chance zone when the condition is satisfied that the current chance zone is finished. As noted from this case, even if chance zone is triggered in chance zone, new chance zone may not start immediately. The trigger for chance zone in chance zone is referred to as chance trigger.

When a chance trigger is completed, the trigger type of chance trigger and the amount of bet (the chance trigger bet) at the event of the chance trigger are stored. In the example shown in FIG. 28, the amount Bet B in the unit game Game5 at the event of the trigger for chance zone is stored. The trigger type of chance trigger and the chance trigger bet are used in both of determining the special multiplier for special free game mode and determining whether the requirements to exit chance zone are satisfied.

When the requirements to exit chance zone are satisfied in the unit game Game7 in the chance zone, new chance zone is started without returning to base game mode since chance zone is in stock. The amount of bet on the unit game Game8 in the new chance zone is Bet A; the amount of bet on the unit game Game9 is Bet B; the amount of bet on the unit game Game10 is Bet C; and the amount of bet on the unit game Game11 is Bet A.

The requirements to exit chance zone are satisfied in the unit game Game11 in the chance zone, so that the game mode returns to base game mode and the unit game Game12 is started. In the example shown in FIG. 28, the amount of bet on the unit game Game12 is Bet A.

<<Types of Trigger for Chance Zone>>

As described above, chance zone is triggered in any of base game mode, chance zone, normal free game mode, and special free game mode. The chance zone trigger in base game mode or normal free game mode is referred to as normal trigger. The chance zone trigger in chance zone or special free game mode is referred to as chance trigger.

The amount of bet at the event of a normal trigger is referred to as normal trigger bet and the amount of bet at the event of a chance trigger is referred to as chance trigger bet.

<<Description of Program>>

Now, with reference to FIGS. 14 to 20, the program to be executed by the slot machine 10 is described.

<Main Control Processing>

Figure 14:
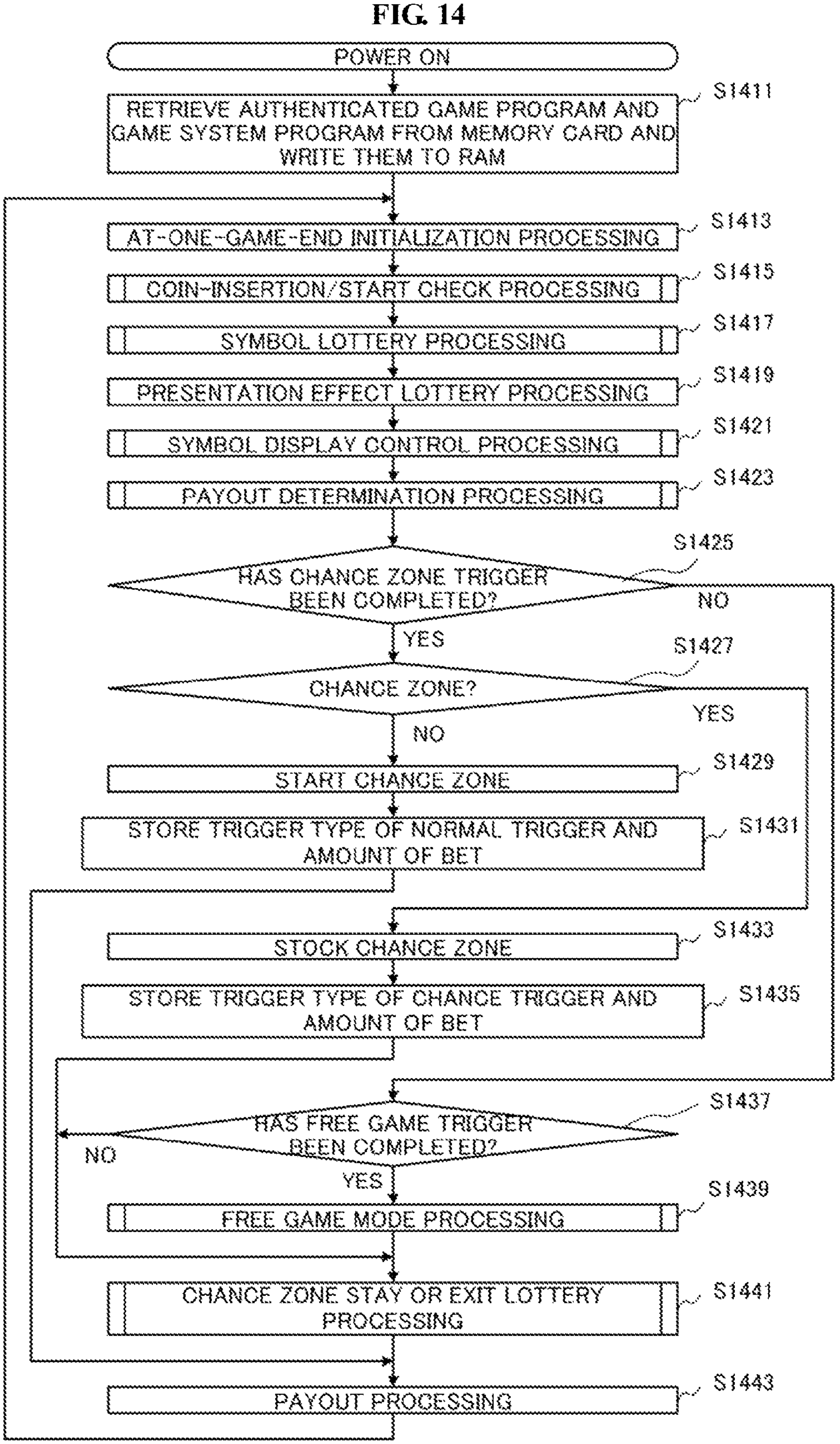
FIG. 14 is a flowchart of main control processing.

FIG. 14 is a flowchart of main control processing. The game mode in this main control processing in FIG. 14 is the base game mode or the chance zone.

First, when the slot machine 10 is powered on, the main CPU 222 retrieves an authenticated game program and an authenticated game system program from the memory card 210 via the game board 200 and writes them to the RAM 226 (step S1411).

Next, the main CPU 222 executes at-one-game-end initialization processing (step S1413). The main CPU 222 clears data which becomes unnecessary after each unit game in the working area of the RAM 226, such as the amount of bet and the to-be stopped symbols determined by a lottery.

Next, the main CPU 222 executes coin-insertion/start check processing (step S1415), which will be described later with reference to FIG. 15.

Next, the main CPU 222 executes symbol lottery processing (step S1417), which will be described later with reference to FIG. 16. At this step, the main CPU 222 determines to-be stopped symbols based on random numbers for symbol determination.

Next, the main CPU 222 executes presentation effect lottery processing (step S1419). At Step S1419, the main CPU 222 extracts a random number for effect determination, determines an effect content from predefined effect contents by lottery, and executes the determined effect content with predetermined timing. For example, the main CPU 222 controls the upper image display panel 131 to play a video for presentation effects, the speakers 112 to output audio, the lamp 114 to flash, and further apply special effects to these.

Next, the main CPU 222 executes symbol display control processing (step S1421), which will be described later with reference to FIG. 17. At this step, the main CPU 222 starts scrolling the symbol arrays on the five mech reels M3*a* to M3*e* (five reel strips) and stops the to-be stopped symbols determined in the symbol lottery processing of step S1417 at base positions.

Next, the main CPU 222 executes payout determination processing (step S1423), which will be described later with reference to FIG. 18. At this step, the main CPU 222 determines whether any winning pattern in the payout table (see FIG. 9) is completed with reference to the five to-be stopped symbols stored in the symbol storage area in the symbol lottery processing, which will be described later. Depending on the winning pattern, the main CPU 222 determines the amount of payout based on the payout table and stores the amount of payout to the payout storage area (payout counter) provided in the RAM 226.

Next, the main CPU 222 determines whether chance zone is triggered with the result of the symbol lottery processing (step S1425). That is to say, the main CPU 222 determines whether the symbol lottery processing has determined to show one CHANCE.

If determining that chance zone is triggered, the main CPU 222 determines whether the current game mode is chance zone (step S1427). That is to say, the main CPU 222 determines whether the game mode has already been changed to chance zone.

If determining that the current game mode is not chance zone, the main CPU 222 starts chance zone (step S1429). That is to say, if the chance zone is triggered during base game mode, the main CPU 222 changes the game mode from base game mode to chance zone.

Next, the main CPU 222 stores the trigger type of normal trigger and the normal trigger bet to the RAM 226 (step S1431). The normal trigger means that chance zone is triggered in base game mode or normal free game mode. The normal trigger bet is the amount of bet (bet per line) in the unit game when the normal trigger is completed.

If determining that the current game mode is chance zone at step S1427, the main CPU 222 stocks chance zone (step S1433). That is to say, if the game mode has already been changed to chance zone, the main CPU 222 stocks the triggered chance zone. Step S1433 is processing to store information indicating that chance zone is in stock to the RAM 226.

Next, the main CPU 222 stores the trigger type of chance trigger and the chance trigger bet to the RAM 226 (step S1435). The chance trigger means that chance zone is triggered in chance zone or special free game mode. The chance trigger bet is the amount of bet (bet per line) in the unit game when the chance trigger is completed.

When chance zone is triggered in chance zone, the main CPU 222 stocks the triggered chance zone in the time-series order at step S1433 and stores the trigger type of chance trigger and the chance trigger bet in the time-series order at step S1435.

If determining that no chance zone trigger is completed at step S1425, the main CPU 222 determines whether a free game trigger is completed (step S1437). That is to say, if a chance zone trigger is not completed, the main CPU 222 determines whether the symbol lottery processing has determined to show three BONUSes. The requirements for a free game trigger are common to the trigger for normal free game mode and the trigger for special free game mode.

Figure 19A:
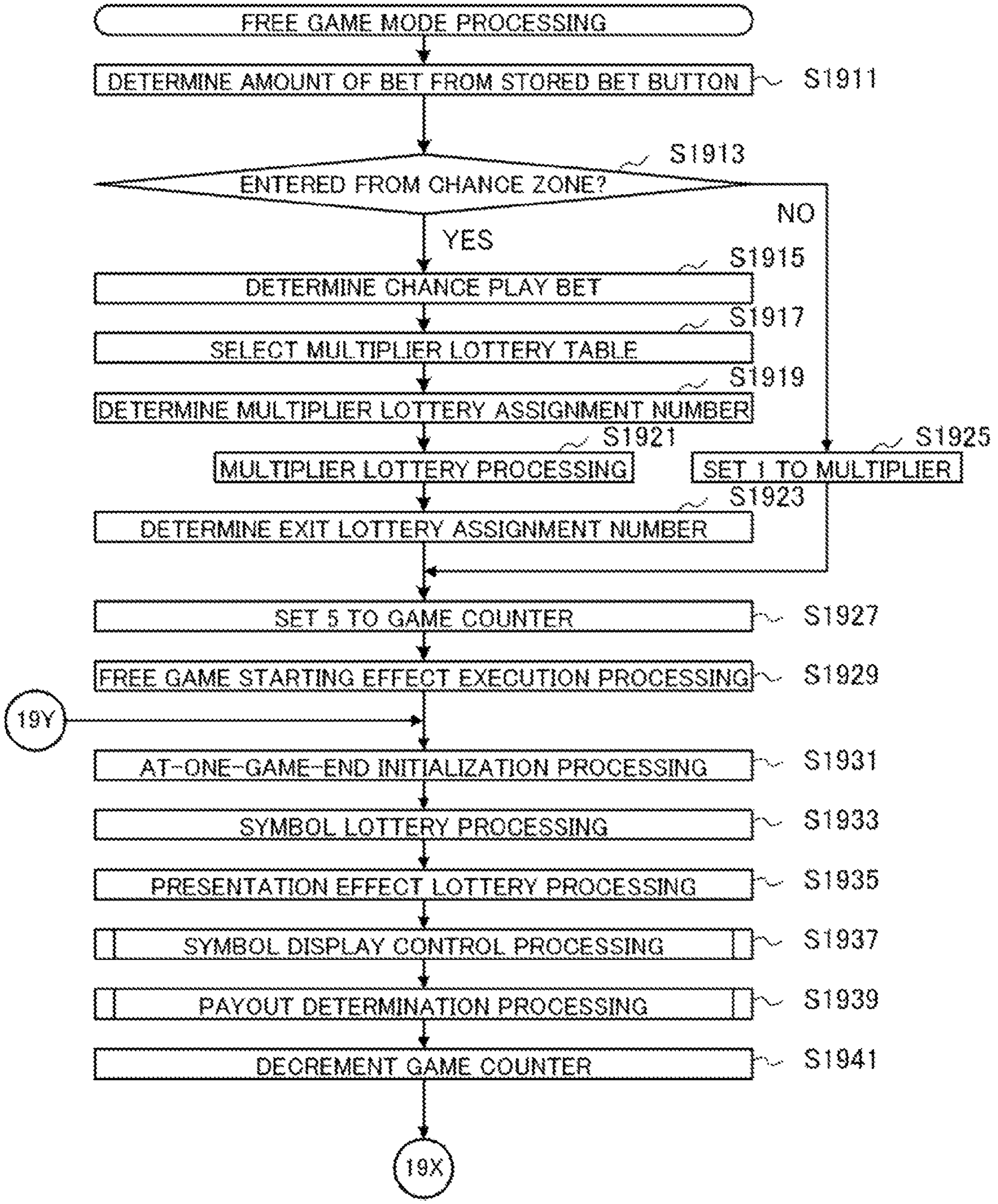
FIG. 19A is a flowchart of a subroutine of free game mode processing.
Figure 19B:
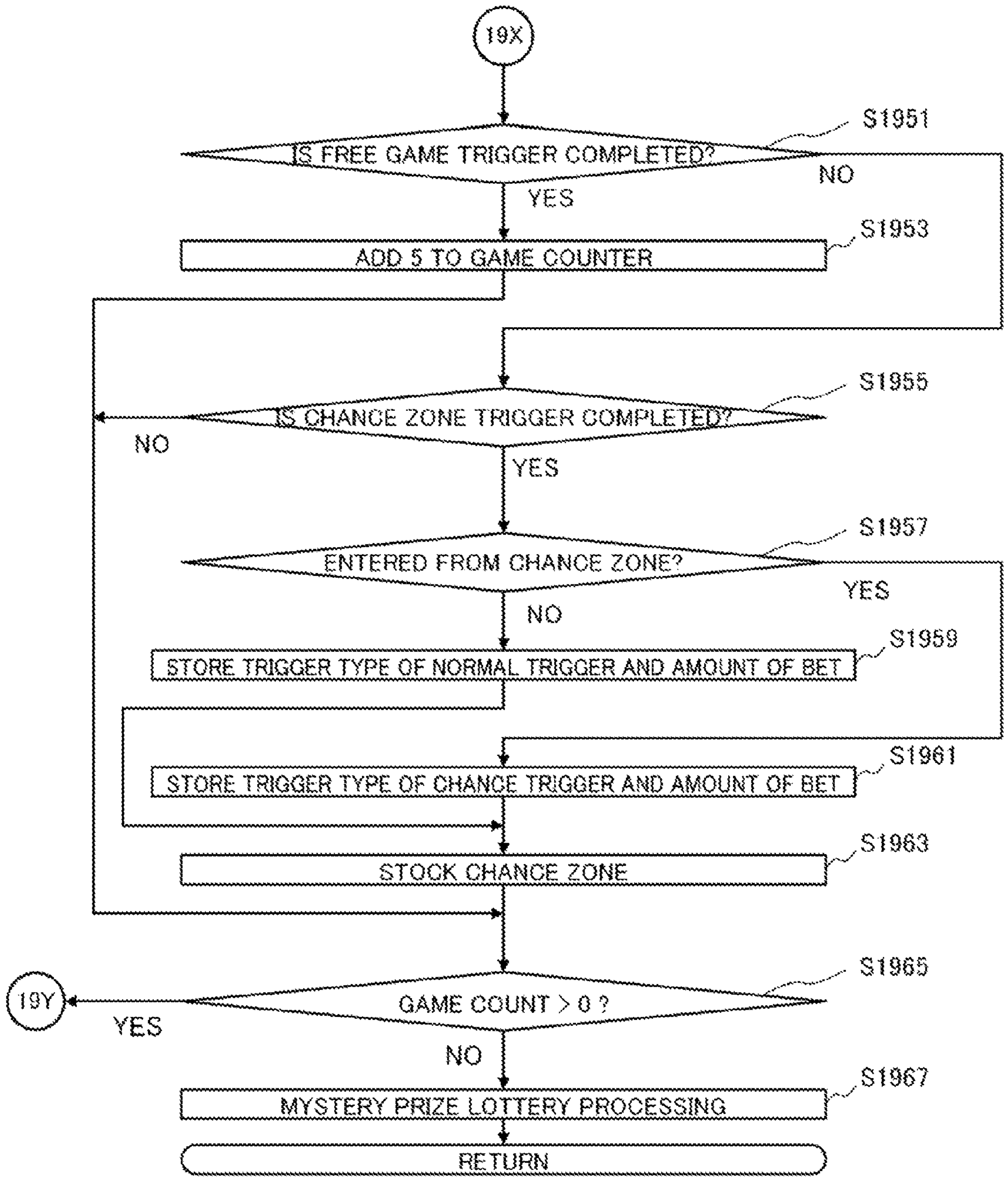
FIG. 19B is a flowchart of a subroutine of free game mode processing.

If determining that a free game trigger is completed, the main CPU 222 invokes and executes a subroutine of the free game mode processing illustrated in FIGS. 19A and 19B (step S1439). If the game mode is base game mode, the main CPU 222 changes the game mode to normal free game mode; if the game mode is chance zone, the main CPU 222 changes the game mode to special free game mode.

Figure 20:
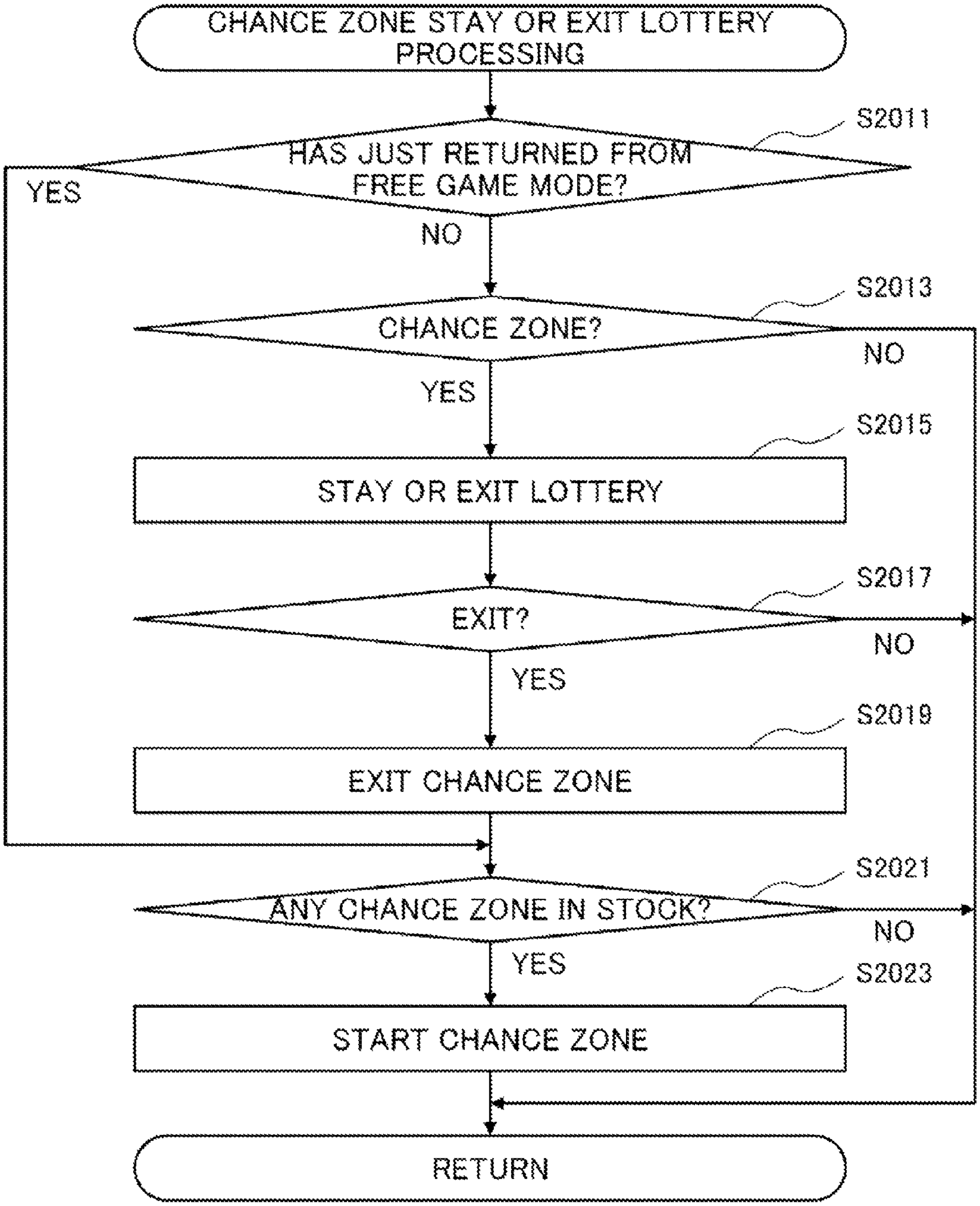
FIG. 20 is a flowchart of a subroutine of chance zone stay or exit lottery processing.

After step S1435 or S1439, or if determining that a free game trigger is not completed in the determination at step S1437, the main CPU 222 invokes and executes a subroutine of the chance zone stay or exit lottery processing illustrated in FIG. 20 (step S1441).

After executing step S1431 or S1441, the main CPU 222 executes payout processing (step S1443) and returns to step S1413.

In the payout processing, the main CPU 222 adds the value (payout counter) held in the payout count storage area to the value (credit counter) held in a credit count storage area provided in the RAM 226. Alternatively, the main CPU 222 may control the ticket printer 120 to issue a ticket with a barcode indicating the record of the payout counter. Still alternatively, the main CPU 222 may control the hopper (not shown) to eject coins in the amount corresponding to the payout counter to the coin tray.

<Coin-Insertion/Start Check Processing>

Figure 15:
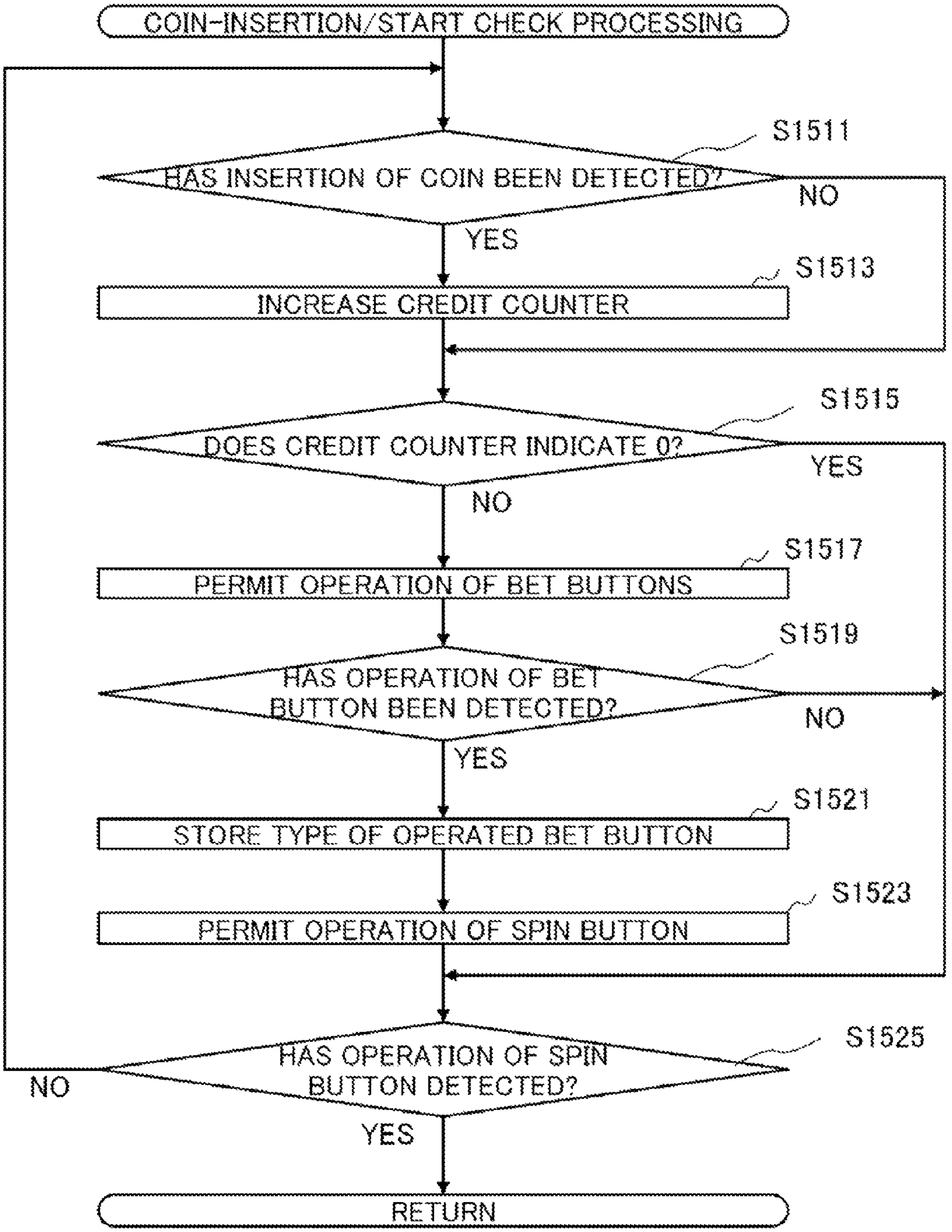
FIG. 15 is a flowchart of subroutine of coin-insertion/start check processing.

FIG. 15 is a flowchart of a subroutine of coin-insertion/start check processing.

First, the main CPU 222 determines whether the coin counter has detected insertion of a coin (step S1511). If the determination is that insertion of a coin has been detected, the main CPU 222 adds a value corresponding to the amount of the received coin to the value (credit counter 320) held in the credit count storage area (step S1513). In addition to the coin, the main CPU 222 may determine whether the bill validator (for example, a not-shown PTS terminal) has detected insertion of a bill, and if the determination is that insertion of a bill has been detected, increase the credit counter by a value corresponding to the amount of the bill.

After step S1513 or if the determination at step S1511 is that insertion of a coin has not been detected, the main CPU 222 determines whether the credit counter indicates 0 (step S1515). If the determination is that the credit counter does not indicate 0, the main CPU 222 permits operation of the BET buttons (step S1517).

Next, the main CPU 222 determines whether operation of a BET button has been detected (step S1519). If the main CPU 222 detects press of a BET button by the player through a BET switch, it stores the type of the BET button in the RAM 226 (step S1521).

Next, the main CPU 222 permits operation of the spin button (step S1523).

The main CPU 222 determines whether operation of the spin button has been detected (step S1525). If the determination is that operation of the spin button has not been detected, the main CPU 222 returns to step S1511.

If the determination is that operation of the spin button has been detected, the main CPU 222 exits this subroutine.

<Symbol Lottery Processing>

Figure 16:
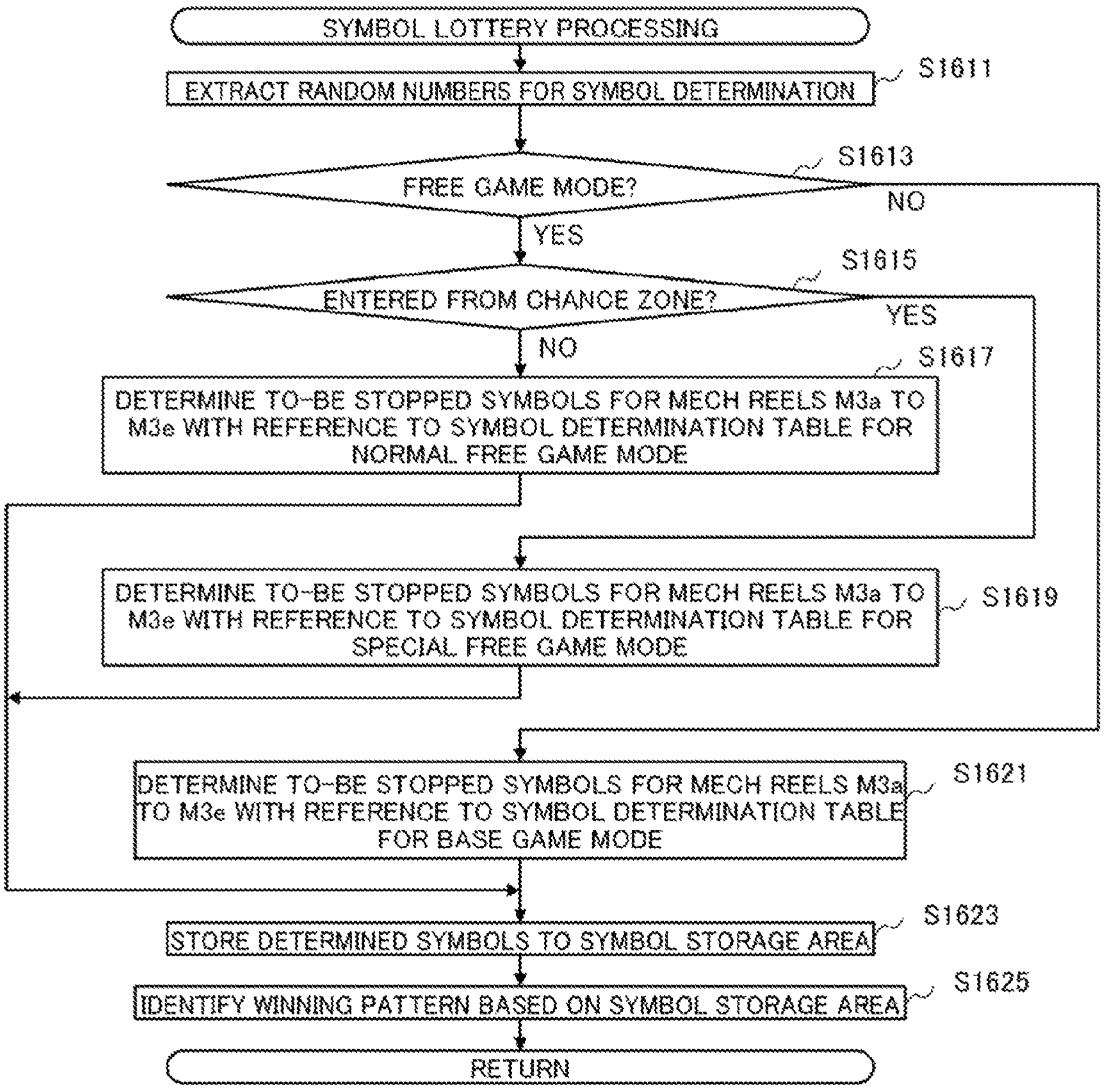
FIG. 16 is a flowchart of a subroutine of symbol lottery processing.

FIG. 16 is a flowchart of a subroutine of symbol lottery processing.

First, the main CPU 222 extracts five random numbers for symbol determination for the current game mode (step S1611). The game mode is one of base game mode, chance zone, normal free game mode, and special free game mode.

Next, the main CPU 222 determines whether the current game mode is free game mode (step S1613).

If the determination is that the game mode is free game mode, the main CPU 222 determines whether the free game mode has been entered from chance zone (step S1615). The free game mode entered from chance zone is special free game mode. The free game mode not entered from chance zone is the free game mode entered from base game mode, namely, normal free game mode.

If the determination is not that the free game mode has been entered from chance zone, the main CPU 222 determines to-be stopped symbols for the mech reels M3*a* to M3*e* with reference to the symbol determination table for normal free game mode (FIG. 11) (step S1617).

Contrarily, if the determination at step S1615 is that the free game mode has been entered from chance zone, the main CPU 222 determines to-be stopped symbols for the mech reels M3*a* to M3*e* with reference to the symbol determination table for special free game mode (FIG. 12) (step S1619).

If the determination at step S1613 is that the game mode is not free game mode, that is, if the game mode is base game mode or chance zone, the main CPU 222 determines to-be stopped symbols for the mech reels M3*a* to M3*e* with reference to the symbol determination table for base game mode (FIG. 10) (step S1621).

As described above, when the game mode is base game mode or chance zone, five to-be stopped symbols are determined with reference to the symbol determination table in FIG. 10. When the game mode is normal free game mode, five to-be stopped symbols are determined with reference to the symbol determination table in FIG. 11. When the game mode is special free game mode, five to-be stopped symbols are individually determined for the five mech reels M3*a* to M3*e* with reference to the symbol determination table in FIG. 12. In the present embodiment, the five to-be stopped symbols are determined with the probabilities in accordance with the weights indicated in FIGS. 10 to 12.

After step S1617, S1619, or S1621, the main CPU 222 stores the determined to-be stopped symbols for the five mech reels M3*a* to M3*e* to a symbol storage area provided in the RAM 226 (step S1623).

Next, the winning pattern identification module 310 run by the main CPU 222 determines, with reference to the payout table shown in FIG. 9, whether any winning pattern is completed based on the symbols stored in the symbol storage area (step S1625). If some winning pattern is completed, the main CPU 222 determines the prize in accordance with the number of the kind.

<Symbol Display Control Processing>

Next, symbol display control processing is described with reference to FIG. 17. FIG. 17 is a flowchart of symbol display control processing for the slot machine 10 according to the present embodiment.

First, the reel control module 308 run by the main CPU 222 controls the five mech reels M3*a* to M3*e* to start spinning (step S1711).

After a predetermined time, the reel control module 308 run by the main CPU 222 controls the mech reels M3*a* to M3*e* to stop so that the to-be stopped symbols stored in the symbol storage area will be positioned on the second row of the symbol matrix (step S1713).

Next, the reel control module 308 run by the main CPU 222 determines whether all the five mech reels M3*a* to M3*e* have been stopped (step S1715).

If the determination is that all the five mech reels M3*a* to M3*e* have not been stopped, the reel control module 308 run by the main CPU 222 returns to step S1713.

If the determination is that all the five mech reels M3*a* to M3*e* have been stopped, the reel control module 308 run by the main CPU 222 exits this subroutine.

<Payout Determination Processing>

Figure 18:
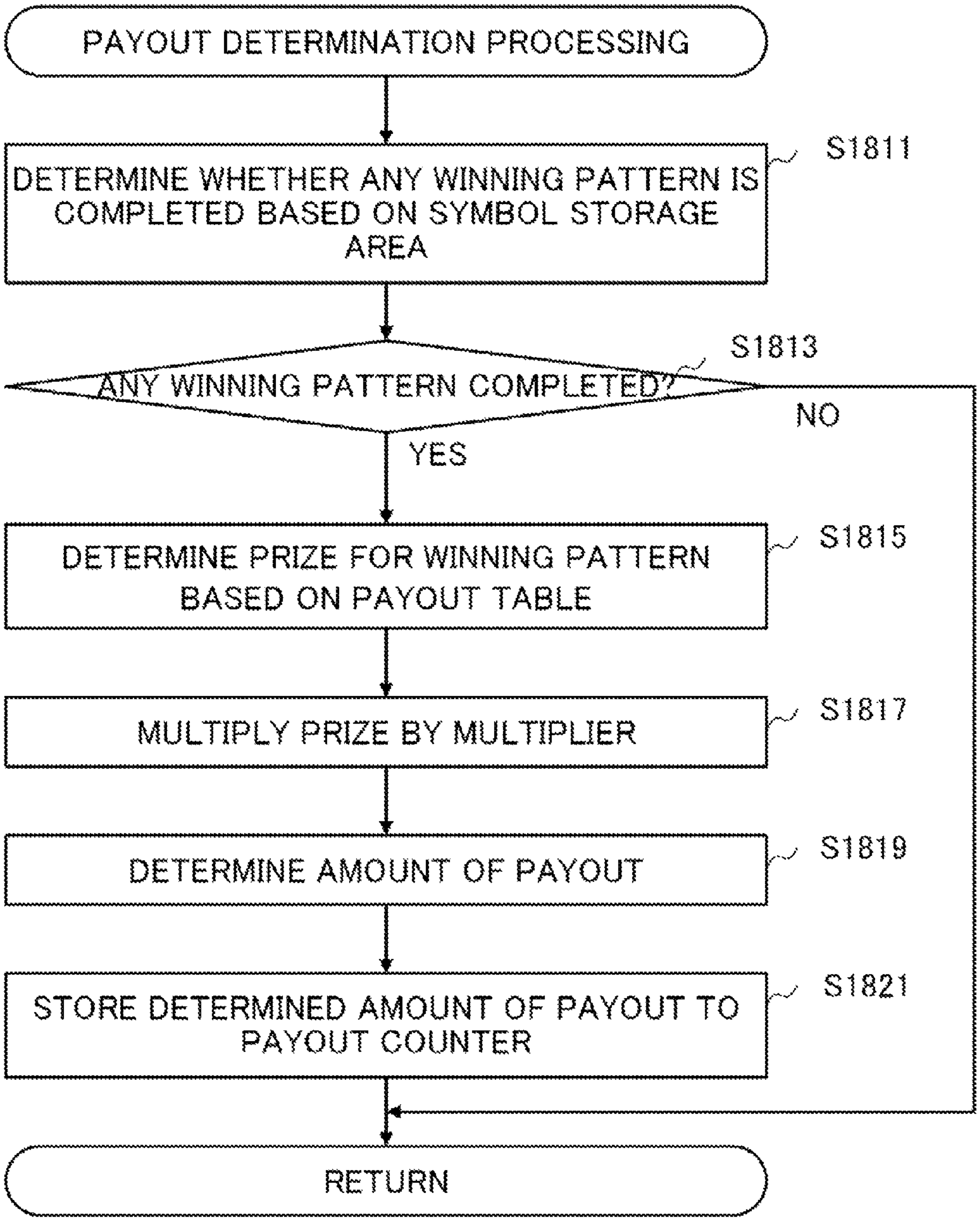
FIG. 18 is a flowchart of a subroutine of payout determination processing.

FIG. 18 is a flowchart of a subroutine of payout determination processing.

First, the main CPU 222 searches the winning patterns in the payout table shown in FIG. 9 based on the symbols rearranged in the display window 150 (step S1811). All the rearranged symbols can be identified with the to-be stopped symbols stored in the symbol storage area in the RAM 226 at step S1623.

Next, the main CPU 222 determines whether any winning pattern is completed (step S1813).

If the determination at step S1813 is that some winning pattern is completed, the main CPU 222 determines the prize for the winning pattern with reference to the payout table (FIG. 9) (step S1815).

Next, the main CPU 222 multiplies the prize by a multiplier (step S1817).

Next, the main CPU 222 determines the amount of payout (step S1819).

The main CPU 222 stores the determined amount of payout to a payout counter (step S1821) and exits this subroutine.

<Free Game Mode Processing>

FIGS. 19A and 19B are a flowchart of a subroutine of free game mode processing.

Free games are slot games (unit games) same as the games in the base game mode. The slot games in the free game mode can be started without betting.

The present embodiment includes normal free game mode and special free game mode for free game modes. When the free game mode is entered from base game mode, the free game mode is performed as normal free game mode. When the free game mode is entered from chance zone, the free game mode is performed as special free game mode. When the normal free game mode and the special free game mode do not need to be distinguished from each other, they are merely referred to as free game mode.

Normal free game mode uses the weights shown in the symbol determination table in FIG. 11. Special free game mode uses the weights shown in the symbol determination table in FIG. 12.

In the special free game mode, processing to determine a special multiplier to be multiplied by the prizes determined in individual unit games (see steps S1915 to S1923 to be described later). In the normal free game mode, the multiplier to be multiplied by the prizes determined in individual unit games is 1 (see step S1925 to be described later).

First, the main CPU 222 determines the amount of bet based on the stored type of bet button (step S1911). At step S1911, the type of bet button stored at step S1521 in FIG. 15 is used.

Unit games in free game mode can be played without betting. However, a prize needs to be multiplied by the amount of bet to determine the amount of payout in the free game mode. For this reason, in the free game mode, the main CPU 222 uses the amount of bet associated with the bet operation in the last unit game before entering the free game mode.

In the slot machine 10 of the present embodiment, the thirty paylines are always active. Accordingly, the total amount of bet can be obtained by multiplying the multiplier assigned to the operated bet button by 30.

Next, the main CPU 222 determines whether the current game mode has been changed from chance zone (step S1913). If the current game mode has been changed from base game mode, the main CPU 222 starts free games in normal free game mode; if the current game mode has been changed from chance zone, the main CPU 222 starts free games in special free game mode.

In the case of special free game mode, the main CPU 222 executes processing to determine a special multiplier and processing to determine an exit lottery assignment number for chance zone stay or exit lottery processing. The following steps S1915 to S1923 are processing to determine a special multiplier and an exit lottery assignment number. A specific example of determining a special multiplier will be described later with reference to FIGS. 23, 24, 25, and 30.

If the determination at step S1913 is that the current game mode is changed from chance zone, the main CPU 222 determines the chance play bet (step S1915). The chance play bet is the amount of bet (bet per line) to be used in unit games in the special free game mode and the amount of bet determined at step S1911. The chance play bet determined at step S1915 is stored to the RAM 226.

Next, the main CPU 222 selects a multiplier lottery table (step S1917). The present embodiment provides a multiplier lottery table for normal trigger (see FIG. 24) and a multiplier lottery table for chance trigger (see FIG. 25). In the case of completion of a trigger for chance zone in base game mode or normal free game mode, the trigger is a normal trigger; the main CPU 222 selects the multiplier lottery table for normal trigger (see FIG. 24) at step S1917. In the case of completion of a trigger for chance zone in chance zone or special free game mode, the trigger is a chance trigger; the main CPU 222 selects the multiplier lottery table for chance trigger (see FIG. 25) at step S1917.

In the case of completion of a trigger for chance zone in base game mode, the trigger type of normal trigger and the normal trigger bet is stored in the RAM 226 at step S1431. In the case of completion of a trigger for chance zone in a chance zone, the trigger type of chance trigger and the chance trigger bet is stored in the RAM 226 at step S1435. In the case of completion of a trigger for chance zone in normal free game mode, the trigger type of normal trigger and the normal trigger bet is stored in the RAM 226 at step S1959. In the case of completion of a trigger for chance zone in special free game mode, the trigger type of chance trigger and the chance trigger bet is stored in the RAM 226 at step S1961.

At step S1917, the main CPU 222 retrieves the trigger type of normal trigger or chance trigger from the RAM 226. In the case of normal trigger, the main CPU 222 selects the multiplier lottery table for normal trigger (see FIG. 24); in the case of chance trigger, the main CPU 222 selects the multiplier lottery table for chance trigger (see FIG. 25).

Next, the main CPU 222 determines a multiplier lottery assignment number (step S1919). The multiplier lottery assignment number is determined with reference to a lottery assignment number determination table (see FIGS. 23A and 23B). As shown in FIGS. 23A and 23B, the lottery assignment number determination table specifies correspondence relations of a normal trigger bet or chance trigger bet, a chance play bet, a multiplier lottery assignment number, and an exit lottery assignment number. A multiplier lottery assignment number can be determined by referring to the lottery assignment number determination table with a normal trigger bet or chance trigger bet and a chance play bet.

At step S1919, the main CPU 222 retrieves the normal trigger bet or chance trigger bet and the chance play bet from the RAM 226, and determines a multiplier lottery assignment number with reference to the lottery assignment number determination table (see FIGS. 23A and 23B).

The combination of the trigger type of normal trigger, the normal trigger bet, and the chance play bet or the combination of the trigger type of chance trigger, the chance trigger bet, and the chance play bet are referred to as second trigger completion requirements.

Next, the main CPU 222 executes multiplier lottery processing with the multiplier lottery assignment number to determine a special multiplier (step S1921). In the case of a normal trigger, the multiplier lottery table for normal trigger (FIG. 24) is selected; in the case of a chance trigger, the multiplier lottery table for chance trigger (FIG. 25) is selected.

The probabilities of drawing special multipliers are determined depending on the weights specified in the multiplier lottery table (FIG. 24 or 25). The multiplier lottery processing is executed based on the weights associated with the multiplier lottery assignment number determined at step S1919.

Next, the main CPU 222 determines an exit lottery assignment number (step S1923). The lottery assignment number determination table in FIGS. 23A and 23B specifies relations of a normal trigger bet or chance trigger bet, a chance play bet, multiplier lottery assignment numbers, and an exit lottery assignment number. An exit lottery assignment number is determined with reference to the lottery assignment number determination table with a chance trigger bet and a chance play bet. As noted, the exit lottery assignment number depends on the chance trigger bet and the chance play bet.

When chance zone is triggered in chance zone, the chance zone is stocked at step S1433. When chance zone is triggered in normal free game mode or special free game mode, the chance zone is stocked at step S1963. Executing steps S1915 to S1923 when chance zone is in stock uses the stock. Upon using the stock, the main CPU 222 erases the information indicating that chance zone is in stock from the RAM 226.

If the determination at step S1913 is that the current game mode is not changed from chance zone, the main CPU 222 determines the multiplier to be 1 (step S1925).

Next, the main CPU 222 sets the game count at 5 after executing step S1923 or S1925 (step S1927).

Next, the main CPU 222 executes free game starting effects (S1929). The effects notify the player of entering the free game mode.

Next, the main CPU 222 executes at-one-game-end initialization processing (step S1931). For example, the main CPU 222 clears data that becomes unnecessary after each game in the working area of the RAM 226, such as the to-be stopped symbols determined by lottery.

Next, the main CPU 222 invokes and executes a subroutine of symbol lottery processing illustrated in FIG. 16 (step S1933). In the processing, to-be stopped symbols are determined based on random numbers for symbol determination.

Next, the main CPU 222 executes presentation effects start processing (step S1935). At step S1935, the main CPU 222 extracts a random number for effect determination, determines an effect content from the predefined plurality of effect contents by lottery, and executes the determined effect content with predetermined timing. For example, the main CPU 222 can control the upper image display panel 131 to play a video for presentation effects, the speakers 112 to output audio, the lamp 114 to flash, and further apply special effects to these.

Figure 17:
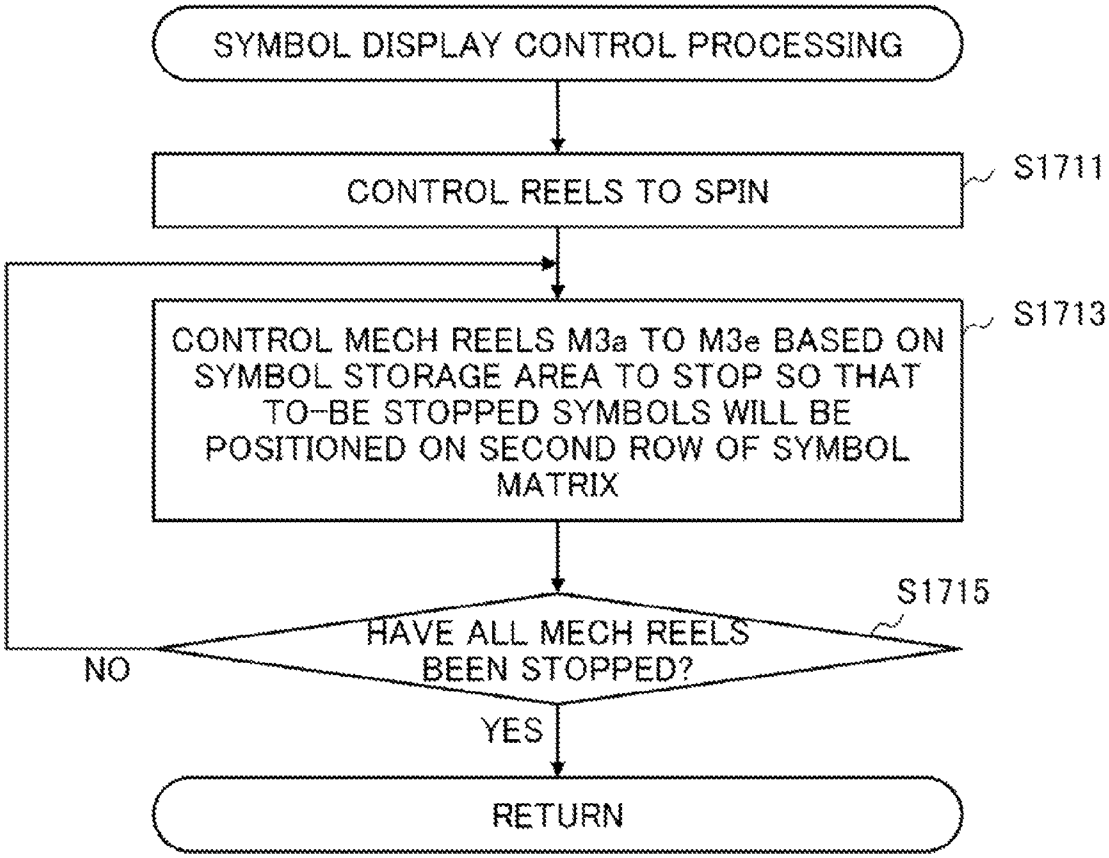
FIG. 17 is a flowchart of a subroutine of symbol display control processing.

Next, the main CPU 222 executes symbol display control processing illustrated in FIG. 17 (step S1937). In this processing, spinning the five mech reels M3*a* to M3*e* (scrolling the five reel strips) is started and the to-be stopped symbols determined in the symbol lottery processing of step S1933 are stopped at the predetermined base positions.

Next, the main CPU 222 executes payout determination processing illustrated in FIG. 18 (step S1939). In this processing, the main CPU 222 determines whether any winning pattern in the payout table (see FIG. 9) is completed with the rearranged symbols. The main CPU 222 determines the amount of payout in accordance with the winning pattern with reference to the payout table (see FIG. 9) and stores the amount to the payout count storage area (payout counter) provided in the RAM 226.

Next, the main CPU 222 decrements the game count by one (step S1941).

Next, the main CPU 222 determines whether the free game mode is retriggered (step S1951). Specifically, the main CPU 222 determines whether the winning pattern of BONUSes is completed.

If the determination at step S1951 is that a retrigger for the free game mode is completed, the main CPU 222 increments the game count by 5 (step S1953).

Appearance of three BONUSes in normal free game mode retriggers the normal free game mode; five unit games are added. Likewise, appearance of three BONUSes in special free game mode retriggers the special free game mode; five unit games are added.

If the determination at step S1951 that a retrigger for the free game mode is not completed, the main CPU 222 determines whether a trigger for chance zone is completed (step S1955).

If the determination at step S1955 is that a trigger for chance zone is completed, the main CPU 222 determines whether the current game mode is changed from chance zone (step S1957).

If the determination at step S1957 is that the current game mode is not changed from chance zone, the main CPU 222 stores the trigger type of normal trigger and the normal trigger bet to the RAM 226 (step S1959).

If the determination at step S1957 is that the current game mode is changed from chance zone, the main CPU 222 stores the trigger type of chance trigger and the chance trigger bet to the RAM 226 (step S1961).

After step S1959 or S1961, the main CPU 222 stocks chance zone (step S1963). The processing at step S1963 is to store the information indicating that chance zone is in stock to the RAM 226.

In the case where a trigger for chance zone is completed in normal free game mode, the main CPU 222 stocks the triggered chance zone in the time-series order at step S1963 and stores the trigger type of normal trigger and the normal trigger bet in the time-series order at step S1959.

In the case where a trigger for chance zone completed in special free game mode, the main CPU 222 stocks the triggered chance zone in the time-series order at step S1963 and stores the trigger type of chance trigger and the chance trigger bet in the time-series order at step S1961.

After step S1953 or S1963, or if the determination at step S1955 is that a trigger for chance zone is not completed, the main CPU 222 determines whether the game count is more than zero (step S1965).

If the determination at step S1965 is that the game count is more than zero, the main CPU 222 returns to step S1931.

If the determination at step S1965 is that the game count is zero, the main CPU 222 executes lottery processing for Mystery Prize (step S1967) and exits this subroutine.

<Chance Zone Stay or Exit Lottery Processing>

FIG. 20 is a flowchart of a subroutine of chance zone stay or exit lottery processing. The chance zone stay or exit lottery processing is invoked and executed at step S1441.

First, the main CPU 222 determines whether the main CPU 222 has just returned from free game mode (step S2011). That is to say, the main CPU 222 determines whether the main CPU 222 has just returned from either normal free game mode or special free game mode. If the main CPU 222 has just returned from normal free game mode or special free game mode, the game mode has just changed to base game mode or chance zone; accordingly, the main CPU 222 does not need to determine whether to stay in or exit the chance zone.

If the determination at step S2011 is not that the main CPU 222 has just returned from free game mode, the main CPU 222 determines whether the current game mode is chance zone (step S2013). If the game mode is base game mode, the main CPU 222 does not need to execute stay or exit lottery processing; if the game mode is chance zone, the main CPU 222 executes stay or exit lottery processing.

If the determination at step S2013 is that the game mode is chance zone, the main CPU 222 executes stay or exit lottery processing (step S2015). In chance zone, the main CPU 222 executes stay or exit lottery processing every time a unit game is finished to determine whether to stay in or exit the chance zone by lottery. If the main CPU 222 draws "stay", the main CPU 222 maintains the chance zone. If the main CPU 222 draws "exit", the main CPU 222 terminates the chance zone. Terminating chance zone leads the game mode to return to base game mode.

Next, the main CPU 222 determines whether "exit" is drawn in the stay or exit lottery processing at step S2015 (step S2017).

If the determination at step S2017 is that "exit" is drawn in the stay or exit lottery processing, the main CPU 222 exits the chance zone (step S2019).

If the determination at step S2011 is that the main CPU 222 has just returned from free game mode or after executing step S2019, the main CPU 222 determines whether any chance zone is in stock (step S2021). When a trigger for chance zone is completed in chance zone, normal free game mode, or special free game mode (step S1425 or S1955), the chance zone is stocked (step S1433 or S1963). Step S2021 is to determine whether any chance zone has been stocked at step S1433 or S1963.

If the determination at step S2021 is that chance zone is in stock, the main CPU 222 newly starts chance zone (step S2023) and exits this subroutine.

If the determination at step S2013 is that the current game mode is not chance zone (that is, the game mode is base game mode), if the determination at step S2017 is that "exit" is not drawn (that is, the chance zone is to be maintained), or if the determination at step S2021 is that no chance zone is in stock, the main CPU 222 exits this subroutine.

<<Specific Examples of Determining Special Multiplier>>

Specific examples of determining a special multiplier are described with reference to FIGS. 23, 24, 25, 29, and 30.

<Lottery Assignment Number Determination Table>

FIGS. 23A and 23B are a lottery assignment number determination table for determining a multiplier lottery assignment number and an exit lottery assignment number. The first column of the lottery assignment number determination table includes normal trigger bets or chance trigger bets. The second column of the lottery assignment number determination table includes chance play bets. The third column of the lottery assignment number determination table includes assignment numbers for the multiplier lottery in the case of normal trigger. The fourth column of the lottery assignment number determination table includes assignment numbers for the multiplier lottery in the case of chance trigger. The fifth column of the lottery assignment number determination table includes assignment numbers for the exit lottery. As noted from the above, the lottery assignment number determination table specifies correspondence relations of normal trigger bets or chance trigger bets, chance play bets, multiplier lottery assignment numbers, and exit lottery assignment numbers.

The normal trigger bet is the amount of bet (bet per line) at a normal trigger. That is to say, the normal trigger bet is the amount of bet in the unit game in which a trigger for chance zone is completed in base game mode or normal free game mode.

The chance trigger bet is the amount of bet (bet per line) at a chance trigger. That is to say, the chance trigger bet is the amount of bet in the unit game in which a trigger for chance zone is completed in chance zone or special free game mode.

The chance play bet is the amount of bet used in the unit games in the special free game mode. That is to say, the chance play bet is the amount of bet in the unit game in chance zone in which mode change to special free game mode is determined.

The normal trigger bet, the chance trigger bet, and the chance play bet are all the amounts of bet per line. Accordingly, they take one of the values 1, 2, 3, 4, 5, 10, and 20.

The multiplier lottery assignment number takes one of the integers 1 to 22. The exit lottery assignment number takes one of the integers 1 to 16.

<Multiplier Lottery Table for Normal Trigger and Multiplier Lottery Table for Chance Trigger>

When a normal trigger is completed, the main CPU 222 selects the multiplier lottery table for normal trigger (see FIG. 24) at step S1917. When a chance trigger is completed, the main CPU 222 selects the multiplier lottery table for chance trigger (see FIG. 25) at step S1917.

FIG. 24 is a table for illustrating an example of the multiplier lottery table for normal trigger and FIG. 25 is a table for illustrating an example of the multiplier lottery table for chance trigger. These multiplier lottery tables specify the weights to determine a special multiplier by lottery.

The special multipliers are 2, 3, 4, 5, 6, 7, 8, 9, 10, 15, 20, 30, 50, and 88. Each multiplier lottery table specifies weights of the combinations of these special multipliers and multiplier lottery assignment numbers 1 to 22. The main CPU 222 determines one multiplier lottery assignment number out of the multiplier lottery assignment numbers 1 to 22 and determines a special multiplier with the probabilities in accordance with the weights associated with the determined multiplier lottery assignment number.

Both of the multiplier lottery table for normal trigger and the multiplier lottery table for chance trigger specify that greater special multipliers are weighted higher for smaller multiplier lottery assignment numbers and smaller special multipliers are weighted higher for greater multiplier lottery assignment numbers. Accordingly, if the multiplier lottery assignment number is small, a greater special multiplier is determined with high probability; if the multiplier lottery assignment number is great, a smaller special multiplier is determined with high probability.

According to the multiplier lottery table for normal trigger, when the multiplier lottery assignment number is 1, the weight of the special multiplier 30 is the highest; when the multiplier lottery assignment number is 2, the weight of the special multiplier 20 is the highest; when the multiplier lottery assignment number is one of 3 to 5, the weight of the special multiplier 15 is the highest; when the multiplier lottery assignment number is 6, the weight of the special multiplier 10 is the highest; when the multiplier lottery assignment number is 7, the weight of the special multiplier 9 is the highest; when the multiplier lottery assignment number is 8 or 9, the weight of the special multiplier 8 is the highest; when the multiplier lottery assignment number is 10 or 11, the weight of the special multiplier 7 is the highest; when the multiplier lottery assignment number is 12, the weight of the special multiplier 6 is the highest; when the multiplier lottery assignment number is 13, the weight of the special multiplier 5 is the highest; when the multiplier lottery assignment number is 14, the weights of the special multipliers 4 and 5 are the highest; when the multiplier lottery assignment number is 15 or 16, the weight of the special multiplier 4 is the highest; when the multiplier lottery assignment number is 17, the weight of the special multiplier 3 is the highest; and when the multiplier lottery assignment number is one of 18 to 22, the weight of the special multiplier 2 is the highest.

According to the multiplier lottery table for chance trigger, when the multiplier lottery assignment number is 1, the weight of the special multiplier 88 is the highest; when the multiplier lottery assignment number is one of 2 to 6, the weight of the special multiplier 30 is the highest; when the multiplier lottery assignment number is 7, the weight of the special multiplier 20 is the highest; when the multiplier lottery assignment number is one of 8 to 11, the weight of the special multiplier 15 is the highest; when the multiplier lottery assignment number is 12, the weight of the special multiplier 10 is the highest; when the multiplier lottery assignment number is 13 or 14, the weight of the special multiplier 9 is the highest; when the multiplier lottery assignment number is 15 or 16, the weight of the special multiplier 8 is the highest; when the multiplier lottery assignment number is 17, the weight of the special multiplier 6 is the highest; when the multiplier lottery assignment number is 18, the weight of the special multiplier 5 is the highest; when the multiplier lottery assignment number is 19, the weights of the special multipliers 4 and 5 are the highest; when the multiplier lottery assignment number is 20, the weight of the special multiplier 4 is the highest; and when the multiplier lottery assignment number is 21 or 22, the weight of the special multiplier 3 is the highest.

Comparison of the weights of the same multiplier lottery assignment number reveals that the multiplier lottery table for chance trigger is specified to draw a greater special multiplier with higher probabilities than the multiplier lottery table for normal trigger.

According to the lottery assignment number determination table in FIGS. 23A and 23B, greater multiplier lottery assignment numbers (the third and the fourth columns) will be determined as the chance play bet (the second column) increases. As mentioned above, the chance play bet is the amount of bet (bet per line) to be used in a series of unit games in special free game mode. As shown in FIGS. 24 and 25, special multipliers are specified such that a smaller special multiplier will be determined for a greater multiplier lottery assignment number with higher probability. Accordingly, if the last unit game before entering special free game mode is played with a high bet, the special multiplier in the special free game mode will be smaller with high probability, eliminating an extremely high amount of payout in the special free game mode.

According to the lottery assignment number determination table in FIGS. 23A and 23B, the multiplier lottery assignment numbers (the third and the fourth columns) generally become smaller as the normal trigger bet or chance trigger bet (the first column) increases. As mentioned above, the normal trigger bet is the amount of bet (bet per line) at a normal trigger and the chance trigger bet is the amount of bet (bet per line) at a chance trigger. As shown in FIGS. 24 and 25, special multipliers are specified such that a greater special multiplier will be determined for a smaller multiplier lottery assignment number with higher probability. Accordingly, if the last unit game before entering chance zone is played with a high bet, the special multiplier in the special free game mode will be greater with high probability, eliminating an extremely small amount of payout in the special free game mode.

FIG. 29 is a table for illustrating an example of an exit lottery table. The exit lottery table specifies the weights for the lottery to determine whether to stay in or exit the chance zone. The exit lottery table specifies weights of stay and exit for each of the exit lottery assignment numbers 1 to 16. The main CPU 222 determines one exit lottery assignment number out of the exit lottery assignment numbers 1 to 16 and determines stay or exit with the probabilities in accordance with the weights associated with the determined exit lottery assignment number.

According to the exit lottery table in FIG. 29, the weight of stay is higher for a smaller exit lottery assignment number. For example, in the case where the exit lottery assignment number is 1, the weight of exit is 375 and the weight of stay is 14274. Contrarily, the weight of exit is higher for a greater exit lottery assignment number. For example, in the case where the exit lottery assignment number is 15, the weight of exit is 7500 and the weight of stay is 7149. When the exit lottery assignment number is 15, the weight of exit and the weight of stay are almost the same; the probability to draw stay and the probability to draw exit are almost the same.

According to the lottery assignment number determination table in FIGS. 23A and 23B, a greater exit lottery assignment number (the fifth column) will be determined for a higher chance play bet (the second column). As shown in FIG. 29, the probability of exit is specified to be higher for a greater exit lottery assignment number. Accordingly, if the last unit game before entering special free game mode is played with a high bet, the chance zone will be finished with high probability, decreasing the chance to get a prize in the chance zone.

The lottery assignment number determination table in FIGS. 23A and 23B is generally specified such that a smaller exit lottery assignment number (the fifth column) will be determined for a higher normal trigger bet or chance trigger bet (the first column). The probability of stay is specified to be higher for a smaller exit lottery assignment number. Accordingly, if the last unit game before entering chance zone is played with a high bet, the chance zone will be maintained with high probability, increasing the chance to get a prize in the chance zone.

<Example of Determining Multiplier Lottery Assignment Number>

Examples of the multiplier lottery assignment number and the exit lottery assignment number are described with reference to FIG. 30.

<First Special Free Game Mode>

First, unit games Game1 and Game2 are conducted in base game mode. The player can determine the amount of bet through a bet operation in each unit game in the base game mode. In the example shown in FIG. 30, the amounts of bet on the unit games Game1 and Game2 are both Bet 1.

In the unit game Game2 in the base game mode, normal free game mode is triggered. Because of the trigger for normal free game mode, the game mode changes to normal free game mode. In all unit games in the normal free game mode, the amount Bet1 used in the unit game Game2, which is the last unit game in the base game mode before the mode change, is used for the bet.

Figure 30:
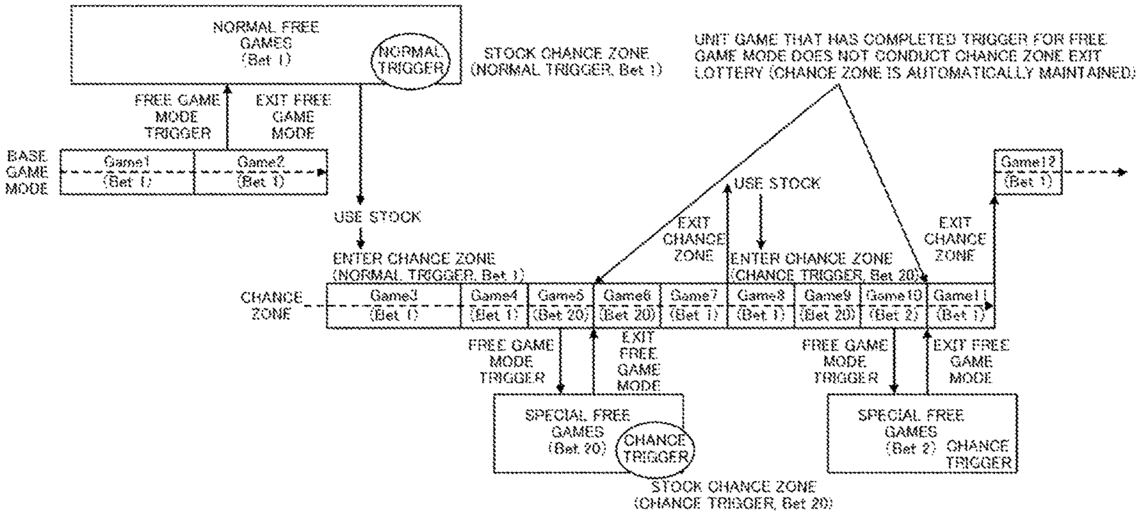
FIG. 30 is a diagram for illustrating an example of determining a multiplier lottery assignment number.

In the example shown in FIG. 30, chance zone is triggered in a unit game in the normal free game mode. When chance zone is triggered in normal free game mode (a normal trigger is completed), the event that chance zone is triggered is put in stock and the game mode changes to chance zone (first chance zone) when the condition is satisfied that the normal free game mode is finished. In the unit games in the normal free game mode, the amount Bet1 used in the unit game Game2, which is the last unit game in the base game mode before the mode change, is used for the bet. Accordingly, the amount Bet1 in the unit game Game2 is the normal trigger bet.

In the example shown in FIG. 30, unit games Game3 to Game7 are conducted in the first chance zone. In the unit game Game5 in the first chance zone, special free game mode is triggered. Because of the trigger for special game mode, the game mode changes to special free game mode (first special free game mode). In all unit games in the first special free game mode, the amount Bet20 used in the unit game Game5, which is the last unit game in the chance zone before the mode change, is used for the bet. Accordingly, the amount Bet20 in the unit game Game5 is the chance play bet.

In the first special free game mode, the trigger type is normal trigger, the normal trigger bet is Bet1, and the chance play bet is Bet20. Accordingly, the multiplier lottery table for normal trigger A is selected in the lottery assignment number determination table of FIGS. 23A and 23B and the multiplier lottery assignment number is determined to be 22 with the normal trigger bet Bet1 and the chance play bet Bet20, so that the column No. 22 in the multiplier lottery table for normal trigger (FIG. 24) is assigned for the multiplier lottery.

In summary, the first special free game mode is triggered by a normal trigger and the column No. 22 in the multiplier lottery table for normal trigger (FIG. 24) is assigned for the multiplier lottery.

Accordingly, at step S1921, the special multiplier is determined by lottery in accordance with the weights in the column No. 22 of the multiplier lottery table in FIG. 24. In the case of the column No. 22 of the multiplier lottery table in FIG. 24, the probability to draw the special multiplier 2 is 7408/9000; the probability to draw the special multiplier 3 is 920/9000; the probability to draw the special multiplier 4 is 350/9000; the probability to draw the special multiplier 5 is 180/9000; the probability to draw the special multiplier 6 is 80/9000; the probability to draw the special multiplier 7 is 40/9000; the probability to draw the special multiplier 8 is 10/9000; the probability to draw the special multiplier 9 is 5/9000; the probability to draw the special multiplier 10 is 2/9000; the probability to draw the special multiplier 15 is 1/9000; the probability to draw the special multiplier 20 is 1/9000; the probability to draw the special multiplier 30 is 1/9000; the probability to draw the special multiplier 50 is 1/9000; and the probability to draw the special multiplier 88 is 1/9000.

In the first special free game mode, the normal trigger bet is Bet1, and the chance play bet is Bet20. Accordingly, at step S1923, the exit lottery assignment number is determined to be 15 with reference to the lottery assignment number determination table in FIGS. 23A and 23B.

At step S2015, chance zone stay or exit lottery processing is executed in accordance with the weights in the column No. 15 in the exit lottery table in FIG. 29. In the case of the column No. 15 of the exit lottery table in FIG. 29, the probability to draw exit is 7500/14649 and the probability to draw stay is 7149/14649.

In a unit game in the first special free game mode, chance zone is triggered. When chance zone is triggered (a chance trigger is completed) in normal free game mode, the event of the trigger for chance zone is stocked and the game mode returns to the first chance zone when the condition is satisfied that the first special free game mode is finished.

<Second Special Free Game Mode>

In the example shown in FIG. 30, the requirements to exit the first chance zone are satisfied in the unit game Game7 after returning from the first special free game mode to the first chance zone; the chance zone is once terminated. However, since a chance trigger has been completed; new chance zone (second chance zone) is started immediately.

In the example shown in FIG. 30, unit games Game8 to Game11 are conducted in the second chance zone. In the unit game Game10 in the second chance zone, special free game mode is triggered. Because of the trigger for special game mode, the game mode changes to special free game mode (second special free game mode). In all unit games in the second special free game mode, the amount Bet2 used in the unit game Game10 in the second chance zone, which is the last unit game in the chance zone before the mode change, is used for the bet. Accordingly, the amount Bet2 in the unit game Game10 is the chance play bet.

In the second special free game mode, the trigger type is chance trigger, the chance trigger bet is Bet20, and the chance play bet is Bet2. Accordingly, the multiplier lottery table for chance trigger B is selected in the lottery assignment number determination table of FIGS. 23A and 23B and the multiplier lottery assignment number is determined to be 1 with the chance trigger bet Bet20 and the chance play bet Bet2, so that the column No. 1 in the multiplier lottery table for chance trigger (FIG. 25) is assigned for the multiplier lottery.

In summary, the second special free game mode is triggered by a chance trigger and the column No. 1 in the multiplier lottery table for chance trigger (FIG. 25) is assigned for the multiplier lottery.

Accordingly, at step S1921, the special multiplier is determined by lottery in accordance with the weights in the column No. 1 of the multiplier lottery table in FIG. 25. In the case of the column No. 1 of the multiplier lottery table in FIG. 25, the probability to draw the special multiplier 2 is 5/9000; the probability to draw the special multiplier 3 is 5/9000; the probability to draw the special multiplier 4 is 5/9000; the probability to draw the special multiplier 5 is 5/9000; the probability to draw the special multiplier 6 is 5/9000; the probability to draw the special multiplier 7 is 5/9000; the probability to draw the special multiplier 8 is 5/9000; the probability to draw the special multiplier 9 is 15/9000; the probability to draw the special multiplier 10 is 30/9000; the probability to draw the special multiplier 15 is 150/9000; the probability to draw the special multiplier 20 is 400/9000; the probability to draw the special multiplier 30 is 2310/9000; the probability to draw the special multiplier 50 is 2880/9000; and the probability to draw the special multiplier 88 is 3180/9000.

In the second special free game mode, the chance trigger bet is Bet20, and the chance play bet is Bet2. Accordingly, at step S1923, the exit lottery assignment number is determined to be 3 with reference to the lottery assignment number determination table in FIGS. 23A and 23B.

At step S2015, chance zone stay or exit lottery processing is executed in accordance with the weights in the column No. 3 of the exit lottery table in FIG. 29. In the case of the column No. 3 of the exit lottery table in FIG. 29, the probability to draw exit is 750/14649 and the probability to draw stay is 13899/14649.

In normal free game mode, the payout is determined using the amount of bet in the last unit game in the base game mode before entering the normal free game mode. In similar, in special free game mode, the payout is determined using the amount of bet in the last unit game in the chance zone before entering the special free game mode. In chance zone, the amount of bet can be selected by the player like in base game mode. In special free game mode, higher payout is expected than in normal free game mode because of a special prize.

For this reason, some players may play games with a lower bet in base game mode and play games with a higher bet after entering chance zone. Such players may receive an excessive payout; the difference in the amount of payout could become extremely large.

To prevent such unfairness, the slot machine 10 in the present embodiment is configured to determine the special multiplier based on the normal trigger or chance trigger, the normal trigger bet or chance trigger bet, and the chance play bet and further, to determine stay or exit based on the normal trigger bet or chance trigger bet, and the chance play bet.

That is to say, the slot machine 10 in the present embodiment is configured to determine the special multiplier and whether to exit chance zone based on whether the chance zone is triggered in either base game mode or normal free game mode or in either chance zone or special free game mode, the amount of bet in the unit game at the completion of the trigger for chance zone, and the amount of bet at entering the chance zone. Such a configuration eliminates unfairness among the players in either case where the player plays games with a low bet in base game mode and plays games with a high bet after entering chance zone or where the player plays games with a high bet in base game mode and plays games with a low bet after entering chance zone.

What is claimed is:

1. A gaming machine comprising:

a symbol display device capable of rearranging a plurality of kinds of symbols to show a game result; and a controller capable of executing games, wherein the games include:

a first type of games provided in a first mode and a second mode different from the first mode; and a second type of games different from the first type of games and provided in a normal mode and a special mode more advantageous for a player than the normal mode, wherein probabilities to draw the symbols in the first mode are the same as probabilities to draw the symbols in the second mode, wherein the controller is programmed to perform the following processing of:

(1-1) accepting, via a game medium acceptor, a game medium with a monetary value which establishes a credit balance for the player;

(1-2) receiving, via a bet input device, a bet whose amount is designated by the player based on the credit balance;

(1-3) executing games as a result of the player's bet;

(1-4) changing games from the first type in the first mode to the second type in the normal mode when a first trigger is completed in a game of the first type in the first mode;

(1-5) changing games from the first type in the first mode to the first type in the second mode when a second trigger is completed in a game of the first type in the first mode;

(1-6) changing games from the first type in the second mode to the second type in the special mode when a third trigger is completed in a game of the first type in the second mode; and (1-7) paying out other game medium to the player or establishing the credit balance based on a payout according to a game result, wherein the controller is programmed to perform the following processing in each of the first type of games in the second mode:

(2-1) symbol lottery processing for determining symbols to be rearranged;

(2-2) exit lottery processing for determining whether to exit the second mode; and (2-3) returning to the first mode in a case where the exit lottery processing determines to exit the second mode and maintaining the second mode in a case where to the exit lottery processing determines to stay in the second mode.

2. The gaming machine according to claim 1 further comprising a memory holding a multiplier lottery table for determining a multiplier for game results of a series of games of the second type in the special mode, wherein each of the first type of games is started with a bet;

wherein each of the second type of games is started with a bet in a game of the first type at determination to change games from the first type to the second type;

wherein the second trigger has a probability to be completed in any of the first type of games in the first mode, the first type of games in the second mode, the second type of games in the normal mode, and the second type of games in the special mode, and wherein multipliers in the multiplier lottery table are specified in relation to amounts of bet at completion of the second trigger, amounts of bet at completion of the third trigger, and modes at determination to change games to the second type.

3. The gaming machine according to claim 2, wherein the memory further holds an exit lottery table to be referenced in the exit lottery processing to determine whether to exit the second mode; and wherein the exit lottery table is specified correspondingly to amounts of bet at completion of the second trigger and amounts of bet at completion of the third trigger.

4. A gaming machine comprising:
a symbol display device capable of rearranging a plurality of kinds of symbols to show a game result; and
a controller capable of executing games,
wherein the games include:
a first type of games provided in a first mode and a second mode different from the first mode; and
a second type of games different from the first type of games and provided in a normal mode and a special mode more advantageous for a player than the normal mode,
wherein probabilities to draw the symbols in the first mode are the same as probabilities to draw the symbols in the second mode,
wherein the controller is programmed to perform the following processing of:
(1-1) accepting, via a game medium acceptor, a game medium with a monetary value which establishes a credit balance for the player;
(1-2) receiving, via a bet input device, a bet whose amount is designated by the player based on the credit balance;
(1-3) executing games as a result of the player's bet;
(1-4) changing games from the first type in the first mode to the second type in the normal mode when a first trigger is completed in a game of the first type in the first mode;
(1-5) changing games from the first type in the first mode to the first type in the second mode when a second trigger is completed in a game of the first type in the first mode;
(1-6) changing games from the first type in the second mode to the second type in the special mode when a third trigger is completed in a game of the first type in the second mode; and
(1-7) paying out other game medium to the player or establishing the credit balance based on a payout according to a game result,
wherein the gaming machine further comprises a memory holding a multiplier lottery table for determining a multiplier for game results of a series of games of the second type in the special mode,
wherein each of the first type of games is started with a bet,
wherein each of the second type of games is started with a bet in a game of the first type at determination to change games from the first type to the second type,
wherein the second trigger has a probability to be completed in any of the first type of games in the first mode, the first type of games in the second mode, the second type of games in the normal mode, and the second type of games in the special mode, and
wherein multipliers in the multiplier lottery table are specified in relation to amounts of bet at completion of the second trigger, amounts of bet at completion of the third trigger, and modes at determination to change games to the second type.

5. A gaming machine comprising:
a symbol display device capable of rearranging a plurality of kinds of symbols to show a game result;
a storage device that stores symbol determination data for determining a probability with which each of the symbols is rearranged on the symbol display device and stores, each time a game in which the plurality of kinds of symbols are rearranged is executed, a number of bets in the game; and
a controller capable of executing games,
wherein the games include
a first type of game provided are a first mode and a second mode different from the first mode, and
a second type of game that are free games shifting from the game of the first type,
wherein the second mode uses symbol determination data equal to symbol determination data used in the first mode,
wherein the second type of games include a normal mode shifted from the first mode and a special mode shifting from the second mode, and
wherein the controller:
accepts, via a game medium acceptor, a game medium with a monetary value which establishes a credit balance for the player;
receives, via a bet input device, a bet whose amount is designated by the player based on the credit balance;
executes a game as a result of the player's bet;
when a trigger for shifting to a second type of game is completed in a first type of game, executes, as the second type of game, free games with the number of bets which is stored in the storage device for the game in which the trigger is completed;
when the game in which the trigger is completed has been executed in the second mode, determines a multiplier by lottery and determines a payout using the multiplier in the special mode differently from the normal mode; and
pays out other game medium to the player or establishes the credit balance based on the payout.

6. The gaming machine according to claim 5, wherein the symbol display device includes a plurality of reels for scrolling the symbols,
wherein the storage device stores a payout table for determining relations between winning patterns and prizes,
wherein in the payout table, the winning patterns include a payout winning pattern which is established on a condition that two or more same symbols are displayed along a payline formed on the plurality of reels and a trigger winning pattern which is established on a condition that a predetermined number of same symbols are displayed on the plurality of reels regardless of the payline,
wherein in the first mode, the controller provides a payout when the payout winning patterns is established, and shifts the first mode to the second mode when the trigger winning pattern is established by displaying trigger symbols for shifting the first mode to the second mode on the plurality of reels regardless of the payline, and
wherein in the second mode, the controller provides a payout using a payout table that is same as the payout table used in the first mode.

* * * * *